United States Patent
Poornachandran et al.

(10) Patent No.: US 11,751,042 B2
(45) Date of Patent: Sep. 5, 2023

(54) MULTI-ACCESS EDGE COMPUTING SERVICE FOR MOBILE USER EQUIPMENT METHOD AND APPARATUS

(71) Applicant: Intel Corporation, Santa Clara, CA (US)

(72) Inventors: Rajesh Poornachandran, Portland, OR (US); Karthik Veeramani, Hillsboro, OR (US); Rajneesh Chowdhury, Portland, OR (US); Ned M. Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 17/399,985

(22) Filed: Aug. 11, 2021

(65) Prior Publication Data

US 2022/0078601 A1 Mar. 10, 2022

Related U.S. Application Data

(63) Continuation of application No. 16/569,292, filed on Sep. 12, 2019, now Pat. No. 11,096,036.

(51) Int. Cl.
*H04W 4/00* (2018.01)
*H04W 8/08* (2009.01)
*H04W 60/00* (2009.01)
*H04W 4/024* (2018.01)
*H04L 41/5019* (2022.01)
(Continued)

(52) U.S. Cl.
CPC .......... *H04W 8/08* (2013.01); *G01C 21/3461* (2013.01); *H04L 41/5019* (2013.01); *H04L 67/56* (2022.05); *H04W 4/024* (2018.02); *H04W 4/40* (2018.02); *H04W 16/18* (2013.01); *H04W 24/08* (2013.01); *H04W 60/00* (2013.01);
(Continued)

(58) Field of Classification Search
CPC ......... H04W 8/08; H04W 4/024; H04W 4/40; H04W 76/15; H04W 16/18; H04W 24/08; H04W 60/00; H04L 4/5019; H04L 67/56; G01C 21/3461
See application file for complete search history.

(56) References Cited

U.S. PATENT DOCUMENTS 10,674,319 B1    6/2020 Chandra Mondal et al.
11,096,036 B2 *  8/2021 Poornachandran ... H04L 45/302
(Continued)

FOREIGN PATENT DOCUMENTS

WO    WO2018/211488 A1    11/2018

OTHER PUBLICATIONS

Extended European Search Report dated Oct. 7, 2022 for European Patent Application No. 22181958.4, 8 pages.
Extended European Search Report dated Dec. 8, 2020 for European Patent Application No. 20179376.7, 6 pages.
Office Action dated Aug. 27, 2020 for U.S. Appl. No. 16/569,292, 9 pages.
(Continued)

*Primary Examiner* — Erika A Washington
(74) *Attorney, Agent, or Firm* — Schwabe, Williamson & Wyatt, P.C.

(57) ABSTRACT

Systems, apparatuses, methods, and computer-readable media, are provided for providing connectivity-based and/or connectivity-considered routing with supplemental wireless connections in driving assistance-related activities. Embodiments may be relevant to multi-access edge computing (MEC) and Automotive Edge Computing Consortium (AECC) technologies. Other embodiments may be described and/or claimed.

24 Claims, 19 Drawing Sheets

(51) Int. Cl.
*H04W 4/40* (2018.01)
*H04W 76/15* (2018.01)
*G01C 21/34* (2006.01)
*H04W 16/18* (2009.01)
*H04W 24/08* (2009.01)
*H04L 67/56* (2022.01)
*H04W 84/04* (2009.01)
*H04W 84/12* (2009.01)
*H04W 88/06* (2009.01)

(52) U.S. Cl.
CPC .......... *H04W 76/15* (2018.02); *H04W 84/042* (2013.01); *H04W 84/12* (2013.01); *H04W 88/06* (2013.01)

(56) References Cited

U.S. PATENT DOCUMENTS

| | | |
|---|---|---|
| 2003/0118015 A1 | 6/2003 | Gunnarsson et al. |
| 2011/0149874 A1 | 6/2011 | Reif |
| 2017/0208540 A1* | 7/2017 | Egner ................ H04W 64/003 |
| 2019/0132709 A1 | 5/2019 | Graefe et al. |
| 2020/0136978 A1 | 4/2020 | Li et al. |
| 2020/0249039 A1 | 8/2020 | Lassou et al. |

OTHER PUBLICATIONS

Final Office Action dated Feb. 8, 2021 for U.S. Appl. No. 16/569,292, 11 pages.

* cited by examiner

MULTI-ACCESS EDGE COMPUTING SERVICE FOR MOBILE USER EQUIPMENT METHOD AND APPARATUS

RELATED APPLICATIONS

The present application is a continuation application of U.S. application Ser. No. 16/569,292, filed on Sep. 12, 2019, now U.S. Pat. No. 11,096,036, the contents of which are hereby fully incorporated by reference in its entirety.

FIELD

Various embodiments of the present application generally relate to the field of wireless communications, and in particular to Multi-access Edge Computing (MEC) technologies for supporting mobile User Equipment (UE), such as service continuity for autonomous driving (assistance) systems.

BACKGROUND

Mobile communication for UE, such as those in autonomous or computer-assisted (CA) vehicles, is increasing in importance for applications/services, e.g., making driving safer, improving traffic flow, providing energy consumption efficiencies, and reducing emissions, in the case of computing assisted/autonomous driving. Several emerging services, such as intelligent driving, the creation of maps with real-time data and driving assistance (DA) based on cloud computing, may require a CA/assistance driving (AD) system in a vehicle or an associated mobile device to be connected to a cloud computing service and one or more networks to facilitate continuous connectivity throughout a travel route. Cellular networks coupled with MEC systems may provide mobile connectivity and driving assistance services for vehicles and/or associated wireless devices. It is critical for a user/vehicle subscribed cellular network to provide continuous wireless connectivity/coverage to the user/vehicle for driving assistance services and/or other services (e.g., navigation, entertainment) while traveling. However, a cellular network may not be able to provide sufficient connectivity coverage along a particular route due to various reasons, such as, but not limited to, lack of coverage, weak wireless signals, and strong interferences. For example, cellular connectivity may be unpredictable while driving through zones or areas with tall buildings or forests with scarce access nodes, which can result in poor, weak, or no cellular connectivity.

With existing solutions, a user equipment (UE) or vehicle system can connect to certain hotspots while cellular connection is poor. For example, the UE or the vehicle system may connect to a free Wi-Fi provided by a third-party (e.g., airport, hotel, restaurant, etc.) to supplement the poor or no cellular connection. The cellular connection is considered to be poor when a signal quality is below certain thresholds. However, there are some challenges in the existing solutions. For example, while driving through several pockets of poor connectivity in a region, the UE or the vehicle system may start to search for a known hotspot after the cellular connection becomes poor or unavailable. The cycle for searching, pairing with the searched hotspot, and potential popping messages for signing user agreement with the hotspot can be burdensome and cumbersome. Especially when there are multiple poor connectivity pockets on a route, the UE or vehicle system may experience lack of effective connection due to the delay by the cycle while driving through a few miles with some dead zones of cellular connection. Another example challenge is that the UE cannot automatically reuse the stored or remembered service set identifier (SSID). In this instance, even if the UE stores a hotspot name from a service provider, it may not auto-connect in another dead zone, unless the new set of hotspots carry the same or similar names.

DETAILED DESCRIPTION

In the detailed description to follow, for ease of understanding, the present disclosure will be presented in the context of the AECC system being developed. However, the present disclosure is not limited to AECC compliant system only, and may be practiced in any Automotive Edge Computing (AEC) and/or MEC system in general. In the AECC system being developed, a vehicle User Equipment (vUE) may access services from a Mobility Service Provider (MSP) center server via one of a plurality of MSP edge servers with proper authorizations, each of which are communicatively coupled with a respective network. Each network may utilize different RATs and/or may be operated by different mobile network operators (MNOs). The vUE may be, include, or be a part of a vehicle system or a communication system integrated into a vehicle system. The vUE may also be a mobile UE that is being used by a user or a vehicle in assisting intelligent driving, navigating, or like activities. The user may, e.g., be a walking/moving pedestrian or a cyclist. The MSP center server may be or represent, for example, a service provider platform, a cloud computing service, or the like. The MSP edge servers may be one or more application servers, Content Delivery Network (CDN) servers, MEC servers/hosts, or some other like server deployed at the "edge" of a network. In other words, the AECC system sits on top of an existing network access technology (e.g., LTE, 5G/NR, WiFi/DSRC, etc.). In embodiments, an MEC driving assistance (DA) application via an MEC system provides wireless connection-based and/or connection-considered routing to ensure wireless connectivity from accessible providers.

I. AUTOMOTIVE EDGE COMPUTING CONSORTIUM (AECC) ASPECTS

Figure 1:
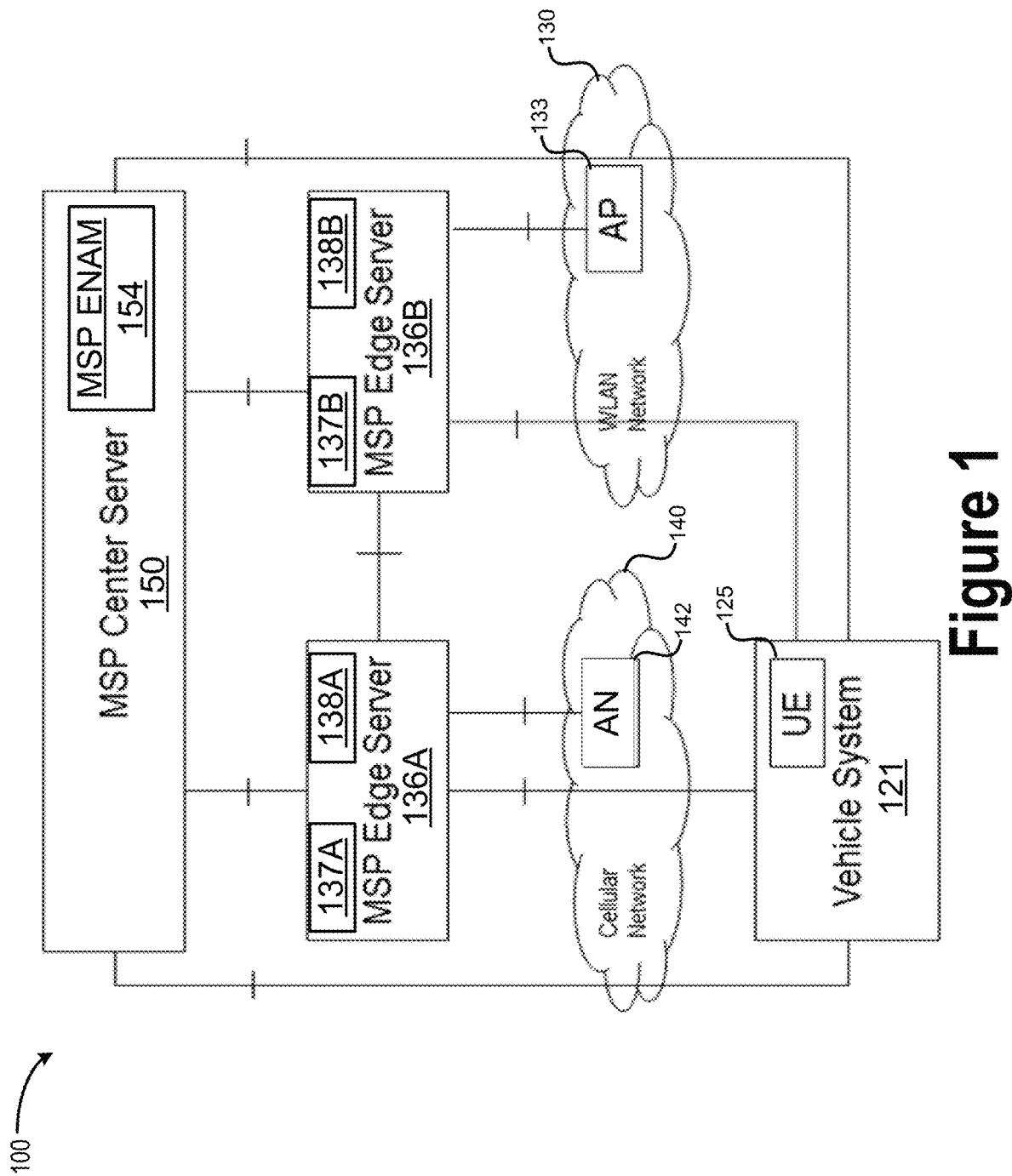
FIG. 1 illustrates an example Automotive Edge Computing Consortium (AECC) distributed cloud (or edge) computing architecture according to various embodiments.

Referring now to FIG. 1, which illustrates an example AECC system 100 according to various embodiments. The AECC system 100 may be built on a distributed computing and networking architecture, which includes the vehicle system 121; one or more networks including the cellular network 140, the wireless local area network (WLAN) 130, a Mobility Service Provider (MSP) enterprise network (not shown by FIG. 1); and MSP servers including the MSP center server 150 and the MSP edge servers 136A and 136B (collectively referred to as "MSP edge servers 136" or "MSP edge server 136"). MSP edge servers 136A and 136B are respectively disposed at an edge of a communication network. For the purposes of the present disclosure, the "edge" of the communication network refers to the outermost part of a communication network that a client or user equipment connects to, and does not include the client or user equipment itself. In some embodiments, the AECC system 100 may be a cloud computing service or MEC service used to run applications as needed.

As shown by FIG. 1, the MSP center server 150 is connected with individual MSP edge servers 136 via respective MCE-If reference points (discussed in more detail infra). In embodiments, the MSP center server 150 may include network interface circuitry (e.g., user application lifecycle management (LCM) proxy 325 of FIG. 3) coupled with processing circuitry (e.g., application circuitry 305 of FIG. 3). The network interface circuitry may be arranged to communicatively couple the MSP center server 150 with the plurality of MSP edge servers 136. The processing circuitry is arranged to operate an MSP edge node allocation module (ENAM 154), which is an entity that manages data session and service continuity, and in our case, driving assistance related data sessions and service continuity, for the vehicle system 121 (or vUE 125) across multiple MSP edge servers 136 in a multi-radio access technology (RAT) environment, such as AECC system 100. For example, the processing circuitry may operate the MSP ENAM 154 to select an individual MSP edge server 136 of the plurality of MSP edge servers 136 to which traffic, computational tasks, and/or workloads of an individual vehicle system 121 (or vUE 125) should be offloaded, provision the individual vehicle system 121 (or vUE 125) with edge server information of the selected MSP edge server 136, provision the selected MSP edge server 136 with vehicle system 121 (or vUE 125) information, and handle/control MSP edge server 136 handover operations. The selection of an individual MSP edge server 136 is based on receipt of an access network selection message and/or an access network reselection message from the vehicle system 121 (or vUE 125), and/or the compute capabilities of the MSP edge servers 136 or the services provided by the MSP edge servers 136. In some implementations, the MSP center server 150 may be a content delivery network (CDN), a cloud service provider, and/or some other distributed computing platform.

Each of the plurality of MSP edge servers 136, as described earlier, are disposed at an edge of a corresponding communication network, and are arranged to provide network services and/or computing resources (e.g., computational task and/or workload offloading, cloud-computing capabilities, information technology (IT) services, and other like resources and/or services as discussed infra) in relatively close proximity to vehicle systems 121 and/or vehicle user equipment (vUEs) 125. In embodiments, the MSP center server 150 may include processing circuitry (e.g., application circuitry 305 of FIG. 3) and network interface circuitry (e.g., user application LCM proxy 325 of FIG. 3) coupled with the processor circuitry. The network interface circuitry may be arranged to communicatively couple each MSP edge server 136 with a respective access network (e.g., cellular network 140 and WLAN network 130 in FIG. 1). In FIG. 1, the MSP edge server 136A is coupled with the cellular core network (not shown) that includes a plurality of access nodes (AN) 142, and MSP edge server 136B is coupled with the access point (AP) 133 in the WLAN 130. Although FIG. 1 shows a one-to-one correspondence between MSP edge servers 136 and access networks, in some implementations, one or more MSP edge servers 136 may be communicatively coupled with multiple access networks. In some embodiments, the MSP edge servers 136 are coupled with a plurality of cellular networks 140 and/or WLAN networks 130. The vehicle system 121 and/or the vUE 125 may need proper authorization or subscription to be communicatively connected to any of the cellular networks 140 and the WLAN networks 130, and consequently use corresponding wireless services provided by one or more of those networks 140 and 130. Details regarding the authorization and subscription is to be discussed further with respect to FIGS. 4-5. In some implementations, the MSP edge servers 136 may be edge computing servers, such as MEC servers CDN servers, application servers, and/or other like infrastructure equipment.

Figure 3:
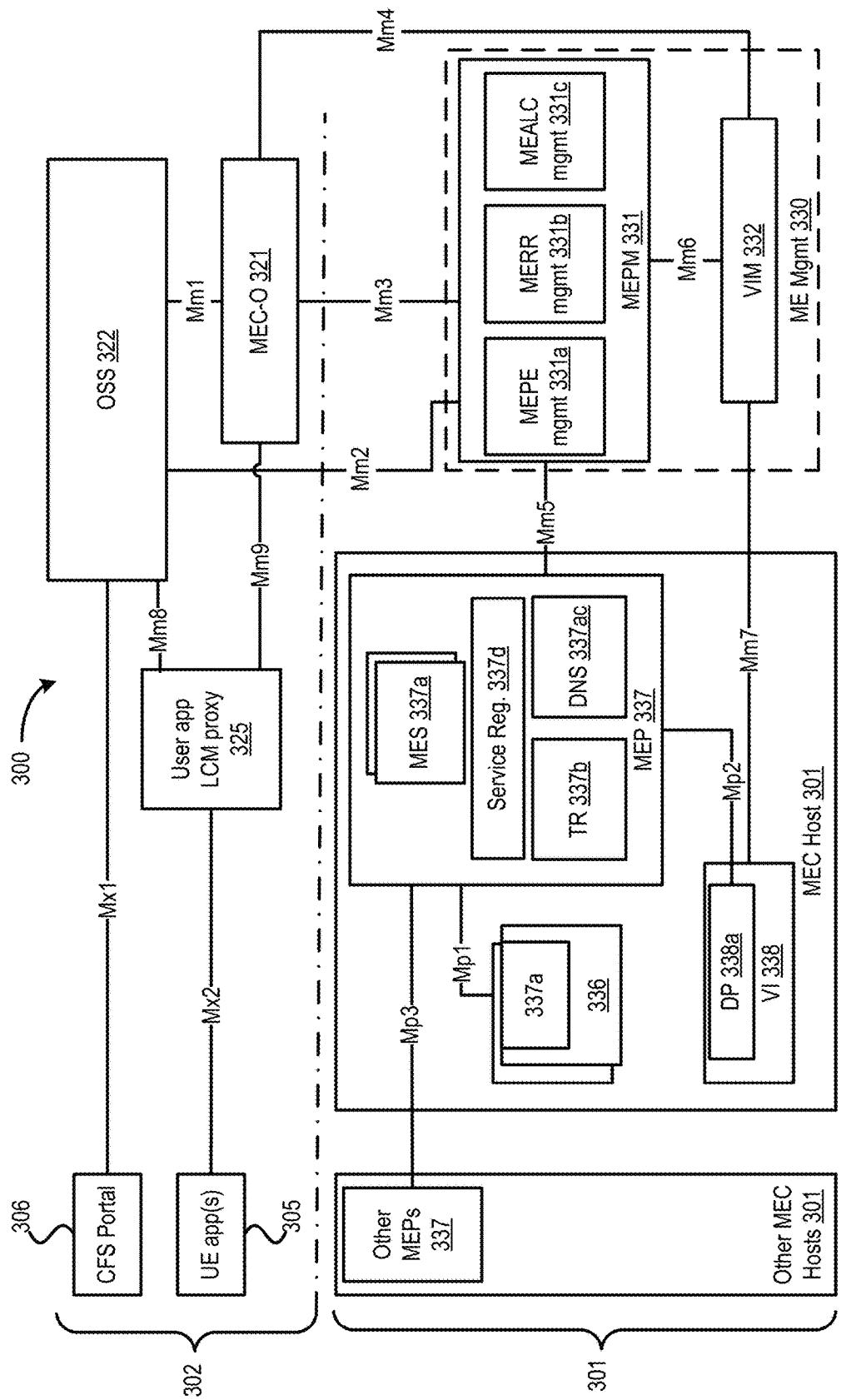
FIG. 3 illustrates an example MEC system architecture in accordance with various embodiments.

Each of the MSP edge servers 136 are also connected with the vehicle system 121 based on proper authorization and/or subscription via the network interface circuitry (e.g., user application LCM proxy 325 of FIG. 3). In addition, the MSP edge servers 136 are connected with each other. Furthermore, the MSP center server 150 may be connected with the vehicle system 121 via respective networks 140 and 130. Although not shown by FIG. 1, the AECC system 100 may serve multiple vehicle systems 121.

The vehicle system 121 may be or may include a vehicle UE ("vUE") 125 capable of attaching to one of the networks 130 and 140, and communicating with the MSP edge servers 136 over the cellular network 140 and/or the WLAN 130. In some embodiments, the vehicle system 121 or the vUE 125 may include or operate on a mobile communications module ("Mobile Comms Module") (not shown by FIG. 1), which is an application running in the vehicle system 121 (or vUE 125) that has the capability to interact with the MSP servers 150, 136 and/or other elements/devices in the AECC system 100. For example, in some embodiments, the vUE 125 may include baseband circuitry (e.g., baseband circuitry 1210 of FIG. 12) arranged to operate at least one wireless communication protocol entity to perform an attachment procedure to attach to an access network, and the vehicle system 121 or the vUE 125 may include application circuitry (e.g., application circuitry 1205 of FIG. 12) communicatively coupled with the baseband circuitry. The application circuitry may be arranged to operate the Mobile Comms Module (also referred to as an "edge networking application" or the like) to register with the MSP center server 150 for accessing computational resources and/or edge networking services from the MSP edge server(s) 136. In some implementations, the Mobile Comms Module may be an internet layer or application layer entity (or application) that operates on top of the access network technology (or control plane protocol stack), which is operated by the vUE 125 to attach to the cellular network 140 or the WLAN 130. In MEC implementations (e.g., where at least the MSP servers 136 are MEC servers), the Mobile Comms Module may be a device application, a client application, or a combination thereof. In some implementations, vUE 125 may include multiple baseband chips for connecting with individual access networks. For example, the vUE 125 may include a cellular network baseband System-on-Chip (SoC) for attaching to and receiving network connectivity from cellular network 140 and a WiFi based baseband SoC for attaching to and receiving network connectivity from WLAN 130. In another example, the vUE 125 may include a first cellular network baseband SoC associated with a first mobile network operator (MNO) and a second cellular network SoC associated with a second MNO different than the first MNO. In another example, the vUE 125 may include a cellular network baseband SoC configured with a first subscriber identity module (SIM) associated with a first MNO used to connect with and receive network services from a first cellular network, and the cellular network SoC may be configured with a second SIM associated with a second MNO different than the first MNO in order to connect with and receive network services from a second cellular network.

The cellular network 140 may be a $5^{th}$ generation (5G) or New Radio (NR) cellular network where the AN 142 is connected with a 5G core network (5GC), or the cellular network 140 may be a Long Term Evolution (LTE) cellular network where the AN 142 is connected with an evolved packet core (EPC). In some implementations, the cellular network 140 may be a non-standalone NR deployment, such as Evolved Universal Mobile Telecommunications Service Terrestrial Radio Access (E-UTRA)-NR Dual Connectivity (EN-DC) wherein the vUE 125 is connected to one evolved nodeB (eNB) that acts as a master node (MN) and one 5G or next generation nodeB (gNB) that acts as a secondary node (SN); NG-RAN E-UTRA-NR Dual Connectivity (NGEN-DC) wherein the vUE 125 is connected to one next generation eNB (ng-eNB) that acts as an MN and one gNB that acts as a SN; and NR-E-UTRA Dual Connectivity (NE-DC) wherein the vUE 125 is connected to one gNB that acts as an MN and one ng-eNB that acts as an SN. The vUE 125 uses an NR-Uu radio interface when the cellular network 140 is an NR/5G network, and the vUE 125 uses an LTE-Uu radio interface when the cellular network 140 is an LTE network.

The WLAN 130 may be a WiFi access technology based on the IEEE 802.11 standard or may be a 3GPP-based access technology (e.g., NR millimeter wave (mmWave) carriers). In some implementations, the WLAN 130 may connect to the AN 142 and/or connect to an internet service provider (ISP) network. In some implementations, the vUE 125 may connect to an MSP enterprise network (not shown by FIG. 1), which may be a WiFi (IEEE 802.11) network or use a 3GPP-based access technology. In such implementations, the MSP enterprise network may include its own core network based on proprietary technology or 3GPP based core network technology. In some implementations, the MSP enterprise network may be a dedicated core network (DCN) or a Network Slice Subnet Instance (NSSI) comprising dedicated CN entities or network functions for carrying out various MSP functionality.

Data pre-processing is (or is also) done in the MSP edge servers 136 that communicate with the vehicle system 121 with other MSP edge servers 136. The MSP edge servers 136 may be deployed or located at suitable locations within the AECC system 100 (referred to as the network edge) where the balance between performance, efficiency, and availability is dependent on the particular use case, and may be different from embodiment to embodiment. Each of the MSP edge servers 136 includes a respective control plane (CP) module 137 (e.g., CP module 137A in MSP edge server 136A and CP module 137B in MSP edge server 136B) and respective data plane (DP) modules 138 (e.g., DP module 138A in MSP edge server 136A and DP module 138B in MSP edge server 136B). The CP modules 137 may be software elements (e.g., engines, modules, objects, or other like logical units) that, when executed by suitable processing device(s) of a corresponding MSP edge server 136, perform functions for handling provisioning of UE information by the MSP center server 150; for subscribing to a suitable network function(s) (NF(s)) in the cellular network 140 and/or the WLAN 130 for notifications regarding network (NW) and/or vehicle system 121/vUE 125 related events, as well as handling received event notifications from the suitable NF(s); and for handling MSP edge server handover (HO) related procedures/operations. The DP modules 138 may be software elements (e.g., engines, modules, objects, or other like logical units) that, when executed by suitable processing device(s) of a corresponding MSP edge server 136, perform functions for performing background data transfers between the corresponding MSP edge server 136 and the vehicle system 121/vUE 125. Although not shown by FIG. 1, the vehicle system 121 (or the vUE 125) may also include its own DP module for performing background data transfers with an MSP edge server 136.

The MSP edge server 136A communicates with the cellular network 140 or the AN 142 (e.g., one or more network elements within the AN, such as a user plane function (UPF), Service Capability Exposure Function (SCEF), Network Exposure Function (NEF)) via the MNW-If. In some implementations, the MNW-If may correspond to a T8 reference point or the SGi reference point when the AN 142 is an EPC, or the MNW-If may correspond to the N33 reference point (e.g., Nnef service-based interface) or the N6 interface/reference point when the AN is a 5GC. For the WLAN 130, the MNW-If may be some other suitable proprietary interface.

As discussed previously, the MSP center server 150 is communicatively coupled with MSP edge servers 136, the MSP center server 150 is communicatively coupled with the vehicle system 121, the MSP edge servers 136 are communicatively coupled with the vehicle system 121, the MSP edge servers 136 are communicatively coupled with a respective access network (or network element), and the MSP edge servers 136 are communicatively coupled with one another. All the above mentioned communicative couples are via various reference points/interfaces. For the purposes of the present disclosure, a reference point represents the interaction that exists between two or more elements described by a point-to-point reference point between any two elements. Communications taking place over a reference point may be direct (where no intermediate nodes are involved) or indirect (where at least one intermediate node is involved). The direct communication over a reference point may be based on a consumer (or subscriber)/producer model where a consumer is configured with a producer's profile and directly communicates with that producer. The indirect communication over a reference point may also be based on a consumer (or subscriber)/producer model where a consumer queries an intermediate node, selects an end point (or termination point), and the consumer sends the request to the selected producer via the intermediate node. In various embodiments, these reference points/interfaces may operate on top of an existing wired/wireless communication protocol, such as those discussed herein or one or more proprietary communication protocols. Moreover, the vehicle system 121 (or vUE 125) can use multiple cellular networks and/or WLANs operated by different MNOs as is shown by FIG. 2.

Figure 2A:
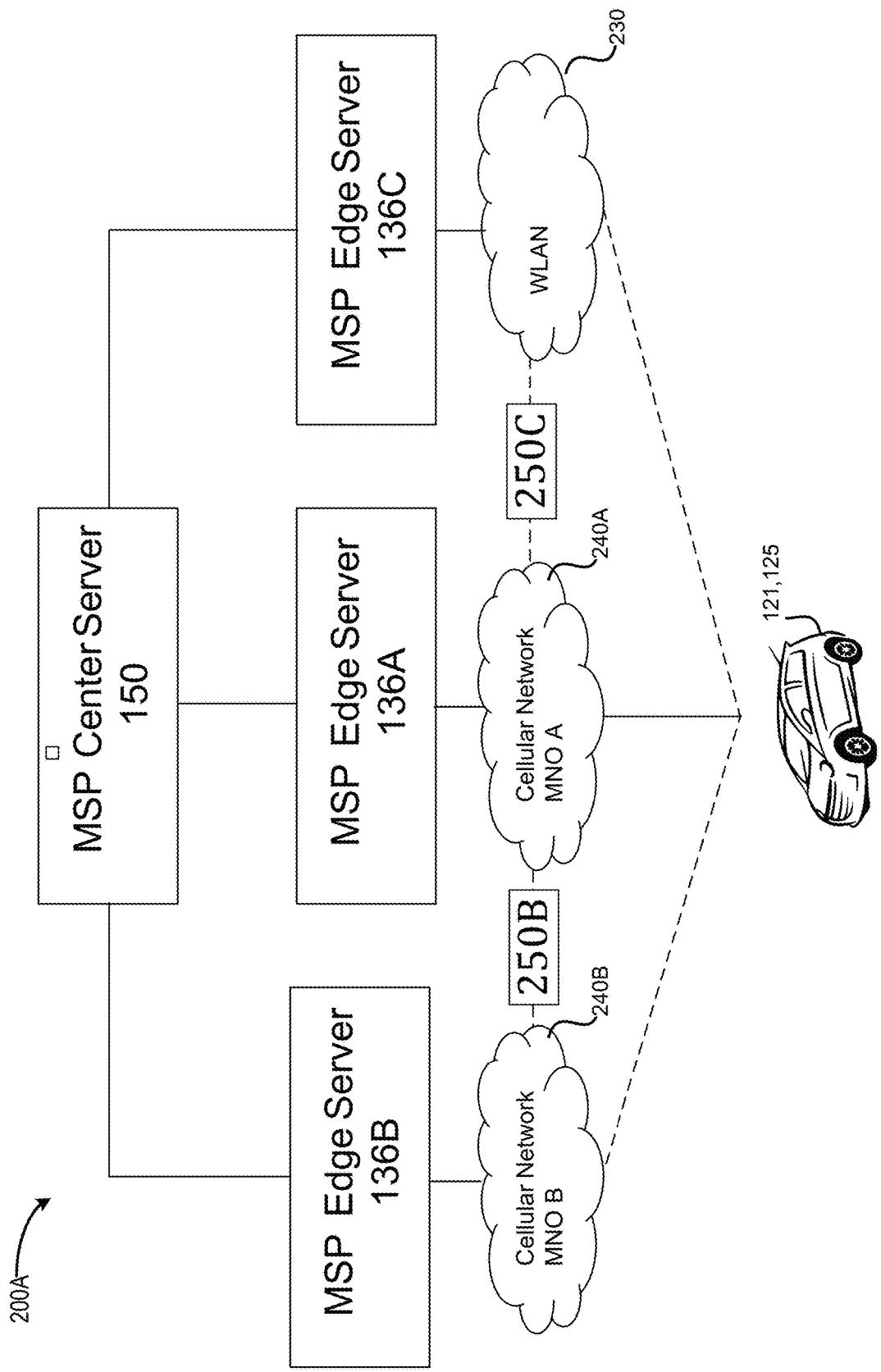
FIG. 2A illustrates another example of the AEC distributed cloud (or edge) computing architecture according to various embodiments.

FIG. 2A illustrates an example of an autonomous edge computing (AEC) system 200A in driving assistance (DA), according to various embodiments. In this example, the vehicle system 121 or vUE 125 communicates with an MSP Edge Server 136A via a cellular network 240A associated with a mobile network operator (MNO) A. The vehicle system 121 and vUE 125 may be standalone devices, subsystems, and/or systems. The vehicle system 121 and vUE 125 may also be mounted/integrated as an individual device/subsystem/system, or a part of a vehicle. Additionally or alternatively, the vUE 125 may be a mobile UE used by a user. The vUE 121 and the vehicle system 125 may perform various embodiments herein together to achieve various goals in DA, navigation and/or like services. The vehicle system 121 and vUE 125 are collectively referred to as "vUE" to simply below discussions. The vUE 121/125 may initiate a DA application. The DA application refers to any applications, programs, and/or services designed for, but not limited to, DA, inter-vehicle services, intravehicular services, and navigation assistance. The driving refers to various forms of transportation from a location to another location, including but not limited to vehicle driving, bicycling, walking/running, and aviation. The AEC system 200A may also be used in other wireless involved services, including but not limited to eCommerce, security services, small cell communications, entertainment services, and various navigation services. To simplify discussions herein, only "driving assistance (DA) application" is used throughout the discussions, but it is noted that all the above-mentioned applications can be implemented with the described technologies.

In some embodiments, the vUE 121/125 is a subscribed user of the MNO A. A plurality of access nodes (ANs) are disposed to cover a geographic region so that a subscribed user can access one or more cellular networks operated by the MNO A. The MNO A may be a primary cellular service provider to the vUE 121/125. The cellular networks include, but are not limited to, 2G, 3G, 4G, 5G, LTE, LTE-A, NR and 6G networks. However, there may be one or more geographic areas (also referred to as "pockets") in a region that are lack of coverage provided by the MNO A, due to lack of ANs. Further, there may be one or more geographic areas/pockets in the region that can only provide sub-quality coverages and/or services. For example, a vUE may only receive weak cellular signals with low power levels in certain areas due to scarce AN allocations and/or interference. Such a weak or no cellular service area is referred to as a dead zone for the vUE with respect to the CN.

In embodiments, the vUE 121/125 may determine to travel from a geographic location A to another geographic location B. The vUE may request or trigger a DA application to provide a route from the geographic location A to the geographic location B based on some algorithm of the application. The route needs to be geographically possible with accessible roads. Such a geographic route may be provided by the DA application or one or more third-party applications. It is preferred that the vUE would have wireless connections throughout the route so that the driving assistance application can provide real-time driving assistance during the trip from the geographic location A to the geographic location B. For example, the DA application may update, modify, or change an existing route based on real-time road/traffic condition feedback. Thus, the DA application determines a route based at least in part on the accessibility of the cellular networks and/or WLANs. Such a route is referred to as a connectivity-considered route. More details regarding various approaches in route determination are to be discussed infra with respect to FIGS. 4 and 5.

In some embodiments, the vUE 121/125 may go through certain areas with weak or no cellular connections. An area of weak cellular connection refers to an area that the vUE cannot receive sufficient signals of to carry out communications with corresponding ANs. For example, the sufficiency of the signals can be determined based on quality of the signal, which can be the power levels of the signals received by the vUE, or some other factors. The power level may be based on any cellular network standards (e.g., LTE, 5G NR, etc.) or any particular values adopted by the MNO A. Such a power level may also be determined based on a service level agreement (SLA) between the MNO and the vUE. The SLA may provision whether the UE should have a minimum level of service contract with the MNO A as to connect to a respective AP or AN of a wireless service provider. The SLA may be application specific. For example, the DA application may have a higher requirement for signal quality to ensure reliability of the service. For those areas of weak or low cellular connections, the DA application may determine one or more supplement or alternative wireless connections that are either provided by a WLAN or another MNO, based on collected network information with respect to individual networks. For example, the DA application has information of one or more WLANs 230 regarding their respective services. Such a service may include, but is not limited to, information regarding its coverage area, availability to certain vUEs, associated SLAs, associated AP locations, and billing information. Such information of a respective WLAN 230 is provided by the WLAN 230 via some registration, which is discussed infra. Thus, it is beneficial if the DA application can arrange such wireless connections based on a prediction of the vUE's arrival and potential usage of the WLAN 230. Similarly, the DA application may collect service/access information of other cellular network(s) 240B as well.

In some embodiments of the example of FIG. 2A, the vUE 121/125 requests the DA application via the cellular network (CN) A, as the MNO A is a primary cellular service provider for the vUE. Once the DA application determines one WLAN supplement service is needed in a certain area for completing a particular route, the DA application or the MNO A 240A may request an authorization from the supplement WLAN 230 via an authorization configuration or procedure 250C, which is discussed infra with respect to FIG. 4. More than one WLAN service may be configured for the vUE in the same or a substantially similar fashion. One or more cellular MNO B may also be configured for the vUE in the same or a substantially similar fashion via 250B. With successful authorizations 250B and/or 250C, the vUE is subscribed to the wireless services provided by respective WLAN(s) 230 and/or cellular network(s) 240B prior to arriving to the corresponding areas. In some embodiments, the vUE may request an access to the wireless network prior to its arrival via the CN 240A while the vUE still has a good wireless connection with the CN 240A. Various access and request approaches are discussed infra with respect to FIG. 4.

In an alternative embodiment, each MNO hosts (and eventually or potentially owns) individual MSP edge servers 136 so that the layered architecture of FIGS. 1 and 2A comprises three MSP edge servers 136 (e.g., MSP edge server 136 A/B/C) connected with one higher level MSP center server 150. This is because, in some cases, MNOs may have already deployed edge computing technology in their networks. In another embodiment, only one MNO deploys edge computing systems, while the other MNO and/or WLAN only provide connectivity to an MSP edge server 136.

In embodiments, the AECC system 100 and the AEC system 200A may be utilize or provide distributed computing on localized networks, where several localized networks accommodate the connectivity of the vUE 121/125 in their respective areas of coverage. A localized network is a local network that covers a limited number of connected vUEs in a certain area. This splits the huge amount of data traffic into reasonable volumes per area of data traffic between vehicles and the cloud. In these embodiments, the MSP center server 150 may be in a cloud computing environment, and each localized network may include an access network and one or more MSP edge servers 136. In the example of FIG. 2A, a first localized network may include the MSP edge server 136A and CN 240A, a second localized network may include the MSP edge server 136B and cellular network 240B, and a third localized network may include the MSP edge server 136C and the WLAN 230. Computation power is added to these localized networks to enable them to process local data, allowing connected vehicles to obtain responses in a timely fashion. In these implementations, the MSP edge servers 136 provide distributed computing services and/or act as local data integration platforms, where computational resources are geographically distributed within the vicinity of one or more localized networks. This reduces the concentration of computation and shortens the processing time needed to conclude a transaction with a connected vehicle. Local data integration platforms integrate local data by utilizing a combination of one or more localized networks and distributed computation. By narrowing relevant information down to a specific area, data can be rapidly processed to integrate information and notify connected vehicles in real time.

Distributed computing on localized networks also encompasses edge computing technology. In automotive use cases, edge computing technology provides an end-to-end system architecture framework that enables distribution of computation processes over localized networks. The edge computing technology used for distributed computing on localized networks includes networking technology to split data traffic into several localities that cover a number of connected vUE 121/125. The computational resources in the edge computing technology are hierarchically distributed and layered in a topology-aware fashion to accommodate localized data and to allow large volumes of data to be processed in a timely manner. In this infrastructure framework, localized data collected via local networks and wide area data stored in the cloud are integrated in the edge computing architecture to provide real-time information necessary for the services of connected vUE. In the context of edge computing for automotive, the "edge" may refer to the hierarchically distributed non-central clouds where computation resources are deployed, and edge computing technology can be used to provide such a flexible topology-aware cloud infrastructure.

Figure 2B:
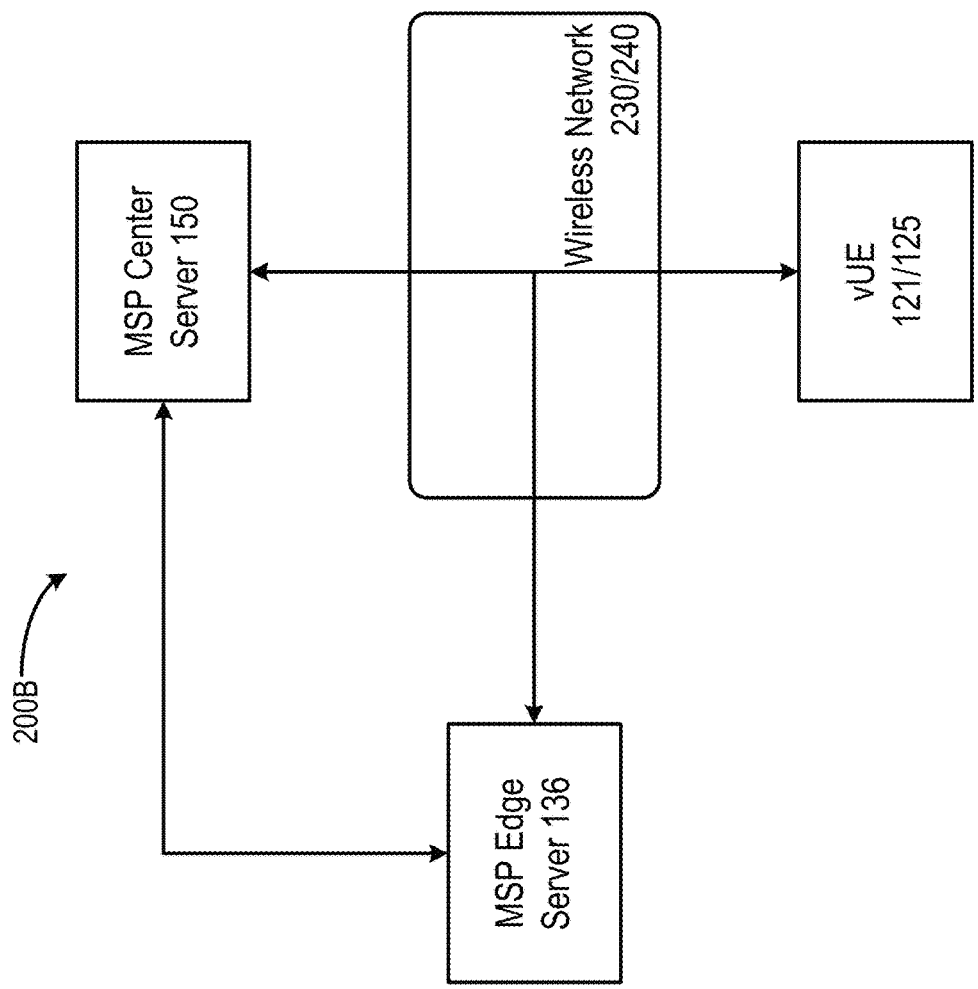
FIG. 2B illustrates another example of the AEC distributed cloud (or edge) computing architecture according to various embodiments.

Referring to FIG. 2B, which illustrates another example AEC system 200B, the MSP edge servers 136 are connected to the MSP center server 150 via an Enterprise Network as defined in the AECC distributed computing architecture reference model. According to the deployment of MSP edge server 136 instances, the data offloading points may be selected at appropriate places in the wireless network 230/240 to meet the service requirements on latency and capacity. In FIG. 2B, like numbered elements are the same as discussed previously with respect to FIGS. 1 and 2A.

FIG. 3 illustrates an example MEC system architecture 300 in accordance with various embodiments of AEC and/or AECC systems illustrated in FIGS. 1/2A/2B. The MEC system 300 of FIG. 3 is an example embodiment of a system architecture of the MEC system 735 of FIG. 7 discussed infra with respect to a DA application. The illustrated logical connections between various entities of the MEC architecture 300 may be access-agnostic and not dependent on a particular deployment. MEC enables implementation of MEC applications ("MEC apps" or "MEAs") 336 as software-only entities that run on top of a Virtualization Infrastructure (VI) 338, which is located in or close to the network edge, e.g., the DA application. A MEC app 336 is an application that can be instantiated on a MEC host 301a within the MEC system 300 and can potentially provide or consume MEC services 337a. The term "user application" in the context of MEC refers to an MEA 336 that is instantiated in the MEC system 300 in response to a request from a user (e.g., vUE 121/125) via a device application. FIG. 3 shows the general entities involved, and these entities can be grouped into multi-access edge system level 302, multi-access edge host level 301, and network level entities (not shown). The multi-access edge host level 301 includes MEC servers and multi-access edge (ME) management (mgmt) 330, which provide functionality to run MEAs 336 within an operator network or a subset of an operator network. The multi-access edge system level 302 includes multi-access edge system level 302, vUE, and third party entities. The network level (not shown) includes various external network level entities, such as a 3GPP network (e.g., CN 240 of FIG. 2A), a local area network (e.g., a LAN, WLAN, PAN, etc.), and an external network (e.g., CN 240A and/or a cloud). The multi-access edge host level 301 includes multi-access edge host level management and MEC server. The multi-access edge host level management may include various components that handle the management of the multi-access edge specific functionality of a particular MEC platform (MEP)

337, MEC server, and the MEAs 336 to be run. The MEC server includes the MEP 337, MEAs 336, and VI 338.

The MEC system 300 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 300 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 301a is an entity that contains an MEP 337 and VI 338 that provides compute, storage, and network resources for the purpose of running MEAs 336. The VI 338 includes a data plane (DP) 338a that executes the traffic rules (TR) 337b received by the MEP 337, and routes the traffic among applications (e.g., MEAs 336), ME services (MESs) 337a, DNS server/proxy (see, e.g., via DNS handling entity 337c), 3GPP network, local networks, and external networks. The MEC DP 338a may be connected with the (R)AN nodes of the CN 240A/240B of FIG. 2A or the like.

The MEP 337 within the MEC server may be a collection of essential functionality required to run MEAs 336 on a particular VI 338 and enable them to provide and consume MESs 337a, and that can provide itself a number of MEC services. The MEP 337 can also provide various services and/or functions, such as offering an environment where the MEAs 336 can discover, advertise, consume and offer MESs 337a (discussed infra), including MESs 337a available via other platforms when supported. The MEP 337 may be able to allow authorized MEAs 336 to communicate with third party servers located in external networks. The MEP 337 may receive traffic rules from the multi-access edge platform manager (MEPM) 331, applications, or services, and instruct the data plane accordingly (see e.g., Traffic Rules Control 337b also referred to as filtering roles control module 337b). The MEP 337 may send instructions to the DP 338a within the VI 338 via the Mp2 reference point. The Mp2 reference point between the MEP 337 and the DP 338 of the VI 338 may be used to instruct the DP 338a on how to route traffic among applications, networks, services, etc. In some implementations, the MEP 337 may translate tokens representing UEs in the traffic rules into specific IP addresses. The MEP 337 also receives DNS records from the MEPM 331 and configures a DNS proxy/server accordingly. The MEP 337 hosts MESs 337a including the multi-access edge services discussed infra, and provide access to persistent storage and time of day information. Furthermore, the MEP 337 may communicate with other MEPs 337 of other MEC servers via the Mp3 reference point.

The VI 338 may represent the totality of all hardware and software components that build up the environment in which MEAs 336 and/or MEP 337 are deployed, managed and executed. The VI 338 may span across several locations, and the network providing connectivity between these locations is regarded to be part of the VI 338. The physical hardware resources of the VI 338 includes computing, storage and network resources that provide processing, storage and connectivity to MEAs 336 and/or MEP 337 through a virtualization layer (e.g., a hypervisor, VM monitor (VMM), or the like). The virtualization layer may abstract and/or logically partition the physical hardware resources of the MEC server as a hardware abstraction layer. The virtualization layer may also enable the software that implements the MEAs 336 and/or MEP 337 to use the underlying VI 338, and may provide virtualized resources to the MEAs 336 and/or MEP 337, so that the MEAs 336 and/or MEP 337 can be executed.

The MEAs 336 are applications that can be instantiated on a MEC host/server 301a within the MEC system 300 and can potentially provide or consume MESs 337a. The term "MEC service" or "MES" refers to a service provided via the MEP 337 either by the MEC platform 337 itself or by a MEC application 336. MEAs 336 may run as VM on top of the VI 338 provided by the MEC server, and can interact with the MEP 337 to consume and provide the MESs 337a. The MEAs 336 are instantiated on the VI 338 of the MEC server based on configuration or requests validated by the ME management 330. In some embodiments, the MEAs 336 can also interact with the MEP 337 to perform certain support procedures related to the lifecycle of the MEAs 336, such as indicating availability, preparing relocation of user state, etc. The MEAs 336 may have a certain number of rules and requirements associated to them, such as required resources, maximum latency, required or useful services, etc. These requirements may be validated by the multi-access edge system level management 330, and can be assigned to default values if missing. MESs 337a may be services provided and consumed either by the MEP 337 or MEAs 336. When provided by an application, an MES 337a can be registered in a list of services 337d to the MEP 337 over the Mp1 reference point. Additionally, the MEAs 336 can subscribe to one or more services 337a for which it is authorized over the Mp1 reference point.

The MEC system 300 may support a feature called UserApps. When the MEC system 300 supports the feature UserApps, the multi-access edge management may support the instantiation of MEAs 336 (or user applications) on multiple MEC servers following a single instantiation request, and when required by the operator in response to a request by the user. In our driving assistance related application, the UserApps may refer to a DA application. The application instance may need to fulfil a number of potential constraints predefined for the application. Once instantiated, connectivity may be established between the vUE 121/125 and the application instance. Potential constraints may include latency, location, compute resources, storage resources, network capability, security conditions, any DA related constraints, and the like. As part of the user application (or MEC app 336) instantiation, the MEC system 300 will create an associated application context that the MEC system 300 maintains for the lifetime of the user application (or MEC app 336). The application context is a set of reference data about an application instance that is used to identify it, enable lifecycle management operations and associate it with its device application. The term "user context" in the context of MEC refers to application-specific runtime data maintained by an MEC app 336, which is associated with a user of that application. The application context contains information specific to the application instance such as its unique identifier within the MEC system 300 and the address (e.g., URI or the like) provided for clients (e.g., vUE 121/125) that are external to the MEC system 300 to interact with the user application.

When the MEC system 300 supports the feature UserApps, the system 300 may, in response to a request by a user, support the establishment of connectivity between a UE and an instance of a specific MEA 336 fulfilling the requirements of the MEA 336 regarding the UE (e.g., vUE 121/125). If no instance of the MEA 336 fulfilling these requirements is currently running, the multi-access edge system management may create a new instance of the application on an MEC host 301a that fulfils the requirements of the application. Once instantiated, connectivity shall be established between the UE and the new MEA 336 instance. Requirements of the application can include latency, location, compute resources, storage resources, network capability, security conditions, and the like. When the MEC system 300 supports the feature UserApps, the system 300 may support the on-boarding of MEAs 336 during the execution of an instantiation request, may allow the establishment of connectivity between a UE and a specific instance of an MEA 336, may support the capability to terminate the MEA 336 instance when no UE is connected to it anymore, and may support the termination of the MEA 336 running on multiple MEC servers following a single termination request.

As shown by FIG. 3, the Mp1 reference point is between the MEP 337 and the MEAs 336. The Mp1 reference point may provide service registration 337d, service discovery, and communication support for various services, such as the MESS 337a. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MESS 337a include Radio Network Information Service (RNIS), location services, and bandwidth management services. The RNIS, when available, provides authorized MEAs 336 with radio network related information, and exposes appropriate up-to-date radio network information to the MEAs 336. The radio network information (RNI) may include, inter alia, radio network conditions, measurement and statistics information related to the user plane, information related to vUEs served by the radio node(s) associated with the multi-access edge host (e.g., vUE context and radio access bearers), changes on information related to vUEs served by the radio node(s) associated with the multi-access edge host, and/or the like. The RNI may be provided at the relevant granularity (e.g., per vUE, per cell, per period of time).

The service consumers (e.g., MEAs 336 and MEP 337) may communicate with the RNIS over an RNI Application Programming Interface (API) to obtain contextual information from a corresponding RAN. RNI may be provided to the service consumers via an access node. The RNI API may support both query and subscription (e.g., a pub/sub) based mechanisms that are used over a Representational State Transfer (RESTful) API or over a message broker of the MEP 337 (not shown by FIG. 3). A MEA 336 may query information on a message broker via a transport information query procedure, wherein the transport information may be pre-provisioned to the MEA 336 via a suitable configuration mechanism. The various messages communicated via the RNI API may be in XML, JSON, Protobuf, or some other suitable format.

The RNI may be used by MEAs 336 and MEP 337 to optimize the existing services and to provide new types of services that are based on up to date information on radio conditions. As an example, an MEA 336 may use RNI to optimize current services such as video throughput guidance. In throughput guidance, a radio analytics MEA 336 may use MEC services to provide a backend video server (e.g., server(s) 130) with a near real-time indication on the throughput estimated to be available at the radio downlink interface in a next time instant. The throughput guidance radio analytics application computes throughput guidance based on the required radio network information it obtains from a multi-access edge service. RNI may be also used by the MEP 337 to optimize the mobility procedures required to support service continuity, such as when a certain MEA 336 requests a single piece of information using a simple request-response model (e.g., using RESTful mechanisms) while other MEAs 336 subscribe to multiple different notifications regarding information changes (e.g., using a pub/sub mechanism and/or message broker mechanisms).

In various embodiments, a MEC server acting as a master node for distributed machine learning (ML) may access RNI of individual UEs via a MEA 336 and/or the MEP 337 using the RNI API for the purposes of evaluating the channel conditions and/or link quality for partitioning training datasets and/or for assigning computational tasks to the individual UEs. In an example, an application implemented by a MEC entity (e.g., the MEC-Orchestrator 321) may access RNI via an MEA 336 or the MEP 337 using the RNI API.

The location services (LS), when available, may provide authorized MEAs 336 with location-related information, and expose such information to the MEAs 336. With location related information, the MEP 337 or one or more MEAs 336 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs currently served by the radio node(s) associated with the MEC server, information about the location of all UEs currently served by the radio node(s) associated with the MEC server, information about the location of a certain category of UEs currently served by the radio node(s) associated with the MEC server, a list of UEs in a particular location, information about the location of all radio nodes currently associated with the MEC server 301a, and/or the like. The location information may be in the form of a geolocation, a Global Navigation Satellite Service (GNSS) coordinate, a cell identity (ID), and/or the like.

The bandwidth management services (BWMS) provides for the allocation of bandwidth to certain traffic routed to and from MEAs 336, and specifies static/dynamic up/down bandwidth resources, including bandwidth size and bandwidth priority. MEAs 336 may use the BWMS to update/receive bandwidth information to/from the MEP 337. In some embodiments, different MEAs 336 running in parallel on the same MEC host 301a may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

In FIG. 3, multi-access edge management comprises multi-access edge system level management and the multi-access edge host level management 330. The multi-access edge host level management 330 comprises the MEPM 331 and the VI manager (VIM) 332, and handles the management of the multi-access edge specific functionality of a particular MEC server and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEPM 331 is responsible for managing the life cycle of applications including informing the multi-access edge orchestrator (MEC-O) 321 of relevant application related events. The MEPM 331 may also provide MEP element management functions (MEPE mgmt 331a) to the MEP 337, manage MEA rules and requirements (MERR mgmt 331b) including service authorizations, traffic rules, DNS configuration and resolving conflicts, and manage MEA 336 life-cycles (MEALC mgmt 331c). The MEPM 331 may also receive virtualized resources fault reports and performance measurements from the VIM 332 for further processing. The Mm5 reference point between the MEPM 331 and the MEP 337 is used to perform platform configuration, configuration of the MEPE mgmt 331a, the MERR mgmt 331b, the MEALC mgmt 331c, management of application relocation, etc.

The VIM 332 may be an entity that allocates, manages, and releases virtualized (compute, storage and networking) resources of the VI 338, and prepares the VI 338 to run a software image. To do so, the VIM 332 may communicate with the VI 338 over the Mm7 reference point between the VIM 332 and the VI 338. Preparing the VI 338 may include configuring the VI 338, and receiving/storing the software image. For application relocation from/to external cloud environments, the VIM 332 may interact with an external cloud manager to perform the application relocation, for example using the mechanism described in "Adaptive VM Handoff Across Cloudlets," and/or possibly through a proxy. Furthermore, the VIM 332 may communicate with the MEPM 331 via the Mm6 reference point, which may be used to manage virtualized resources, for example, to realize the application lifecycle management. Moreover, the VIM 332 may communicate with the MEC-O 321 via the Mm4 reference point, which may be used to manage virtualized resources of the MEC server 301a, and to manage application images. Managing the virtualized resources may include tracking available resource capacity, etc.

The multi-access edge system level management includes the MEC-O 321 as a core component, which has an overview of the complete MEC system 300. The MEC-O 321 may maintain an overall view of the MEC system 300 based on deployed multi-access edge hosts 301a, available resources, available MESS 337a, and topology. The Mm3 reference point between the MEC-O 321 and the multi-access edge platform manager 331 may be used for the management of the application lifecycle, application rules and requirements and keeping track of available MESS 337a. The MEC-O 321 may communicate with the user application lifecycle management proxy (UALMP) 325 via the Mm9 reference point in order to manage MEAs 336 requested by UE application 305.

The MEC-O 321 may also be responsible for on-boarding of application packages, including checking the integrity and authenticity of the packages, validating application rules and requirements and if necessary adjusting them to comply with operator policies, keeping a record of on-boarded packages, and preparing the VIM(s) 332 to handle the applications. The MEC-O 321 may select appropriate MEC host(s) 301a for application instantiation based on constraints, such as latency, available resources, and available services. The MEC-O 321 may also trigger application instantiation and termination, as well as trigger application relocation as needed and when supported.

The Operations Support System (OSS) 322 refers to the OSS of an operator that receives requests via the Customer Facing Service (CFS) portal 306 (and over the Mx1 reference point) and from UE applications 305 for instantiation or termination of MEAs 336, and decides on the granting of these requests. The CFS portal 306 (and the Mx1 interface) may be used by third-parties to request the MEC system 300 to run applications 305 in the MEC system 300. Granted requests may be forwarded to the MEC-O 321 for further processing. When supported, the OSS 322 also receives requests from UE applications 305 for relocating applications between external clouds and the MEC system 300. The Mm2 reference point between the OSS 322 and the multi-access edge platform manager 330 is used for the multi-access edge platform 330 configuration, fault, and performance management. The Mm1 reference point between the MEC-O 321 and the OSS 322 is used for triggering the instantiation and the termination of multi-access edge applications 336 in the MEC system 300.

The UE app(s) 305 (also referred to as "device applications" or the like) is one or more applications running in a device, computing system, etc. (e.g., vUE 121/125), that has the capability to interact with the MEC system 300 via the user application lifecycle management proxy 325. In the example of DA application, the UE app(s) 305 refers to the DA application for assisting the driving and/or navigating activities. The UE app(s) 305 may be, include, or interact with one or more client applications, which in the context of MEC, is application software running on a device, computing system, etc. that utilizes functionality provided by one or more specific MEC application(s) 336. The user application lifecycle management proxy ("user app LCM proxy") 325 may authorize requests from UE applications 305 in the UE (e.g., vUE 125) and interacts with the OSS 322 and the MEC-O 321 for further processing of these requests. The term "lifecycle management" in the context of MEC refers to a set of functions required to manage the instantiation, maintenance and termination of an MEC application 336 instance. The user app LCM proxy 325 may interact with the OSS 322 via the Mm8 reference point, and is used to handle UE applications 305 requests for running applications in the MEC system 300. A user application 305 may be an MEC app 336 that is instantiated in the MEC system 300 in response to a request of a user. The user app LCM proxy 325 allows UE applications 305 to request on-boarding, instantiation, termination of user applications and when supported, relocation of user applications in and out of the MEC system 300. It also allows informing the UE applications 305 about the state of the user applications 305. The user app LCM proxy 325 is only accessible from within the mobile network, and may only be available when supported by the MEC system 300. A UE application 305 may use the Mx2 reference point between the user app LCM proxy 325 and the UE application 305 to request the MEC system 300 to run an application in the MEC system 300, or to move an application in or out of the MEC system 300. The Mx2 reference point may only be accessible within the mobile network and may only be available when supported by the multi-access edge system.

In order to run an MEA 336 in the MEC system 300, the MEC-O 321 receives requests triggered by the OSS 322, a third-party, or a UE application 305. In response to receipt of such requests, the MEC-O 321 selects an MEC server to host the MEA 336 for computational offloading. These requests may include information about the application to be run, and possibly other information, such as the location where the application needs to be active, other application rules and requirements, as well as the location of the application image if it is not yet on-boarded in the MEC system 300.

In embodiments, the MEC-O 321 coordinates instantiation of an MEC application, which may be a client application that operates on behalf of a UE while performing application duties. Those duties include, but are not limited to, interacting with the MEC services and service functions, and interacting with peer MEC applications.

In various embodiments, the MEC-O 321 selects one or more MEC servers for computationally intensive tasks. The selected one or more MEC servers may offload computational tasks of a UE application 305 based on various operational parameters, such as network capabilities and conditions, computational capabilities and conditions, application requirements, and/or other like operational parameters. The application requirements may be rules and requirements associated to/with one or more MEAs 336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEAs 336 to be able to run; multi-access edge services that the MEAs 336 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's multi-access edge system deployment or mobile network deployment (e.g., topology, cost); requirements on access to user traffic; requirements on persistent storage; traffic rules; DNS rules; etc.

The MEC-O 321 considers the requirements and information listed above and information on the resources currently available in the MEC system 300 to select one or several MEC servers within the MEC system to host MEAs 336 and/or for computational offloading. After one or more MEC servers are selected, the MEC-O 321 requests the selected MEC host(s) 301a to instantiate the application(s) or application tasks. The actual algorithm used to select the MEC servers depends on the implementation, configuration, and/or operator deployment. In various embodiments, the selection algorithm may be based on the task offloading embodiments discussed herein, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 321 may decide to select one or more new MEC servers to act as a master node, and initiates the transfer of an application instance or application-related state information from the one or more source MEC servers to the one or more target MEC servers. An MEC server may be an MSP edge server 136 in FIG. 2A.

Figure 4:
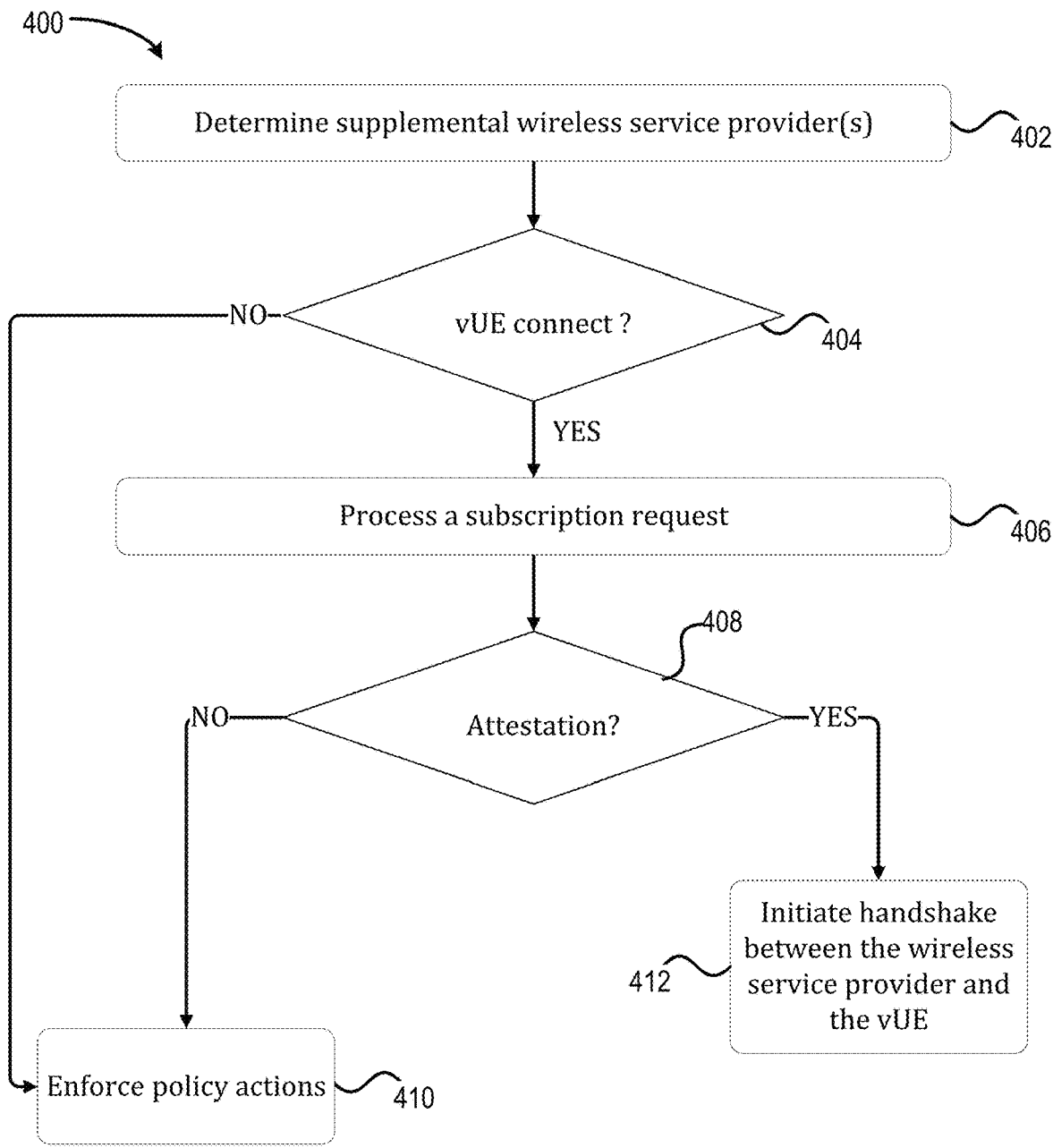
FIG. 4 depicts an example configuration flow/procedure for providing wireless access to a UE or vehicle, according to various embodiments.

Referring now to FIG. 4, which illustrates an example configuration flow/procedure 400 for providing a wireless access (240B or 230) to the vUE 121/125, according to various embodiments. The configuration flow/procedure 400 may be executed by the DA application via the MSP edge server 136A or a like server or client terminal. This configuration flow may occur prior to or during a determination of a geographic route and/or corresponding connectivity-considered route. Configuration flow/procedure 400 begins at operation 402, where the DA application may determine that a wireless access of a provider is needed for the vUE 121/125 in a DA activity. The DA activity may be associated with assisting a user and/or vehicle in traveling from a geographic location A to another geographic location B, or based on a particular geographic route from the geographic location A to the geographic location B. The wireless access may be an access to a cellular access of a particular MNO other than the MNO 240A, a WLAN of a particular provider, or any LAN of its respective service provider or network operator/owner. The WLAN may be a WiFi network or any other like network. A service provider or WLAN provider may be a commercial provider or a private provider that is registered with the DA application via the LCM proxy 325 to provide its wireless service. Such a registration by the provider with the LCM proxy 325 may be pre-registered with regard to the DA application. There may be one or more service level agreements (SLAs) between the LCM 325 and a respective provider with respect to, inter alia, the quality of the wireless service that the respective provider guarantees in certain areas with certain conditions. Each respective provider may require specific methods of billing of its service, such as pay-per-service, monthly fee, metered billing, etc. In some cases, the MNO A also offers free credits to its subscribers to compensate certain lack of services.

When the DA application determines supplemental wireless service provider(s), it may determine based on various considerations. In some embodiments, those considerations include, but are not limited to, quality of service (QoS), bandwidths of the wireless access, latency of the service, cost, SLA, coverage areas, antenna locations/positions, Wi-Fi channels, and reliability of the service. The DA application may consider one or more of the above-mentioned factors or other factors in determining or choosing the supplemental service providers. In some embodiments, the DA may only consider a supplemental provider while the primary CN provider MNO A cannot provide sufficient wireless service and/or coverage in certain area(s) for the vUE. In some other embodiments, the DA may consider a supplemental service provider for other reasons, such as offloading DA associated job(s) from the MNO A. Further details regarding determining a geographic/connectivity-based/considered route is discussed infra with respect to FIG. 5. A connectivity-based route may be determined based in whole or in part on the availability/quality of connectivity. Thus, a connectivity-based route may also be referred to as a connectivity-considered route, i.e., connectivity being one of the factors considered in determining the route. The weight given for connectivity may vary from application to application, user to user, and/or trip to trip.

At operation 404, the DA application determines whether the vUE is wirelessly connected to the MSP edge server 136A via the LCM proxy 325. If the vUE is properly connected, the DA application may allow further operations. If the vUE is not properly connected, the DA application may enforce certain policy-based actions at 410.

At operation 406, the DA application via the MNO A processes a subscription request. The subscription request may be from the vUE for requiring a subscription to the determined supplemental wireless service provider. Additionally or alternatively, the DA application may determine whether the vUE is already a subscriber to the chosen supplemental service provider. If yes, the configuration procedure can move to the operation 408. If the vUE is not a subscriber yet, the DA application may send a request to the vUE. In embodiments, there are various ways to subscribe, which include, but are not limited to, pay-per-service, flat fee, monthly fee, and metered billing.

At operation 408, corresponding attestation(s) is to be performed to the vUE upon successful subscription. One or more various attestations may be performed to authenticate the vUE with respect to the subscription of the wireless service. Certain attestation(s) helps ensure associated billing and/or SLA requirements are resistant to fraud. If the attestation is not successful, the DA application via the MNO A may enforce certain policy actions at operation 410. The attestation may be performed prior to allowing the vUE to access the LCM proxy 325 and/or the MEC-O 321. In some embodiments, it may be required to perform an attestation of its root of trust hardware and its operational state. This may include a description of how it is booted as well as how it is manufactured, according to good manufacturing practices. An attestation may further include information regarding whether the manufacturer has hardened any security sensitive logic, firmware, storage, and execution resources. In some embodiments, MEC services and/or other entities in the MEC system or the underlying computing platforms may be inquired by the MEC-O 321 to provide corresponding attestation evidence to prove the entity is trustworthy and secured.

At operation 410, one or more policy-based actions are to be performed to the vUE and/or the MNO A, due to unsuccessful vUE connection from operation 404 or unsuccessful attestation from operation 408. Those actions include, but are not limited to, preventing or isolating the vUE from further communications with the MEC network and/or the MSP edge server 136A, alerting or sending alert message(s) to the vUE or associated user(s), and alerting or sending alert message(s) to an associated original equipment manufacturer (OEM).

At operation 412, the DA application via the MNO A initiates a handshake between the wireless provider and the vUE. One or more access points (APs) may be determined to be used for vUE access based on the information provided by the wireless service provider. Thus, the DA application can initiate the handshake with one selected AP according to the connectivity-considered route. This initiation can be performed without manual or user involved intervention as long as appropriate credentials are provided. The vUE can also initiate the handshake with provisioned credentials. In some embodiments, if Access Network Query Protocol (ANQP) and/or Generic Advertisement Service (GAS) are supported by the 802.11u, the vUE is able to broadcast a unique identity so that the one or more APs may use the broadcast identity to negotiate a zero-touch connection.

In embodiments, once the vUE is authenticated and corresponding SLA is verified, the vUE can initiate the handshake prior to arriving to a dead zone that requires the supplemental wireless service. The vUE can initiate a query with the MNO A when it is approaching or in the proximity of the dead zone. The corresponding supplemental wireless service provider may or may not be within a direct reach by the vUE.

In some embodiments, the DA application determines or recognizes one or more APs for supplementing or replacing the CN service provided by the MNO A while the vUE is approaching a dead zone of the MNO A. The determination of the APs is based on an estimation of an approach to the dead zone by the vUE. The estimation can be determined based on various factors, which include, but are not limited to, the vUE's current location, its direction of travel or any known geographic route, and anticipated dead zone locations.

In some embodiments, the vUE may experience some dead zones that are lack of wireless connections provided by one or more WLANs and/or other LANs. If the CN connections provided by the MNO A or other cellular operations are available, the DA application considers supplementing the wireless service with the available CN services.

In some embodiments, when the vUE is approaching a dead zone but prior to that the CN connection becomes too weak, the vUE may initiate a scan for WiFi or other WLANs to search the assigned APs that are determined by the DA application. Once the AP(s) is found, the vUE uses pre-provisioned parameters to connect to the AP(s).

In some embodiments, when the vUE leaves the dead zone, and/or the cellular connectivity improves, the vUE may disconnect itself with the supplemental WLAN and switch back to the CN. On some embodiment, when there is no known dead zone in close proximity in addition, the vUE may disconnect with the supplemental network.

In some embodiments, corresponding billing (e.g., metering, pay-per-service, etc.) is managed via block-chains to improve trust and/or reliability. For example, when a connection transition occurs from a CN to a WLAN, or vice versa, a transition handoff is created by the current service provider or host, and is contributed to the block-chain. The block-chain maintains a reliable record of chain of custody of the corresponding SLA throughout the determined travel from one geographic location to another. The chain of custody is between the vUE and the AN, where a connectivity is established with an MEC backend. The SLA is used to specify the chain of custody requirements, including but not limited to identities of the ANs, operators, AN load capacity, geo-location, etc. The block-chain allows the chain of custody integrity to be guaranteed without trusting a single entity to maintain the integrity of the history. This may free vUE from being required to maintain user subscription with a single controlling entity.

In some embodiments, the WLAN service provider(s) may become a service provider for the CN operators, when the use of one or more regional APs or hotspots does not require a separate user agreement. In such a case, the corresponding billings may be consolidated as part of the user or vUE's existing subscription, or may be decentralized using a crypto currency such that payment for operation is compensated through micro-transactions.

In various illustrated embodiments, discovery and connection to a WLAN hotspot or an access node of another CN is automated so that the vUE can experience a seamless network transition. This is performed by integrating the AP or AN connection into the corresponding SLA and proactive route planning.

Figure 5:
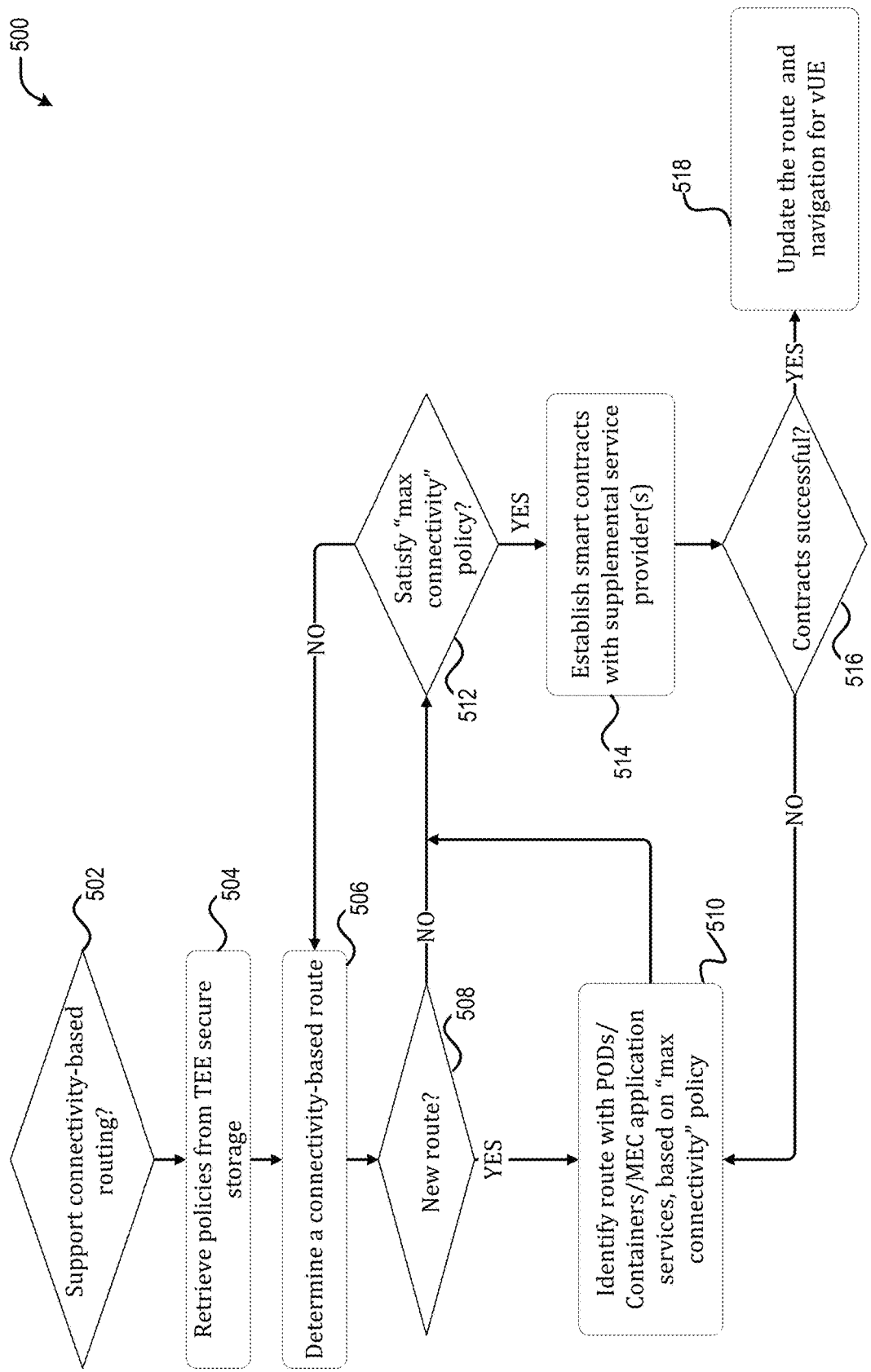
FIG. 5 depicts an example operational flow/procedure for determining a route for the UE or vehicle regarding a particular travel, according to various embodiments.

FIG. 5 depicts an example operational flow/procedure 500 for determining a route for the vUE 121/125 regarding a particular travel, according to various embodiments. The operational flow/procedure 500 may be executed by the DA application via the MSP edge server 136A or a like server or client terminal. This operational flow may occur prior to or during a travel of a geographic route and/or corresponding connectivity-considered route. Operational flow/procedure 500 begins at operation 502, where the DA application determines whether a connectivity-based routing is a support feature or not. The connectivity-based routing, as described earlier, may be referred to as a connectivity-considered routing, where connectivity consideration may be one of the considerations in determining a route from one location to another. If this feature is not supported by the vUE, the DA application, or the cellular network MNO A, the operation flow ends.

At operation 504, for the illustrated embodiments, the DA application retrieves one or more policies that are provisioned in a trusted execution environment (TEE) secure storage for connectivity-based/considered routing, upon confirmation of support for the connectivity-based/considered routing. Security may be important, so encryption keys and clear text-secret data may need to be stored in the TEE and/or hardened environments. Those environments may not be closely available to the vUE, associated data, or execution resources. The MEC-O may adjust connectivity by migrating or allocating the MEC application (DA application), MEC services and/or data storage resources, key protection resources to one or more MEC nodes that are close to the vUE. This is referred to as a "maximum locality" policy. Locality means computing resources are allocated to be close or closer to the vUE. A locality-considered allocation implies data and computation are migrated to a closest edge hosting environment (e.g., a base station) rather than allowing resources to be more centralized at a core or cloud service provider. Normally, the decision to localize compute/storage is based on the need for low latency and jitter. A closely located MEC node may improve latency and/or jitter issue in a wireless network, and improve security as well. Although this may cause additional orchestration effort, which may then cause additional cost at the user. These activities can be defined in the SLA in achieving a better secure user experience with good response time.

In embodiments, a connectivity-based/considered routing considers possible options for connecting to an MEC network via corresponding ANs and/or APs, by evaluating corresponding radio access network topology and identifying an efficient connection route or path. If there are more than one way to connect, e.g., more than one available AN/AP, to ensure connectivity, a routing with backend services provides the points of access. Note that the connectivity routing may be modified and re-evaluated prior to and throughout the travel. The goal is to find an optimal route at a given point in location and/or time.

In some embodiments, the DA application, as an MEC application, is configured to interact with the MEC host 301a. The vUE may or may not be wirelessly connected to the application. The LCM proxy 325 and the MEC-O 321 notify the DA application regarding whether the vUE is connected or not and if the route has been changed. This is because other ANs/APs are routed or will be routed/disrouted to connect to the vUE for completing the travel. Those involved ANs/APs may need a notification and collect uVE input data.

In some embodiments, there are various policies or rules for determining one or more routes from one geographic location to another for the vUE's desired travel. In some embodiments, the policies include, but are not limited to, prioritizing distance of the path, directness, cost estimation, and/or travel time, in addition to considering connectivity along the path. For example, if a connectivity-based/considered path is determined from geographic location A to B and the path is excessively long or time-consuming, the DA application can take into consideration of distance or time factor, then a path with shorter distance and/or travel time may be selected. Such a path may require additional Wi-Fi service providers to supplement the CN of the MNO A.

At operation 506, the DA MEC application determines a connectivity-based/considered route based on the loaded and activated policies provisioned in the TEE secure storage. The connectivity-based/considered route include AN information that provides wireless connections. In addition, the connectivity-based/considered route may consider other travel related factors (e.g., distance, travel time, etc.) to change or modify the existing connectivity-based/considered route, according to operation 504.

At operation 508, the DA application determines whether the route is a new route or not. If it is a new connectivity-based/considered route that has not been implemented before, the DA application needs to further identify the route as in operation 510.

At operation 510, if the determined connectivity-based/considered route is a new route based on operation 508, the DA application is to identify the route with PODs, containers, and/or MEC application services based on the "maximum locality" policy. For example, normally a POD of containers may be hosted by a cloud service provider that may have 100+ millisecond network latency. Under the maximum locality policy, a base station, tower, AN/AP, or on-premises/vehicle server that is close to the vUE may be used instead. The route, therefore, is updated to reflect these proactive resource migration actions informed by the maximum locality policy and/or the predicted path of travel. A route that is determined base at least in part on the maximum locality policy may be referred to as a "locality-considered route." One or more factors that are used in such a determination may be weighed differently in different determination strategies.

At operation 512, the DA application determines whether the connectivity-based/considered route satisfies the "max connectivity" policy. If it is not satisfying the policy, the operation flow/procedure will end. Additionally or alternatively, another route may be determined at operation 506.

At operation 514, once the connectivity-based/considered route satisfies the policy, the DA application is to establish one or more smart contracts with respect to the supplemental service provider(s). The detailed establishment procedure to configure such contracts and vUE/service provider(s) are discussed above with respect to FIG. 4.

At operation 516, the DA application determines whether the contracts are successfully established and the vUE becomes a subscriber to the corresponding service provider(s). If it is determined that not all contracts are successfully established according to corresponding procedures with respect to FIG. 4, new identifications to the route with PODs/containers/MEC application services are required as in operation 510. If all contracts are established successfully among the vUE, service provider(s), and/or the MNO A, the operation flow moves to operation 518.

At operation 518, the determined connectivity-based/considered route based on the "max connectivity" policy is updated for the vUE. Corresponding navigations are updated as well as suitable payment methods. The vUE is configured with the updated route for travelling from location A to B.

In some embodiments, the vUE may provide QoS regarding the service provided by the supplemental providers and/or APs. The DA application may reconsider a current route or a similar route based on the feedback. The DA application may also use the feedback information when considering future routing involving those providers and/or APs. The feedback information may be provided to the MNO A and/or the corresponding service providers/APs to improve wireless service quality.

In some embodiments, the vUE may perform various embodiments herein together with corresponding vehicle, vehicle system, and/or like vehicular systems. For example, the DA application may rely on the vehicle system for potentially better wireless connections, due to higher power transmissions from a vehicle compared with a handheld device. Further, the DA application may rely on the vehicle system, the vUE, and/or other like device/subsystem/system to achieve one or more operations described with respect to FIGS. 4 and 5. In some embodiments, the DA application may determine which information to use when the information is provided by more than one source (e.g., the vUE). In other embodiments, the DA application may determine or request certain device(s)/subsystem(s)/system(s) communicably coupled to the vUE or the vehicle system to perform certain operation(s) and/or provide certain information.

FIGS. 4-5 show example procedures 400-500, respectively, in accordance with various embodiments. For illustrative purposes, the various operations of processes 400-500 are described as being performed by the various elements discussed with respect to FIGS. 1-3 or elements thereof. The various messages/signaling communicated between these elements may be sent/received over the various interfaces discussed herein with respect to FIGS. 1-3. While particular examples and orders of operations are illustrated in FIGS. 4-5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

II. AECC SERVICES AND MSP EDGE SERVER COMPUTE CAPABILITIES

As mentioned previously, the MSP edge servers 136 may provide computational offloading services and/or network services to connected vehicle systems 121. These services may be indicated to vehicle systems 121 as "compute capabilities" in provisioning messages provided by the MSP center server 150 as discussed previously. Examples of these services or compute capabilities may include consumer-oriented services (e.g., gaming, remote mobile/desktop applications, augmented reality/virtual reality, content streaming services, cognitive assistance services such as text-to-speech or speech-to-text processing, and the like), operator or third party services (e.g., active device location tracking, "big data" applications, security/safety aspects, enterprise services, and the like), and network performance or Quality of Experience (QoE) services (e.g., Domain Name System (DNS)/CDN/web, where the DNS servers may identify more than IP address, such as URI names, references to workload resources, ICN caches, performance optimized compute and storage, services tuned for content streaming, and the like). Some or all of these services may include vehicle-to-cloud (V2C) services such as intelligent driving services, high-definition map (HDM) services, V2C cruising assist service, Mobility as a Service (MaaS), among many other services.

Intelligent driving applications/services may include applications that support safe and efficient driving (e.g., traffic notifications) and may include autonomous driving. Cloud-based intelligent driving services may collect data such as cruising data, biometric sensor data, and control data. This data may be gathered from various sources including movement logs from in-vehicle sensors and on-board biometric sensors/cameras. The data volume for these applications may be very large, creating a heavy load on both networking and computing resources. In these cases, the above described edge servers instruct the vehicle system 121 the type of data to be collected and sent to the cloud via the MSP edge server 136, how the vehicle system 121 should process the collected data prior to transmission, and pre-process the collected data from the vehicle system 121 before sending the data to the cloud. The collected data is then sent to the cloud via one or more access networks for processing. Based on the data collected, the cloud computes the intelligent driving parameter-set using artificial intelligence (AI) and/or advanced machine learning techniques. The intelligent driving parameter-set may need to be sent to vUEs 121 in a timely manner. The intelligent driving service may benefit from the various embodiments discussed herein because the MSP Center Server may transfer the ongoing data session from one edge server to another to timely provide the intelligent driving parameter-set to the vUEs 121. In this way, the intelligent driving service may be provided in a manner that appears uninterrupted to subscribers (e.g., a user of the vehicle system 121).

HDM services consolidate static and dynamic information (e.g., vehicle position, pedestrians and obstacles, etc.), and creates and distributes maps based on such information. The HDM may require many data transactions with high capacity as well as efficient processing to keep the information up to date. The HDM must be able to accurately localize dynamic objects including vehicles, which is required for automated driving beyond traditional route guidance applications. A large number of data transfers may be required to consistently update the HDM. Data is collected from on-board cameras, radar sensors, laser scanners (LIDAR), and/or other like sensors of the vUE. The collected data is transferred and processed in the cloud by an HDM service. In some cases, the edge servers may pre-process the collected data and provide HDM deviations to the cloud-based HDM service (e.g., map says X, but camera says Y). These deviations are sent to the cloud to update the HDM. The completed map information is stored in the MSP center server or an edge server and needs to be distributed to relevant vehicles in a timely manner. The HDM service may benefit from the various embodiments discussed herein because the MSP Center Server may transfer ongoing data sessions from one edge server to another so that HDM information may be provided to relevant vUEs 121 in a timely manner. In this way, the HDM may be updated seamlessly or in a manner that appears uninterrupted to subscribers (e.g., a user of the vehicle system 121).

V2C cruise assist is an example use case of a more flexible service evolution model than the conventional dedicated short-range communications (DSRC). V2C Cruise Assist involves network mediated V2V communications by integrating information obtained from neighboring cars. This mechanism is called the vehicle-to-cloud-to-vehicle service (V2C2V). This service scenario is especially effective when used to broadcast information to vehicles that need the same information, by utilizing the combination of neighboring vehicles, roadside units, and other entities/devices.

To realize this service scenario, vehicles and roadside units transmit their cruising data to the cloud to be analyzed, to provide information for driving assistance (such as collision avoidance, cruising control for platooning and signal control). The generated information is then distributed to relevant vUEs 121 and roadside facilities in the neighboring area. This transport system among different vehicles in the neighboring area through the network requires low-latency communication and ultra-fast computing processing to fulfill service timing criteria. The V2C cruise assist service may benefit from the various embodiments discussed herein because the MSP Center Server may transfer ongoing data sessions from one edge server to another so that driving assistance information may be provided to relevant vUEs, RSUs, and other entities/devices in a timely manner.

Mobility as a Service (MaaS) refers to a shift away from personally-owned modes of transportation and towards mobility solutions that are consumed as a service. Many services (e.g., route navigation services) rely on mobility data from vUEs 121 to provide their services (e.g., real-time navigation). The gathered mobility data can be used by third parties to offer new services, such as traffic flow control by road authorities. These kinds of services are the building blocks of MaaS, which will bring improvement to mobility experiences. MaaS is enabled by combining public and/or private transportation services through a unified gateway that creates and manages the transportation. Users can pay per trip or a subscription fee for MaaS. The key concept behind MaaS is to offer travelers mobility solutions based on their travel needs. MaaS may include ride-sharing, e-haling, vehicle-sharing (including car-, bike-, and scooter-sharing services), online/mobile delivery, and/or pop-up or on-demand bus services. These sharing services typically utilize a trip or route planner (e.g., using a mobile application in a UE or vUE 125) that shows a user a route from one destination to another and the mode of transportation (or combination or transportation modes) that the user can use. The user can then choose their preferred trip based on cost, time, and convenience, and then books or reserve their transport (e.g. haling a taxi, reserving a seat on a train, etc.). As these services evolve, there will soon be new emerging services beyond the current ones, such as mobility sharing and multimodal navigation. Mobility sharing is a service that includes ride sharing, car sharing, and even parking lot/space sharing, while multimodal navigation services are end-to-end route guidance that uses various modes of transportation and also provides mobility sharing services information. Mobility sharing services will involve various types of information being shared in a timely manner between asset owners, service providers and end users; accordingly, these types of services should be built on top of intelligent driving, high-definition maps and cruise assist. These emerging services may benefit from or rely on the various session transfer mechanisms of the various embodiments discussed herein.

III. MSP SERVER SELECTION ASPECTS

As mentioned previously, in various embodiments, the MSP center server 150 performs selection and reselection of MSP edge servers 136 to which traffic, workloads, and/or computational tasks of a vehicle system 121 and/or vUE 125 should be offloaded, and provides and/or provisions the vehicle system 121 and/or vUE 125 and the selected MSP edge servers 136 with the information that those devices may use for computational offloading.

Figure 6A:
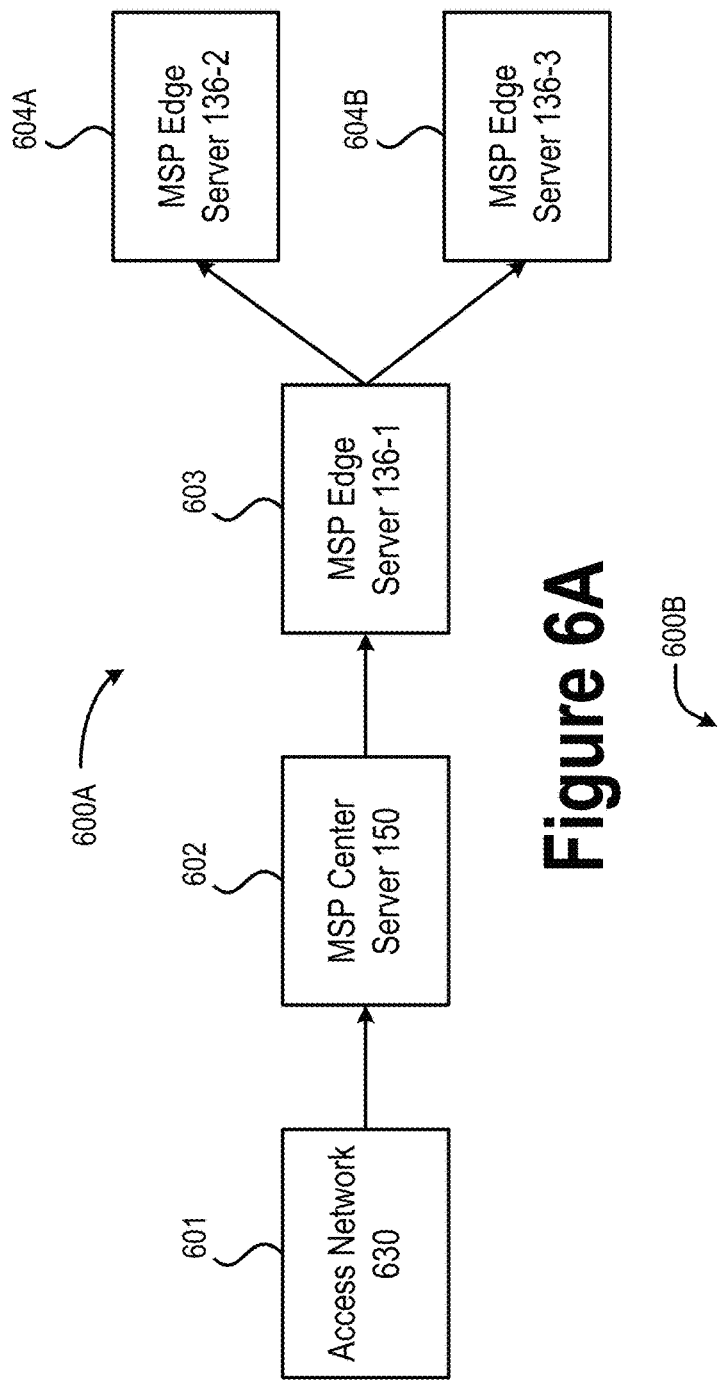
FIG. 6A shows an example edge server process that may take place when (re)selecting an MSP edge server for computational offloading.

FIG. 6A shows an example edge server process 600A that may take place when (re)selecting an MSP edge server 136 for computational offloading. In general, the AECC system 100/200A/200B proceeds with the tasks beginning at operation 601 where primary network access is obtained through an access network 630. The access network 630 may be the WLAN 130/230, the cellular network 140/240A/240B, or some other suitable network. Then at operation 602, the vehicle system 121 (or vUE 125) selects an MSP center sever 150 to get connected to the AECC system 100/200A/200B. At operation 603, the MSP center server 150 selects an MSP edge server 136-1 to serve the vehicle system 121 (or vUE 125) based on one or more selection criteria, such as those discussed herein. As the vehicle system 121 (or vUE 125) moves, the MSP center server 150 (re)selects an MSP edge servers 136-2 at operation 604a or an MSP edge servers 136-3 at operation 604b. The MSP edge servers 136-1, 136-2, and 136-3 may be the same or similar to the previously discussed MSP edge servers 136. Availability of an MSP edge server 136 may change, and the MSP center server 150 may support a switch between MSP edge servers 136 based on prediction and status of the AECC system and access networks, or other like criteria or parameters.

Existing AECC solutions do not evaluate the impacts of different forms of access (e.g., WLAN 130 and cellular network 140). With different access networks, the solutions to enable AECC applications can be very different. Besides, the MSP edge server 136 selection is not addressed in existing solutions and documents.

Figure 6B:
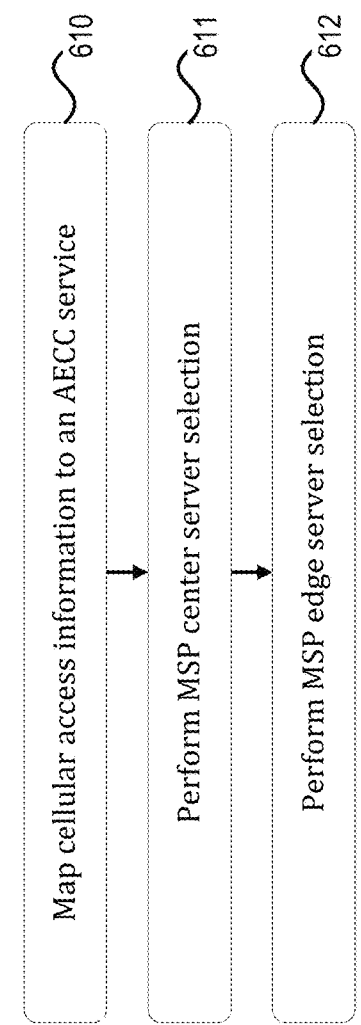
FIG. 6B shows an example process for practicing some aspects of the embodiments discussed herein.

Embodiments herein include MSP center server 150 and MSP edge server selection processes. One such process is depicted by FIG. 6B, which includes process 600B. Process 600B begins at operation 610, the process maps cellular access information to an AECC service. At operation 611, the process performs MSP center server 150 selection. At operation 612, the process performs MSP edge server 136 selection. In embodiments, the electronic device(s), network(s), system(s), chip(s) or component(s), or portions or implementations thereof, of FIGS. 1-11, or some other figure(s) herein, may be configured to perform process 800B.

Some embodiments provide a procedure to enable AECC applications with different access networks (e.g., WLAN and cellular). Systems and methods to enable MSP center server selection are also described. In some embodiments, a cellular network maps cellular access info such as an Access Point Name (APN) or Data Network Name (DNN) mapping to AECC service(s). If there is service agreement between AECC and MNO, the cellular network 140 can authorize vehicle access to AECC system 100/200A/200B and perform MSP center server 150 selection.

In some embodiments, MSP edge server 150 selection procedures include: (a) an MSP center server 150 centric procedure, as an AECC (application) level method (this procedure may apply to systems with either WLAN access or cellular access networks); (b) a cellular assisted procedure, as the cellular network can provide information and assist the procedure of MSP edge server 136 selection (this procedure may only apply to systems with cellular access networks); and (c) a vehicle system 121 centric procedure, as the vehicle can collect information for AECC edge servers to perform MSP edge server selection (this procedure may only apply to system with cellular access network). These embodiments provide three options for MSP edge server 136 selection with WLAN 130 and cellular network 140 access in consideration. It also provides system level procedure to fulfill the requirements for AECC use cases, which also applies to general V2X applications.

IV. MULTI-ACCESS EDGE COMPUTING (MEC) ASPECTS

Figure 7:
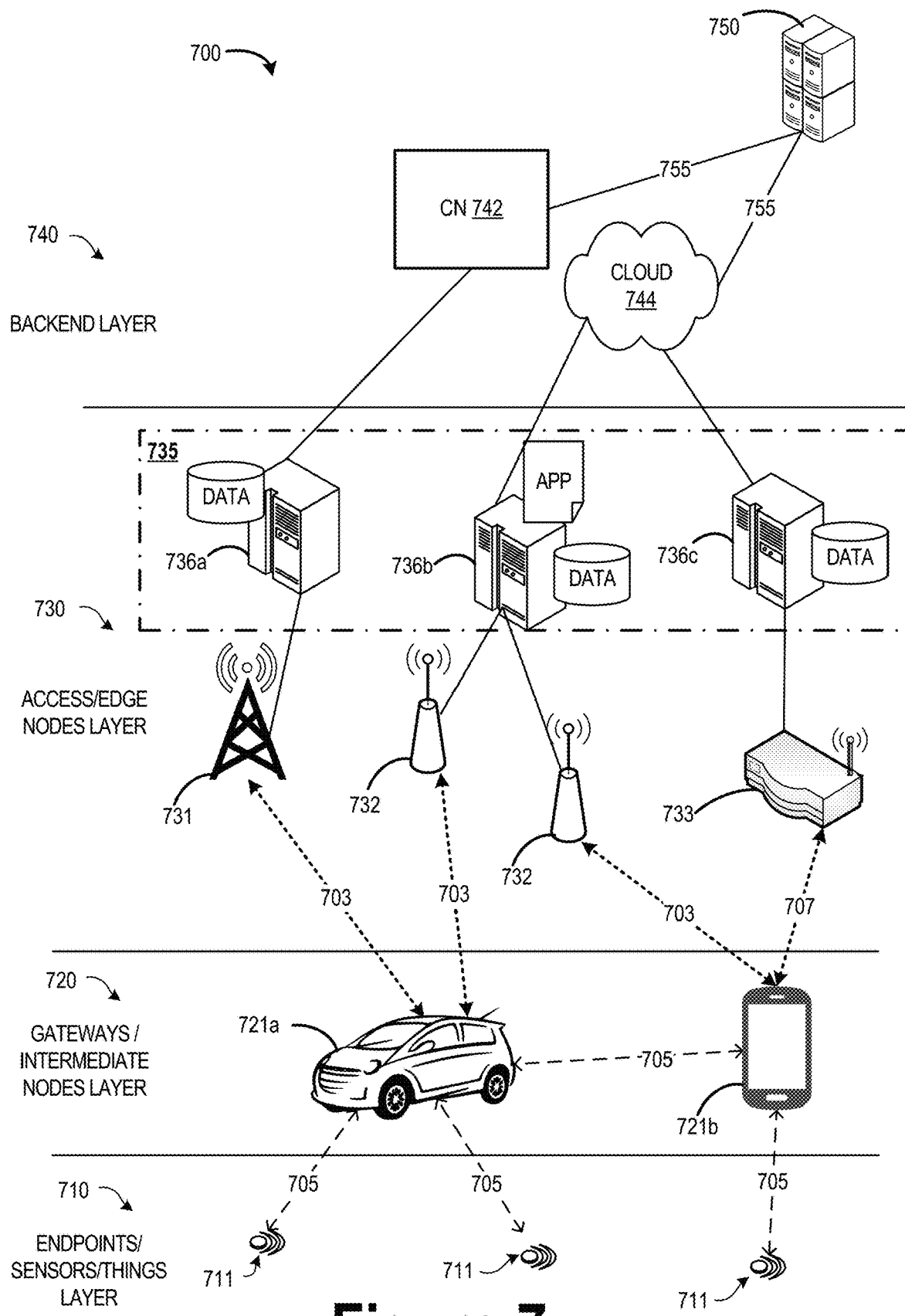
FIG. 7 depicts a multi-access computing (MEC) environment according to various embodiments.

FIG. 7 depicts a multi-access computing (MEC) environment 700 in accordance with various embodiments. FIG. 7 specifically illustrates the different layers of communication occurring within the environment 700, starting from endpoint sensors or things layer 710 (e.g., operating in an Internet of Things (IoT) network topology) comprising one or more IoT devices 711 (also referred to as edge endpoints 710 or the like); increasing in sophistication to gateways or intermediate node layer 720 comprising one or more user equipment (UEs) 721a and 721b (also referred to as intermediate nodes 720 or the like), which facilitate the collection and processing of data from endpoints 710; increasing in processing and connectivity sophistication to access or edge node layer 730 comprising a plurality of access nodes (ANs) 731, 732, and 733 (also referred to as edge compute nodes 730 or the like); and increasing in connectivity and processing sophistication to a backend layer 740 comprising core network (CN) 742 and cloud 744. The processing at the backend layer 740 may be enhanced by network services as performed by a remote application server 750 and/or other cloud services.

An end-user device, such as an intermediate node 720 or endpoint 710 has access to multiple communication networks based on different technologies, for example, LTE or NR/5G cellular technology (e.g., as provided by AN 731 and/or ANs 732), WiFi (e.g., as provided by AN 733 and/or ANs 732), DSL, MuLTEfire, etc., for accessing application services. Different technologies exhibit benefits and limitations in different scenarios, and application performance in different scenarios becomes dependent on the choice of the access networks (e.g., WiFi, LTE, etc.) and the used network and transport protocols (e.g., VPN, MPTCP, GRE etc.). For example, WiFi may provide high throughput for intermediate nodes 720 and endpoints 710 when under relatively good coverage, but the throughput degrades significantly as the user moves closer to the edge of WiFi coverage area or when an 733 serves a relatively large user population (e.g., due to contention based WiFi access scheme). In LTE or NR networks, the capacity is often constrained by the limited availability of licensed spectrum, but the quality of the service is predictable even in multi-user scenarios due to the exclusivity of the licensed spectrum and the controlled scheduling provided by a serving base station.

Unlike LTE and NR networks that use licensed spectrum, WiFi is a shared medium that operates in the unlicensed radiofrequency (RF) of 2.4 GHz and 5 GHz ranges. The 3GPP variant of unlicensed access is called LAA. LAA, aims to design LTE and/or NR specifications for global harmonization that allow for fair coexistence with WiFi and other networks in a shared medium. LAA employs a medium access scheme similar to WiFi's EDCA. The coexistence impact on fairness and throughput with respect to LTE and/or NR is also a current challenge for both standards. One issue that may arise when utilizing network technologies that operated in a shared medium is that packets may be lost during transmission due to, for example, temporary interference, packet collisions, congestion, and buffer overflow. In current WiFi-based protocols, MAC protocols support limited retransmissions to recover lost packets. In particular, a WiFi transmitter will give up and drop a packet when a maximum retransmission limit is reached. Additionally, the WiFi-based retransmission method is not applicable when a packet is dropped due to temporary congestion and/or buffer overflow. Similarly, LAA uses a contention window size (CWS) for retransmitting lost packets, where the CWS increases in an exponential manner based on the HARQ-ACK in the MAC layer.

Referring back to FIG. 7, the environment 700 is shown to include a UE 721a and UE 721b (collectively referred to as "UE 721" or "UEs 721"). In this example, the UE 721a is illustrated as a vehicle UE, and UE 721b is illustrated as a smartphone (e.g., handheld touchscreen mobile computing device connectable to one or more cellular networks). However, these UEs 721 may comprise any mobile or non-mobile computing device, such as tablet computers, wearable devices, PDAs, pagers, desktop computers, laptop computers, wireless handsets, unmanned vehicles or drones, IVIs, ICEs, an Instrument Clusters, HUDs, OBDs, DMEs, MDTs, OBUs, EMS, EEMS, ECUs, ECMs, embedded systems, microcontrollers, control modules, networked or "smart" appliances, MTC devices, M2M, IoT devices, and/or any type of computing device including a wireless communications interface.

Environment 700 also includes IoT devices 711, which are uniquely identifiable embedded computing devices (e.g., within the Internet infrastructure) that comprise a network access layer designed for low-power IoT applications utilizing short-lived UE connections. The IoT devices 711 may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, in various embodiments, IoT devices 711 may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices 711 can utilize technologies such as M2M or MTC for exchanging data with an MTC server (e.g., a server 750), a MEC server 736 and/or MEC system, or device via a PLMN, ProSe or D2D communication, sensor networks, or IoT networks. The M2M or MTC exchange of data may be a machine-initiated exchange of data.

The IoT devices 711 may execute background applications (e.g., keep-alive messages, status updates, etc.) to facilitate the connections of the IoT network. Where the IoT devices 711 are, or are embedded in, sensor devices, the IoT network may be a WSN. An IoT network describes an interconnecting IoT UEs, such as the IoT devices 711 being connected to one another over respective direct links 705. The IoT devices may include any number of different types of devices, grouped in various combinations (referred to as an "IoT group") that may include IoT devices that provide one or more services for a particular user, customer, organizations, etc. A service provider (e.g., an owner/operator of server 750, CN 742, and/or cloud 744) may deploy the IoT devices in the IoT group to a particular area (e.g., a geolocation, building, etc.) in order to provide the one or more services. In some implementations, the IoT network may be a mesh network of IoT devices 711, which may be termed a fog device, fog system, or fog, operating at the edge of the cloud 744. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 744 to Things (e.g., IoT devices 711). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 730) and/or a central cloud computing service (e.g., cloud 744) for performing heavy computations or computationally burdensome tasks. On the other hand, edge cloud computing consolidates human-operated, voluntary resources, as a cloud. These voluntary resource may include, inter-alia, intermediate nodes 720 and/or endpoints 710, desktop PCs, tablets, smartphones, nano data centers, and the like. In various implementations, resources in the edge cloud may be in one to two-hop proximity to the IoT devices 711, which may result in reducing overhead related to processing data and may reduce network delay.

In some embodiments, the fog may be a consolidation of IoT devices 711 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog may operate at the edge of the cloud 744. The fog operating at the edge of the cloud 744 may overlap or be subsumed into an edge network 730 of the cloud 744. The edge network of the cloud 744 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the intermediate nodes 720 and/or endpoints 710 of FIG. 7.

Data may be captured, stored/recorded, and communicated among the IoT devices (or, for example, among the intermediate nodes 720 and/or endpoints 710 that have direct links 705 with one another as shown by FIG. 7). Analysis of the traffic flow and control schemes may be implemented by aggregators that are in communication with the IoT devices 711 and each other through a mesh network. The aggregators may be a type of IoT device 711 and/or network appliance. In the example of FIG. 7, the aggregators may be edge nodes 730, or one or more designated intermediate nodes 720 and/or endpoints 710. Data may be uploaded to the cloud 744 via the aggregator, and commands can be received from the cloud 744 through gateway devices that are in communication with the IoT devices 711 and the aggregators through the mesh network. Unlike the traditional cloud computing model, in some implementations, the cloud 744 may have little or no computational capabilities and only serves as a repository for archiving data recorded and processed by the fog. In these implementations, the cloud 744 centralized data storage system and provides reliability and access to data by the computing resources in the fog and/or edge devices. Being at the core of the architecture, the Data Store of the cloud 744 is accessible by both Edge and Fog layers of the aforementioned edge-fog network.

The UEs 721 and IoT devices 711 may be configured to connect, for example, communicatively couple, with Radio Access Network (RAN) including one or more of the ANs 731, 732, and/or 733. In embodiments, the RAN may be an NG RAN or a 5G RAN, an E-UTRAN, or a legacy RAN, such as a UTRAN or GERAN. As used herein, the term "NG RAN" may refer to a RAN that operates in an NR or 5G system, and the term "E-UTRAN" or the like may refer to a RAN that operates in an LTE or 4G system. The UEs 721 and IoT devices 711 may utilize respective connections (or channels) 703, respectively, each of which comprises a physical communications interface or layer. In this example, the connections 703 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 721 and IoT devices 711 may further directly exchange communication data via respective direct interfaces (or links) 705. In some implementations the interfaces 705 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 705 may be an LTE/NR Proximity Services (ProSe) link or PC5 interface.

According to various embodiments, the UEs 721 and IoT devices 711 and the RAN nodes 731/732 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. To operate in the unlicensed spectrum, the UEs 721 and IoT devices 711 and the RAN nodes 731/732 may operate using LAA, enhanced LAA (eLAA), and/or further eLAA (feLAA) mechanisms. In these implementations, the UEs 721 and IoT devices 711 and the RAN nodes 731/732 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 721 and IoT devices 711, RAN nodes 731/732, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The UE 721b is shown to be configured to access an access point (AP) 733 via a connection 707. The connection 707 can comprise a local wireless connection, such as a connection consistent with any IEEE 802.11 protocol, wherein the AP 733 would comprise a wireless fidelity (WiFi®) router. In this example, the AP 733 is shown to be connected to the Internet without connecting to the CN 742 of the wireless system. In various embodiments, the UE 721b, RAN nodes 731/732, and AP 733 may be configured to utilize LWA operation and/or LWIP operation. The LWA operation may involve the UE 721*b* being configured by a RAN node 721/732 to utilize radio resources of LTE/NR and WLAN. LWIP operation may involve the UE 721*b* using WLAN radio resources (e.g., connection 707) via IPsec protocol tunneling to authenticate and encrypt packets (e.g., IP packets) sent over the connection 707. IPsec tunneling includes encapsulating the entirety of original IP packets and adding a new packet header, thereby protecting the original header of the IP packets.

The RAN can include one or more AN nodes or RAN nodes 731 and 732 (collectively referred to as "RAN nodes" or "RAN node") that enable the connections 703. As used herein, the terms "access node," "access point," or the like may describe equipment that provides the radio baseband functions for data and/or connectivity between a network and one or more users. The network may be a cellular network, a wireless LAN, or any other like network.

In this example, the RAN node 731 is embodied as a NodeB, evolved NodeB (eNB), or a next generation NodeB (gNB), and the RAN nodes 732 are embodied as Road Side Unites (RSUs). Any other type of ANs can be used, and the ANs may comprise ground stations (e.g., terrestrial access points) or satellite stations providing coverage within a geographic area (e.g., a cell). As used herein, the term "NG RAN node" or the like may refer to a RAN node 711 that operates in an NR or 5G system (for example, a gNB), and the term "E-UTRAN node" or the like may refer to a RAN node 731 that operates in an LTE or 4G system (e.g., an eNB). According to various embodiments, the RAN nodes 731 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 731/732 may be implemented as one or more software entities running on server computers as part of a virtual network, which may be referred to as a cloud RAN (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 731/732; a MAC/PHY split wherein RRC, PDCP, RLC, and MAC layers are operated by the CRAN/vBBUP and the PHY layer is operated by individual RAN nodes 731/732; or a "lower PHY" split wherein RRC, PDCP, RLC, MAC layers and upper portions of the PHY layer are operated by the CRAN/vBBUP and lower portions of the PHY layer are operated by individual RAN nodes 731/732. This virtualized framework allows the freed-up processor cores of the RAN nodes 731/732 to perform other virtualized applications. In some implementations, an individual RAN node 721/732 may represent individual gNB-DUs that are connected to a gNB-CU via individual interfaces (not shown by FIG. 7). In these implementations, the gNB-DUs include one or more remote radio heads or RFEMs (see, e.g., FIGS. 13-14 infra), and the gNB-CU may be operated by a server that is located in the RAN (not shown) or by a server pool in a similar manner as the CRAN/vBBUP. Additionally or alternatively, one or more of the RAN nodes 731/732 may be next generation eNBs (ng-eNBs), which are RAN nodes 731/732 that provide E-UTRA user plane and control plane protocol terminations toward the UEs 721, and are connected to a 5GC via an NG interface.

Any of the RAN nodes 731/732 can terminate the air interface protocol and can be the first point of contact for the UEs 721 and IoT devices 711. In some embodiments, any of the RAN nodes 731/732 can fulfill various logical functions for the RAN including, but not limited to, radio network controller (RNC) functions such as radio bearer management, uplink and downlink dynamic radio resource management and data packet scheduling, and mobility management. In embodiments, the UEs 721 and IoT devices 711 can be configured to communicate using OFDM communication signals with each other or with any of the RAN nodes 731/732 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

The RAN nodes 731/732 may be configured to communicate with one another via respective interfaces or links (not shown), such as an X2 interface for LTE implementations (e.g., when CN 742 is an Evolved Packet Core (EPC)), an Xn interface for 5G or NR implementations (e.g., when CN 742 is an Fifth Generation Core (5GC)), or the like.

The ANs 731 and 732 are communicatively coupled to CN 742. In embodiments, the CN 742 may be an evolved packet core (EPC) network, a NextGen Packet Core (NPC) network, a 5G core (5GC), or some other type of CN. The CN 742 may comprise a plurality of network elements, which are configured to offer various data and telecommunications services to customers/subscribers (e.g., users of UEs 721 and IoT devices 711) who are connected to the CN 742 via a RAN. The components of the CN 742 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 742 may be referred to as a network slice, and a logical instantiation of a portion of the CN 742 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 742 components/functions.

The CN 742 is shown to be communicatively coupled to an application server 750 and a network 750 via an IP communications interface 755. the one or more server(s) 750 comprise one or more physical and/or virtualized systems for providing functionality (or services) to one or more clients (e.g., UEs 721 and IoT devices 711) over a network (e.g., cloud 744). The server(s) 750 may include various computer devices with rack computing architecture component(s), tower computing architecture component(s), blade computing architecture component(s), and/or the like. The server(s) 750 may represent a cluster of servers, a server farm, a cloud computing service, or other grouping or pool of servers, which may be located in one or more datacenters. The server(s) 730 may also be connected to, or otherwise associated with one or more data storage devices (not shown). Moreover, the server(s) 750 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 750 offer applications or services that use IP/network resources. As examples, the server(s) 750 may provide traffic management services, cloud analytics, content streaming services, immersive gaming experiences, social networking and/or microblogging services, and/or other like services. In addition, the various services provided by the server(s) 750 may include initiating and controlling software and/or firmware updates for applications or individual components implemented by the UEs 721 and IoT devices 711. The server(s) 750 can also be configured to support one or more communication services (e.g., Voice-over-Internet Protocol (VoIP) sessions, PTT sessions, group communication sessions, social networking services, etc.) for the UEs 721 and IoT devices 711 via the CN 742.

The cloud 744 may represent a cloud computing service, the Internet, a local area network (LAN) or a wide area network (WAN) including proprietary and/or enterprise networks for a company or organization, or combinations thereof. The cloud 744 may be a network that comprises computers, network connections among the computers, and software routines to enable communication between the computers over network connections. In this regard, the cloud 744 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 744 may be via a wired or a wireless connection using the various communication protocols discussed infra. More than one network may be involved in a communication session between the illustrated devices. Connection to the cloud 744 may require that the computers execute software routines which enable, for example, the seven layers of the OSI model of computer networking or equivalent in a wireless (cellular) phone network. Cloud 744 may be used to enable relatively long-range communication such as, for example, between the one or more server(s) 750 and one or more UEs 721 and IoT devices 711. In some embodiments, the cloud 744 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 744 may be associated with network operator who owns or controls equipment and other elements necessary to provide network-related services, such as one or more base stations or access points, one or more servers for routing digital data or telephone calls (e.g., a core network or backbone network), etc. The backbone links 755 may include any number of wired or wireless technologies, and may be part of a local area network (LAN), a wide area network (WAN), or the Internet. In one example, the backbone links 755 are fiber backbone links that couple lower levels of service providers to the Internet, such as the CN 742 and cloud 744.

In some embodiments, at least some of the edge nodes 720 may include or be part of a MEC system 735. The term "MEC system" refers to a collection of MEC hosts (or MEC servers) and MEC management necessary to run MEC applications. The MEC system 735 includes a collection of MEC servers 736 (including MEC server 736a and MEC server 736b in FIG. 7) and MEC management systems (not shown by FIG. 7) necessary to run MEC applications (e.g., MEAs 1336 of FIG. 13) within an operator network or a subset of an operator network. The MEC servers 736a, 736b, 736c (collectively referred to as "MEC servers 736" or "MEC server 736") are physical computer systems (e.g., server compute nodes) that include a MEC platform (e.g., MEP 1337 of FIG. 13) and a virtualization infrastructure (e.g., VI 1338 of FIG. 13), and provide compute, storage, and network resources to MEC applications. The MEC servers 736 may also be referred to as "MEC hosts 736" or "edge servers." In various embodiments, the MEC servers 736 correspond to the MSP servers 136 of FIG. 1. The VI of the MEC servers 736 provide virtualized environments and virtualized resources (e.g., "virtualized infrastructure") for the MEC hosts 736, and the MEC applications may run as virtual machines (VMs) and/or application containers on top of the VI. The components and/or entities of the MEC system 735 are discussed in more detail infra with respect to FIGS. 13-15.

As shown by FIG. 7, each of the (R)AN nodes 721/732 and AP 733 are co-located with MEC servers 736a, 736b, and 736c, respectively. These implementations may be small-cell clouds (SCCs) where a MEC server 736 is co-located with a small cell (e.g., pico-cell, femto-cell, etc.), or may be mobile micro clouds (MCCs) where a MEC server 736 is co-located with a macro-cell (e.g., an eNB, gNB, etc.). The MEC servers 736 may be deployed in a multitude of arrangements other than as shown by FIG. 7. In a first example, the MEC servers 736 may be co-located or operated by RNCs, which may be the case for legacy network deployments, such as 3G networks. In a second example, the MEC servers 736 may be deployed at cell aggregation sites or at multi-RAT aggregation points that can be located either within an enterprise or used in public coverage areas. In a third example, the MEC servers 736 may be deployed at the edge of CN 742. These implementations may be used in follow-me clouds (FMC), where cloud services running at distributed data centers follow the UEs 721 as they roam throughout the network.

Figure 8:
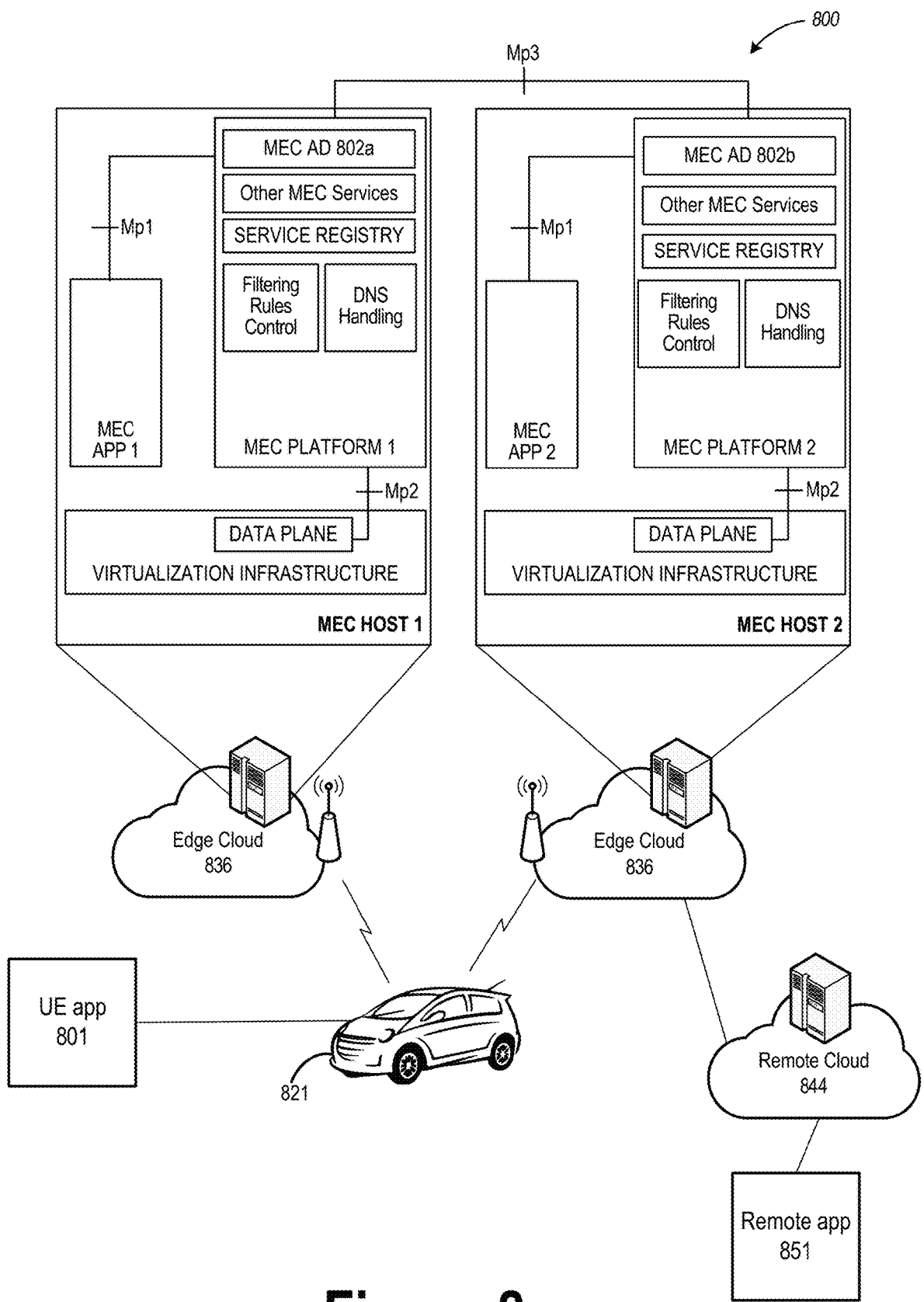
FIG. 8 illustrates a V2X system involving multiple MEC hosts according to various embodiments.

FIG. 8 illustrates a V2X system involving multiple MEC hosts (corresponding to MEC host 301a) and the use of V2X Information Services (VIS) 802a-b (collectively referred to as "MEC VIS 802"). FIG. 8 is an example of application instances in a V2X service with MEC V2X API. In the framework of V2X services, a vehicle 821 (which may be the same or similar as vehicle system 121 and/or UE 125 of FIG. 1) is hosting a client application, and is connected to a certain MEC host (and a related MEC application). In presence of multiple MEC hosts, the VIS 802 permits to expose information between MEC applications running on different MEC hosts. In addition, other remote application server instances can be located somewhere else (e.g., private clouds owned by the operator or by the OEM). The VIS 802 may be produced by the MEC platform or by the MEC application (e.g., MEAs 336).

In particular, the VIS 802 permits information exposure, pertinent to the support of automotive use cases, to MEC application instances. VIS 802 also permits a single ITS operator to offer a V2X service over a region that may span different countries and involve multiple network operators, MEC systems and MEC application providers. For that purpose, the MEC VIS 802 includes the following functionalities:

In some aspects, the MEC platform (corresponding to MEP 337) can include a MEC V2X API and provide MEC VIS, which can include the following functionalities: (a) gathering of PC5 V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a RNI API, Location API, WLAN API, and other APIs that may be implemented within the MEC platform) in order to predict radio network congestion, and provide suitable notifications to the UE.

From that perspective, the VIS 802 is relevant to Mp1 and Mp3 reference points in the MEC architecture (see e.g., FIG. 3). In particular, the relevant information is exposed to MEC apps via the Mp1 reference point, and the Mp3 reference point may enable the possibility to transfer this information between different MEC platforms. The MEC V2X API provides information to MEC applications in a standardized way, which provides interoperability in multi-vendor scenarios. Nevertheless, MEC applications may communicate in a direct way (e.g., without the use of MEC platform). Inter-system communication may be realized between MEOs. As an alternative, or, in addition to that, possible Mp3 enhancements (or new reference points between MEC systems) may be defined.

In some aspects, the second MEC host (MEC Host 2 in FIG. 8) can also implement a MEC V2X API, which can provide an interface to one or more of the apps instantiated within MEC Host 2, such as MEC app 2. In this regard, MEC Host 2 and MEC Host 1 can communicate with each other via the Mp3 interface as well as the MEC V2X APIs. Additionally, one or more of the apps instantiated within MEC Host 1 can communicate with one or more of the apps instantiated within MEC Host 2 via the MEC V2X APIs as well as the interface between the MEC Host 1 and MEC Host 2.

In some aspects, each of the MEC hosts can be owned/managed by a different mobile services operator (while it can be operated directly by a MEC vendor or a third party). In some aspects, MEC applications instantiated on MEC Host 1 and MEC Host 2 can be used to provide V2X-related services, and can be operated by the mobile services operator, by a MEC vendor, or by a third party (e.g., OEM, or OEM supplier, or system integrator).

In some aspects, the MEC V2X APIs can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g., by ETSI MEC), this functionality can ensure the same basic V2X service characteristics for all OEMs in a 5G communication system with MEC functionalities.

In some aspects, MEC app 1 and MEC app 2 can use the corresponding MEC V2X APIs to retrieve information from the 3GPP network. In some aspects, MEC app 1 and MEC app 2 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 1 can be configured to connect to MEC Host 2 (through V2X MEC API in MEC Host 2), and MEC app 2 can be configured to connect to MEC Host 1 (through V2X MEC API in MEC Host 1). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE (e.g., vUE 125/821a) can have access to V2X configuration parameters even when the UE is not under coverage of its 3GPP network.

In some aspects, one or more ME apps within a MEC host can be instantiated to perform functionalities of a V2X application function, which may include providing VIS 802; an example of which is shown by FIG. XP4. Additionally, MEC hosts can use MEC V2X APIs to perform various V2X or VIS 802 functions. In particular, one or more ME apps can be instantiated within a MEC host to perform functionalities associated with a V2X application function. In some aspects, these ME apps can be configured to perform the following V2X application functions: obtaining V2X subscription information for a vUE 721a, determining whether the vUE 721a is authorized to perform V2X communications in response to a request for V2X services, communicating V2X configuration parameters such as a common set of V2X configuration parameters, and so forth.

Figure 9:
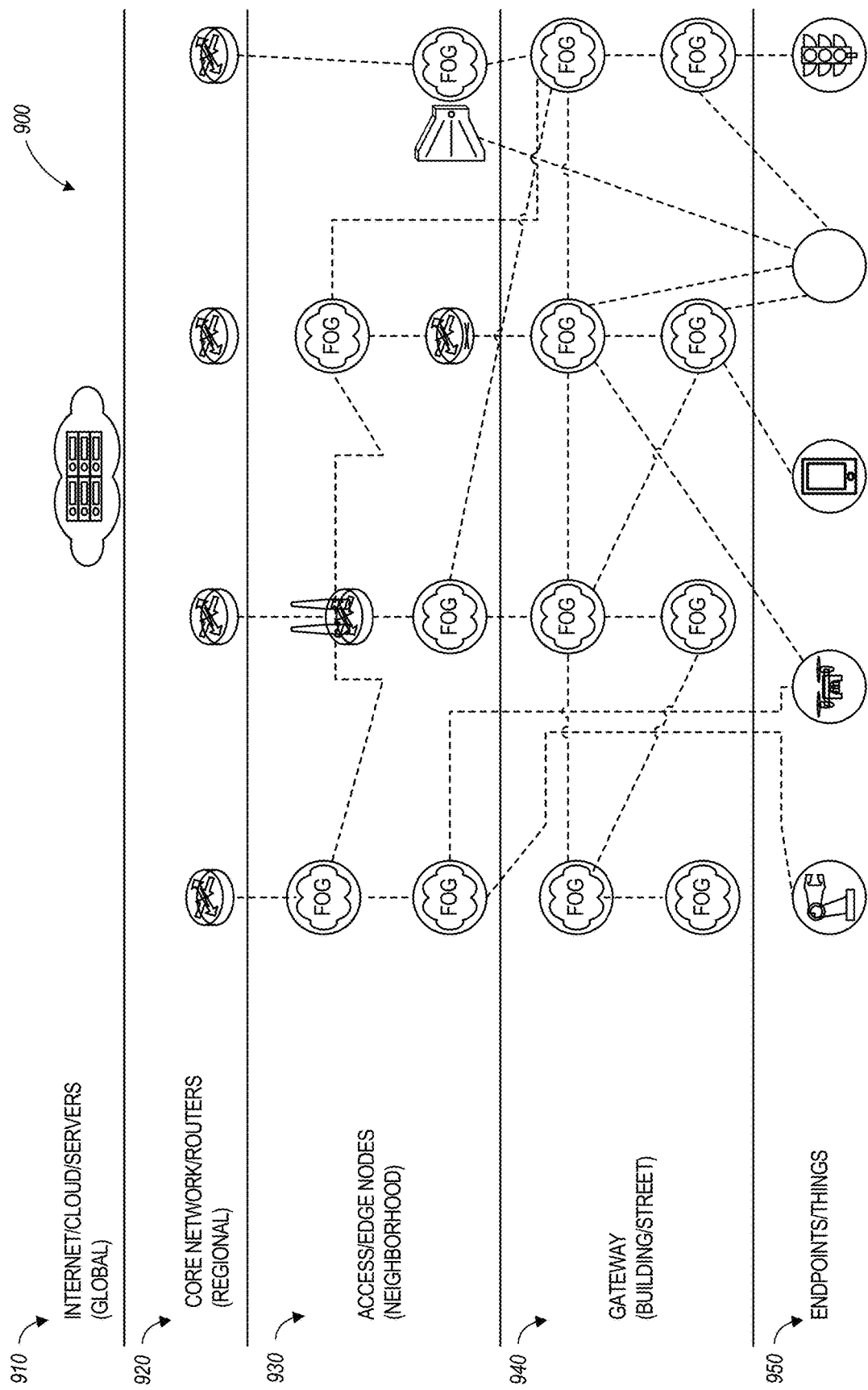
FIG. 9 illustrates a MEC and FOG network topology according to an example embodiment.

FIG. 9 illustrates a MEC and FOG network topology 900 according to an example embodiment. Referring to FIG. 9, the network topology 900 can include a number of conventional networking layers, may be extended through use of the various embodiments discussed herein. Specifically, the relationships between endpoints (at endpoints/things network layer 950), gateways (at gateway layer 940), access or edge computing nodes (e.g., at neighborhood nodes layer 930), core network or routers (e.g., at regional or central office layer 920), may be represented through the use of data communicated via MEC systems/hosts located at various nodes within the topology 900.

A FOG network (e.g., established at gateway layer 940) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 9 illustrates a general architecture that integrates a number of MEC and FOG nodes—categorized in different layers (based on their position, connectivity and processing capabilities, etc.), with each node implementing the various embodiments discussed herein that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated to a MEC host in the system. The nodes may be migrated, associated to different MEC hosts, or consume MEC services from other (e.g., local or remote) MEC platforms.

Figure 10:
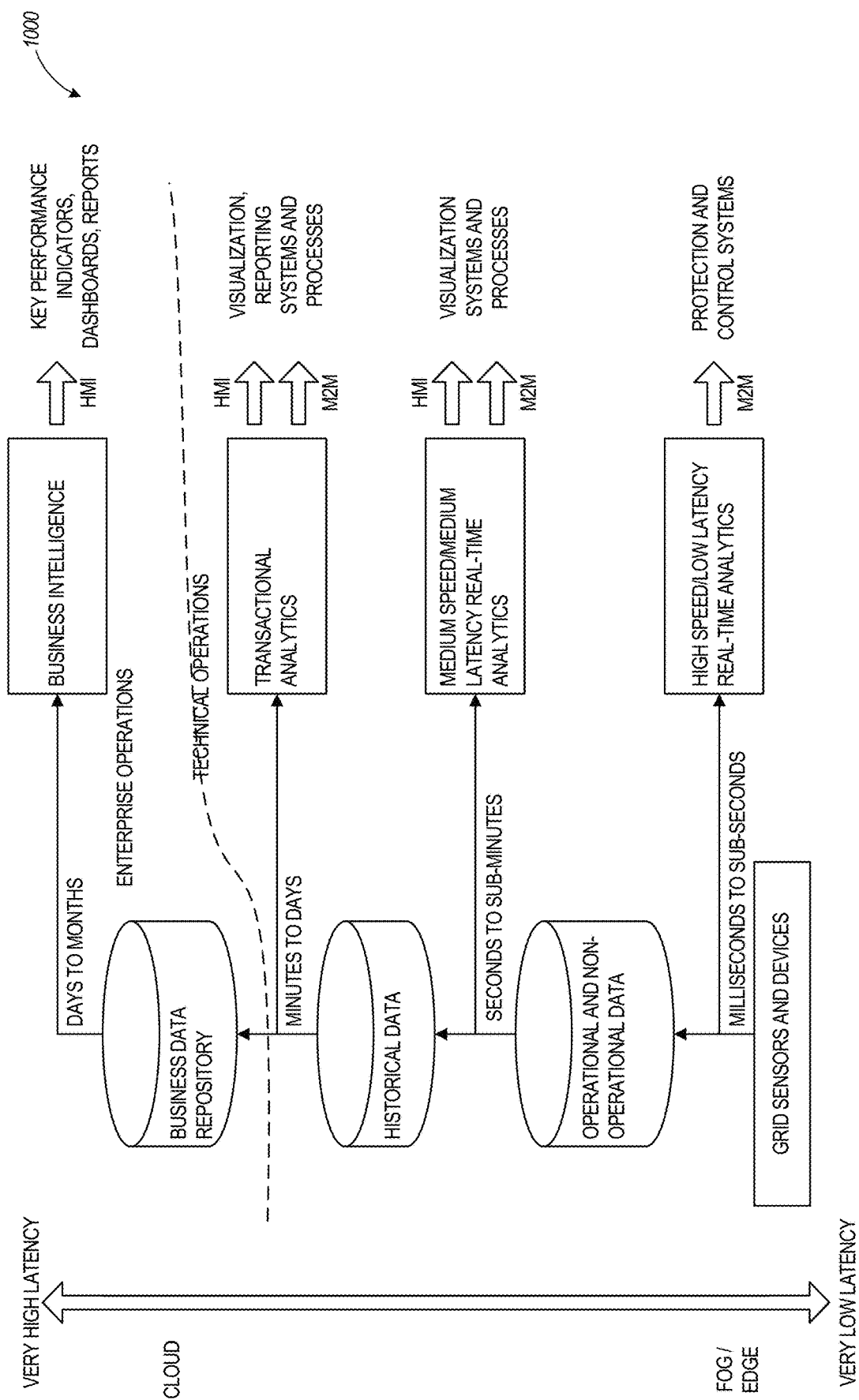
FIG. 10 illustrates an example MEC and FOG network topology according to another example embodiment.
Figure 11:
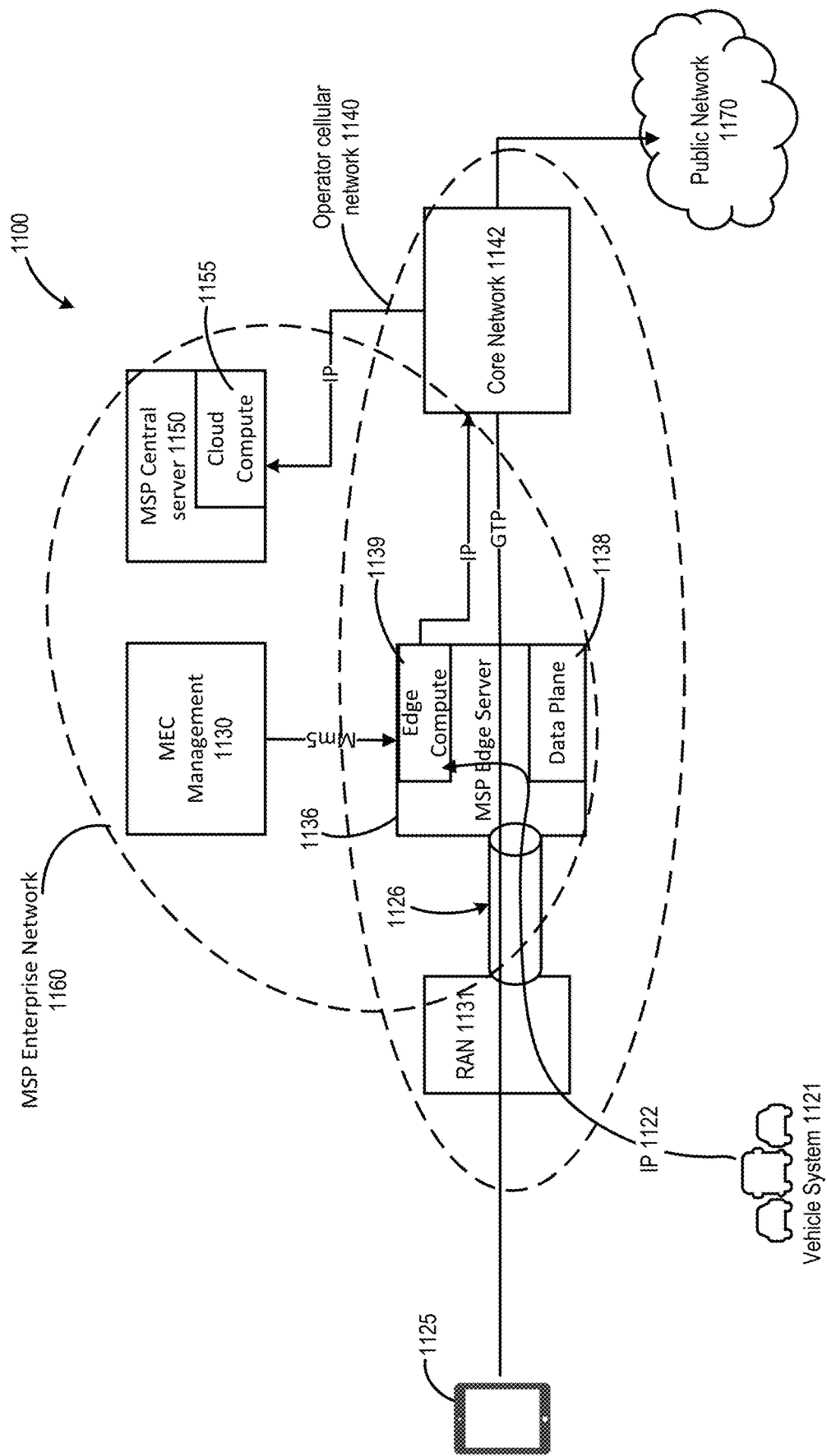
FIG. 11 illustrates an example system that integrates AECC and MEC system architectures.

FIG. 10 illustrates an example MEC and FOG network topology according to another example embodiment. This network topology 1000 in FIG. 10, which includes a number of conventional networking layers, may be extended through use of the tags and objects discussed herein. Specifically, the relationships between endpoints (at endpoints/things network layer 950 of FIG. 9), gateways (at gateway layer 940 of FIG. 9), access or edge computing nodes (e.g., at neighborhood nodes layer 930 of FIG. 9), core network or routers (e.g., at regional or central office layer 920 of FIG. 9), may be represented through the use of linked objects and tag properties.

A FOG network may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 10 illustrates a general architecture that integrates a number of MEC and FOG nodes—categorized in different layers (based on their position, connectivity and processing capabilities, etc.). It should be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC Host 301a, or a simple entity hosting a MEC app 336 and a light-weighted MEC Platform 337. In an example, a MEC or FOG node may be defined as an application instance, connected to or running on a device (ME Host) that is hosting a ME Platform. Here, the application consumes MEC services and is associated to a MEC Host in the system. The nodes may be migrated, associated to different MEC Hosts, or consume MEC services from other (e.g., local or remote) MEC platforms 337.

In contrast to this approach, traditional V2V/V2X applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. Service level agreements (SLAs) and key performance indicators (KPIs) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

As alluded to previously, embodiments herein introduce an approach to use MEC and Edge Computing entities applied to AECC MSP Enterprise Network interfacing with operator cellular network. The AECC edge offloading within cellular network and interfacing with MSP enterprise network is shown by FIGS. 1, 2A, and 2B.

Referring to FIG. 2B, which illustrates another example AECC system 200B, the MSP Edge Servers 136 are connected to the MSP Center Server 150 via an Enterprise Network as defined in the AECC distributed computing architecture reference model. According to the deployment of MSP Edge Server 136 instances, the data offloading points may be selected at appropriate places in the Cellular Network 140/240 to meet the service requirements on latency and capacity. In FIG. 2B, like numbered elements are the same as discussed previously with respect to FIGS. 1 and 2A.

The existing AECC Reference Architecture does not give solutions as to how edge offloading happens within the cellular network 140/240 and how the MSP enterprise network interfaces with the cellular network 140/240. Various embodiments cover edge offloading taking place within cellular network and MSP enterprise network interfacing with cellular network. Embodiments herein provide such solutions to build a more complete guidance for the industry.

European Telecommunications Standards Institute (ETSI) Multi-access Edge Computing (MEC) is a system that provides an Information Technology (IT) service environment and cloud-computing capabilities at the edge of an access network (e.g., a cellular network, a WLAN, etc.), which contains one or more type of access technology, and in close proximity to its users. For AECC systems, such as those shown and described with respect to FIGS. 1 and 2A-2B, it is important to support interfacing between MSP edge servers 136 and the MSP central server 150 within the MSP enterprise network beyond the ETSI MEC architecture.

Embodiments herein include the following solutions: apply ETSI MEC data plane for AECC edge server to do traffic handling including re-route to application, duplicated and pass-through; use ETSI MEC management to conduct traffic rule configuration via Mm5 interface; AECC MSP Enterprise network for connecting from Edge server to center server will leverage cellular network IP transport resource, but occupy any GTP tunnel resource of core network to download GTP resource and computing pressure for cellular network. The solutions herein enable ETSI MEC architecture applied into AECC system, and accordingly provide a solution for AECC MSP enterprise network interfacing with cellular network. The solution will strengthen MSP edge server data plane value Referring now to FIG. 11, which illustrates an example system 300 that integrates an AECC system (see e.g., FIGS. 1 and 2A-2B) and a MEC system (see e.g., FIGS. 7-10). ETSI MEC is regarded as a technology to bring computing capabilities into the edge of a mobile network operator's (MNO) network 1140, which may be the same or similar as the cellular networks 140, 240 (including 240A and 240B) of FIGS. 1 and 2A-2B. It enables the implementation of mobile or multi-access edge applications (e.g., MEC Apps 1336 of FIG. 13) as software-only entities that run on top of a virtualization infrastructure, which is located in or close to the network edge. The system 1100 focuses on what is unique about the mobile edge (or MEC), build upon, and are consistent with, NFV principles, provide flexibility in deployment with 4G and 5G cellular networks 1140, and provides MEC data plane traffic handling. The system 1100 can support re-routing of data to application(s), duplicated and pass-through for vehicle systems 1121 and non-vehicular UEs 1125. The vehicle systems 1121 may be the same or similar to the vehicle system 121 discussed previously with respect to FIGS. 1-11, and.

The vehicle system 1121 generates AECC Defined Traffic 1122 (e.g., IP traffic 1122), such as HD Map, Intelligent Driving Data, and/or other like traffic such as data related to the AECC services and the MSP edge server compute capabilities discussed previously. This IP traffic 1122 is transmitted to the RAN 1131, which sends/transmits/forwards the traffic 1122 to the edge compute module 1139 in the MSP edge server 1136 via the tunnel 1126. Similarly, the UEs 1125 also generate and transmit IP data to the MSP edge server 1136 via the tunnel 1126 and RAN 1131. The UEs 1125 represents any UE other than AECC vehicle systems 1121. the non-vehicular UEs 1125 may be the same or similar to the UE 125 of FIGS. 1-5.

The tunnel 1126 may be a GTP tunnel (or a GTP user plane tunnel) with IP data inside. The GTP tunnel 1126 may be used for carrying user data (e.g., IP packets/PDUs) within the core network 1142 to the Public Network 1170 and between the RAN 1131 and the CN 1142. The user data transported can be packets in any of IPv4, IPv6, or PPP formats, for example.

The system 1100 includes an MSP Enterprise Network 1160, which includes an MSP edge sever 1136. The MSP edge sever 1136 interfaces with cellular CN 1142 in the operator cellular network 1140 via an IP connection rather than a GTP Tunnel (e.g., tunnel 1126 in FIG. 11) to save GTP resources. Additionally, the cellular CN 1142 conducts IP routing to the MSP center server 1150, and in particular, to a cloud compute node 1155 in the MSP center server 1150. It will avoid AECC system to setup a separated network for MSP enterprise network 1160. The MSP edge server 1136, the MSP center server 1150 may be the same or similar as the MSP edge servers 136 and the MSP center server 150 of FIGS. 1 and 2A-2B, respectively.

In system 1100, the MSP edge server 1136 resides at a site close to the RAN 1131 and is in compliance with the ETSI MEC Reference Architecture. The MSP edge server 1136 may be the same or similar as the MSP edge servers 136 of FIGS. 1-11, and the RAN 1131 may be the same or similar as the RAN. The data plane 1138 within the MSP edge server 1136 conducts traffic routing action(s) according to traffic rule configuration (e.g., TR 337B of FIG. 3) via the Mm5 interface/reference point from MEC Management 1130 (see e.g., FIG. 3). The data plane 1138 may be the same or similar as the DP modules 138 discussed previously with respect to FIGS. 1-5, and the MEC management 1130 may be the same or similar as the ME Mgmt 330 of FIG. 3.

In embodiments, the routing edge computing node 1139 conducts specific traffic flow handling locally, and can forward after-processed traffic data to MSP central server via data plane. In such embodiments, the edge computing node 1139 employs a traffic filter (e.g., TR 337B of FIG. 3) to perform the traffic flow handling. The traffic filter supports IP address, Port, ProtoType, IPDSRC, etc. In some embodiments, the traffic filter policy of the traffic filter may use different AECC traffic flow(s) and/or use different port(s). In embodiments, the routing action supports forward, drop, pass-through, duplicate, etc. In embodiments, the routing destination support application, local network, and external networks.

V. SYSTEMS AND IMPLEMENTATIONS

Figure 12:
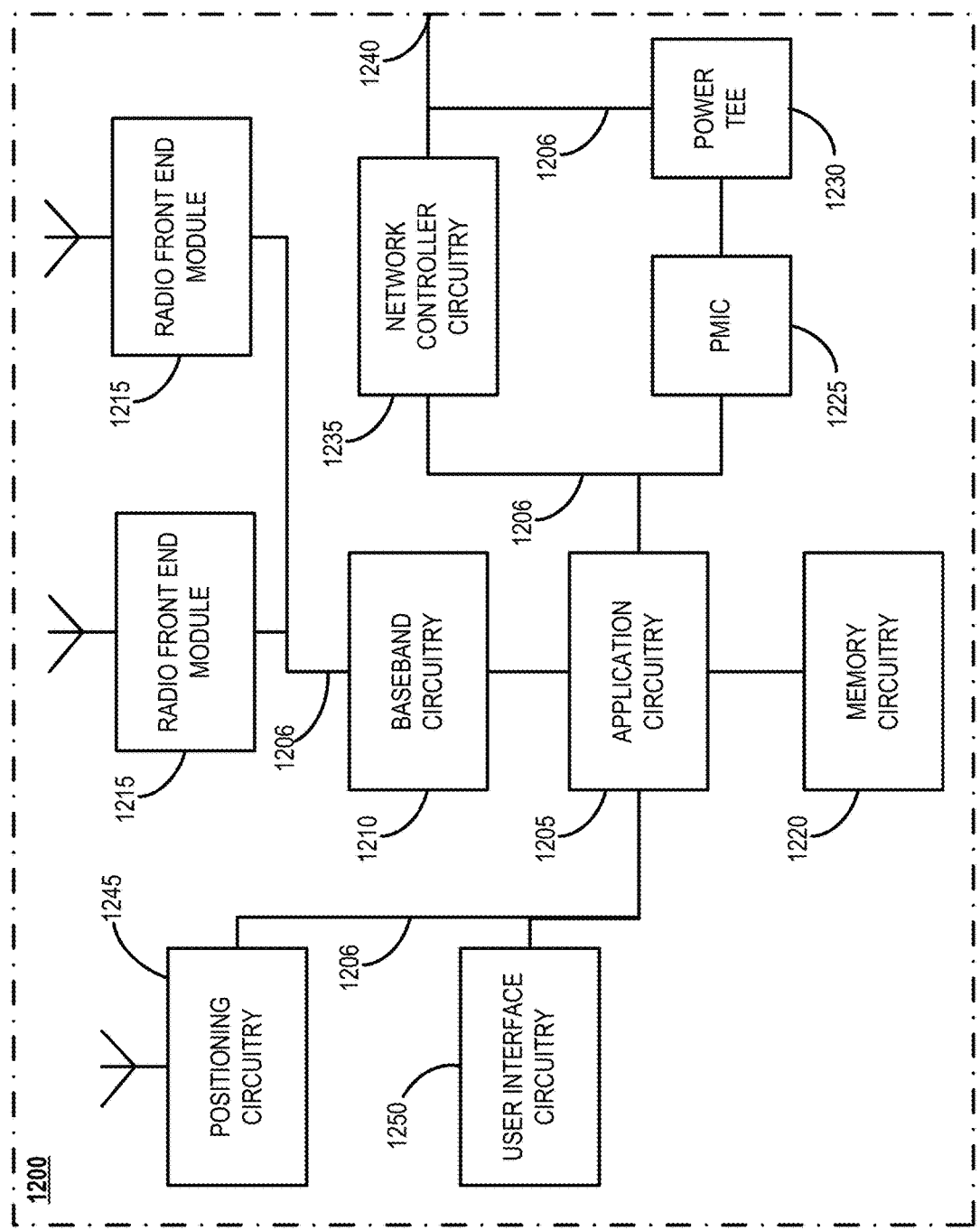
FIG. 12 depicts an example of a UE and in accordance with various embodiments.

FIG. 12 illustrates an example of infrastructure equipment 1200 in accordance with various embodiments. The infrastructure equipment 1200 (or "system 1200") may be implemented as a base station, radio head, access network node (e.g., the edge nodes 730 shown and described previously), MSP edge servers 136, MSP center servers 150, MEC servers 736, server(s) 750, and/or any other element/device discussed herein. In other examples, the system 1200 could be implemented in or by an intermediate node 720 or endpoint 710.

The system 1200 includes application circuitry 1205, baseband circuitry 1210, one or more radio front end modules (RFEMs) 1215, memory circuitry 1220, power management integrated circuitry (PMIC) 1225, power tee circuitry 1230, network controller circuitry 1235, network interface connector 1240, positioning circuitry 1245, and user interface 1250. In some embodiments, the device 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1205 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1205 may be coupled with or may include memory/storage elements and may be configured to execute instructions stored in the memory/storage to enable various applications or operating systems to run on the system 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1205 may comprise, or may be, a special-purpose processor/controller to operate according to the various embodiments herein. As examples, the processor(s) of application circuitry 1205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1200 may not utilize application circuitry 1205, and instead may include a special-purpose processor/controller to process IP data received from an EPC or SGC, for example.

In some implementations, the application circuitry 1205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1205 may comprise logic blocks or logic fabric, and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 730, intermediate nodes 720, and/or endpoints 710 of FIG. 7 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1205 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1210 may be implemented, for example, as a solder-down substrate including one or more integrated circuits, a single packaged integrated circuit soldered to a main circuit board or a multi-chip module containing two or more integrated circuits. The baseband circuitry 1210 includes one or more processing devices (e.g., baseband processors) to carry out various protocol and radio control functions. Baseband circuitry 1210 may interface with application circuitry of system 1200 for generation and processing of baseband signals and for controlling operations of the RFEMs 1215. The baseband circuitry 1210 may handle various radio control functions that enable communication with one or more radio networks via the RFEMs 1215. The baseband circuitry 1210 may include circuitry such as, but not limited to, one or more single-core or multi-core processors (e.g., one or more baseband processors) or control logic to process baseband signals received from a receive signal path of the RFEMs 1215, and to generate baseband signals to be provided to the RFEMs 1215 via a transmit signal path. In various embodiments, the baseband circuitry 1210 may implement a real-time OS (RTOS) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 12, in one embodiment, the baseband circuitry 1210 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1215 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1215 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1210 and/or RFEMs 1215. The baseband circuitry 1210 may also support radio communications for more than one wireless protocol.

Continuing with the aforementioned embodiment, the baseband circuitry 1210 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1250 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1215, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards. The memory circuitry 1220 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1200, an operating system of infrastructure equipment 1200, one or more applications, and/or for carrying out the embodiments discussed herein. The computational logic may be stored or loaded into memory circuitry 1220 as instructions for execution by the processors of the application circuitry 1205 to provide or perform the functions described herein. The various elements may be implemented by assembler instructions supported by processors of the application circuitry 1205 or high-level languages that may be compiled into such instructions. The permanent copy of the programming instructions may be placed into persistent storage devices of memory circuitry 1220 in the factory during manufacture, or in the field through, for example, a distribution medium (not shown), through a communication interface (e.g., from a distribution server), and/or over-the-air (OTA).

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocols. In some implementations, the network controller circuitry 1235 may include multiple controllers to provide connectivity to other networks using the same or different protocols. In various embodiments, the network controller circuitry 1235 enables communication with associated equipment and/or with a backend system (e.g., server(s) 730 of FIG. 7), which may take place via a suitable gateway device.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the baseband circuitry 1210 and/or RFEMs 1215 to communicate with the nodes and components of the positioning network. The positioning circuitry 1245 may also provide position data and/or time data to the application circuitry 1205, which may use the data to synchronize operations with various other infrastructure equipment, or the like.

The components shown by FIG. 12 may communicate with one another using interface circuitry or interconnect (IX), which may include any number of bus and/or interconnect (IX) technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 13:
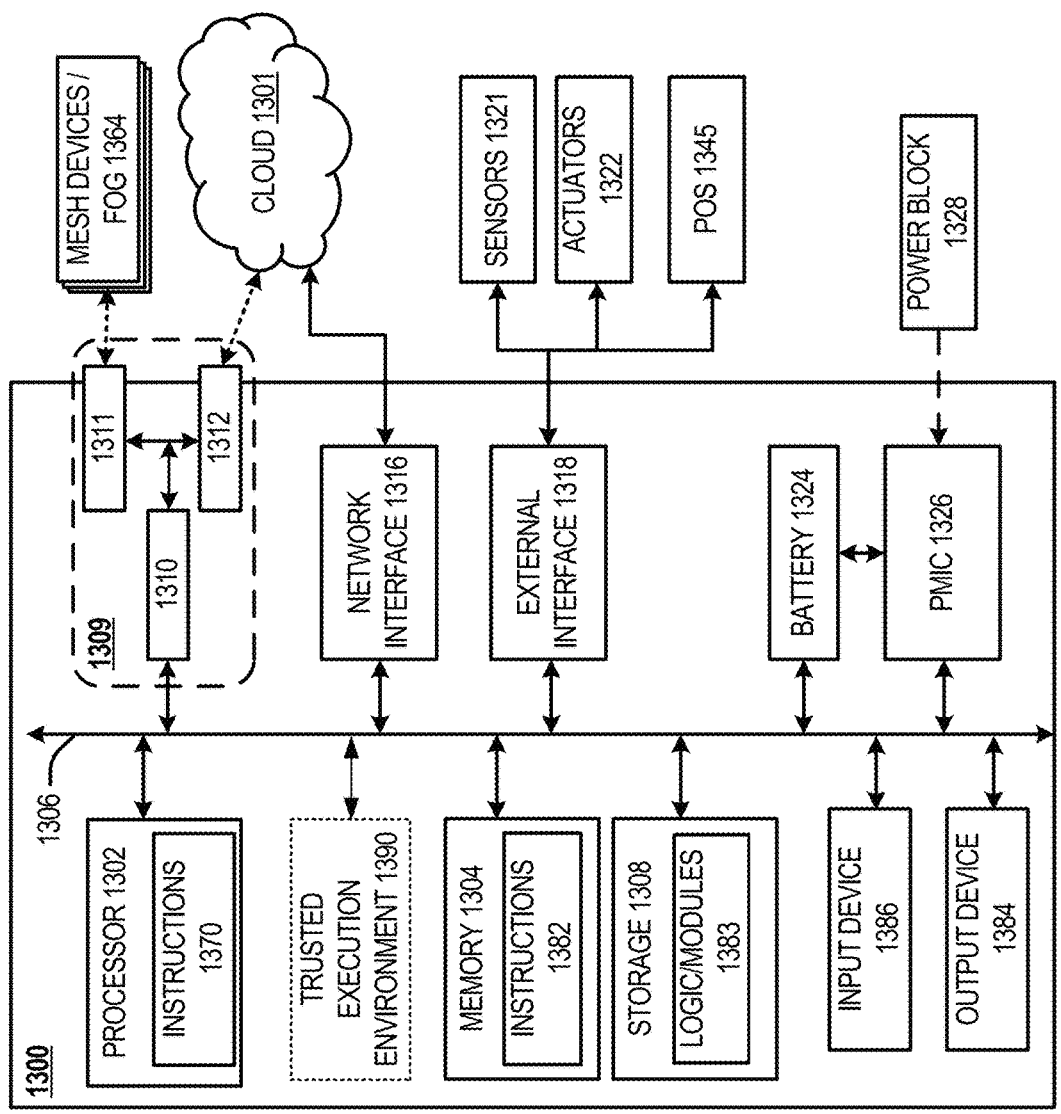
FIG. 13 depicts example components of a computer platform in accordance with various embodiments.

FIG. 13 illustrates an example of an platform 1300 (also referred to as "system 1300," "device 1300," "appliance 1300," or the like) in accordance with various embodiments. In embodiments, the platform 1300 may be suitable for use as intermediate nodes 720 and/or endpoints 710 of FIG. 7, and/or any other element/device discussed herein with regard any other figure shown and described herein. Platform 1300 may also be implemented in or as a server computer system or some other element, device, or system discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The example of FIG. 13 is intended to show a high level view of components of the computer platform 1300. However, some of the components shown may be omitted, additional components may be present, and different arrangement of the components shown may occur in other implementations.

The platform 1300 includes processor circuitry 1302. The processor circuitry 1302 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1302 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1302 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1302 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1302 may be coupled with or may include memory/storage and may be configured to execute instructions stored in the memory/storage to enable various applications or operating systems to run on the platform 1300. In these embodiments, the processors (or cores) of the processor circuitry 1302 is configured to operate application software to provide a specific service to a user of the platform 1300. In some embodiments, the processor circuitry 1302 may be a special-purpose processor/controller to operate according to the various embodiments herein.

As examples, the processor circuitry 1302 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1302 may be a part of a system on a chip (SoC), System-in-Package (SiP), a multi-chip package (MCP), and/or the like, in which the processor circuitry 1302 and other components are formed into a single integrated circuit, or a single package, such as the Edison™ or Galileo™ SoC boards from Intel® Corporation. Other examples of the processor circuitry 1302 are mentioned elsewhere in the present disclosure.

Additionally or alternatively, processor circuitry 1302 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1302 may comprise logic blocks or logic fabric including and other interconnected resources that may be programmed to perform various functions, such as the procedures, methods, functions, etc. of the various embodiments discussed herein. In such embodiments, the circuitry of processor circuitry 1302 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1302 may communicate with system memory circuitry 1304 over an interconnect 1306 (e.g., a bus). Any number of memory devices may be used to provide for a given amount of system memory. As examples, the memory circuitry 1304 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1304 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1304 may also comprise persistent storage devices, which may be temporal and/or persistent storage of any type, including, but not limited to, non-volatile memory, optical, magnetic, and/or solid state mass storage, and so forth.

The individual memory devices of memory circuitry 1304 may be implemented as one or more of solder down packaged integrated circuits, socketed memory modules, and plug-in memory cards. The memory circuitry 1304 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1304. In embodiments, the memory circuitry 1304 may be disposed in or on a same die or package as the processor circuitry 1302 (e.g., a same SoC, a same SiP, or soldered on a same MCP as the processor circuitry 1302).

To provide for persistent storage of information such as data, applications, operating systems (OS), and so forth, a storage circuitry 1308 may also couple to the processor circuitry 1302 via the interconnect 1306. In an example, the storage circuitry 1308 may be implemented via a solid-state disk drive (SSDD). Other devices that may be used for the storage circuitry 1308 include flash memory cards, such as SD cards, microSD cards, xD picture cards, and the like, and USB flash drives. In low power implementations, the storage circuitry 1308 may be on-die memory or registers associated with the processor circuitry 1302. However, in some examples, the storage circuitry 1308 may be implemented using a micro hard disk drive (HDD). Further, any number of new technologies may be used for the storage circuitry 1308 in addition to, or instead of, the technologies described, such resistance change memories, phase change memories, holographic memories, or chemical memories, among others.

The storage circuitry 1308 store computational logic 1383 (or "modules 1383") in the form of software, firmware, or hardware commands to implement the techniques described herein. The computational logic 1383 may be employed to store working copies and/or permanent copies of computer programs, or data to create the computer programs, for the operation of various components of platform 1300 (e.g., drivers, etc.), an operating system of platform 1300, one or more applications, and/or for carrying out the embodiments discussed herein. The computational logic 1383 may be stored or loaded into memory circuitry 1304 as instructions 1382, or data to create the instructions 1382, for execution by the processor circuitry 1302 to provide the functions described herein. The various elements may be implemented by assembler instructions supported by processor circuitry 1302 or high-level languages that may be compiled into such instructions (e.g., instructions 1370, or data to create the instructions 1370). The permanent copy of the programming instructions may be placed into persistent storage devices of storage circuitry 1308 in the factory or in the field through, for example, a distribution medium (not shown), through a communication interface (e.g., from a distribution server (not shown)), or over-the-air (OTA).

In an example, the instructions 1382 provided via the memory circuitry 1304 and/or the storage circuitry 1308 of FIG. 13 are embodied as one or more non-transitory computer readable storage media (see e.g., NTCRSM 1502 of FIG. 9) including program code, a computer program product or data to create the computer program, with the computer program or data, to direct the processor circuitry 1302 of platform 1300 to perform electronic operations in the platform 1300, and/or to perform a specific sequence or flow of actions, for example, as described with respect to the flowchart(s) and block diagram(s) of operations and functionality depicted previously. The processor circuitry 1302 accesses the one or more non-transitory computer readable storage media over the interconnect 1306.

In an example, the instructions 1370 on the processor circuitry 1302 (separately, or in combination with the instructions 1382 and/or logic/modules 1383 stored in computer-readable storage media) may configure execution or operation of a trusted execution environment (TEE) 1390. The TEE 1390 operates as a protected area accessible to the processor circuitry 1302 to enable secure access to data and secure execution of instructions. In some embodiments, the TEE 1390 may be a physical hardware device that is separate from other components of the system 1300 such as a secure-embedded controller, a dedicated SoC, or a tamper-resistant chipset or microcontroller with embedded processing devices and memory devices. In other embodiments, the TEE 1390 may be implemented as secure enclaves, which are isolated regions of code and/or data within the memory of the system 1300. Only code executed within a secure enclave may access data within the same secure enclave, and the secure enclave may only be accessible using the secure application (which may be implemented by an application processor or a tamper-resistant microcontroller). Various implementations of the TEE 1390, and an accompanying secure area in the processor circuitry 1302 or the memory circuitry 1304 and/or storage circuitry 1308 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 1300 through the TEE 1390 and the processor circuitry 1302.

Although the instructions 1382 are shown as code blocks included in the memory circuitry 1304 and the computational logic 1383 is shown as code blocks in the storage circuitry 1308, it should be understood that any of the code blocks may be replaced with hardwired circuits, for example, built into an FPGA, ASIC, or some other suitable circuitry. For example, where processor circuitry 1302 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1304 and/or storage circuitry 1308 may store program code of an operating system (OS), which may be a general purpose OS or an OS specifically written for and tailored to the computing platform 1300. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1300, attached to the platform 1300, or otherwise communicatively coupled with the platform 1300. The drivers may include individual drivers allowing other components of the platform 1300 to interact or control various input/output (I/O) devices that may be present within, or connected to, the platform 1300. For example, the drivers may include a display driver to control and allow access to a display device, a touchscreen driver to control and allow access to a touchscreen interface of the platform 1300, sensor drivers to obtain sensor readings of sensor circuitry 1321 and control and allow access to sensor circuitry 1321, actuator drivers to obtain actuator positions of the actuators 1322 and/or control and allow access to the actuators 1322, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from trusted execution environment (TEE) 1390.

The components may communicate over the interconnect 1306. The interconnect 1306 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1306 may be a proprietary bus, for example, used in a SoC based system. Other bus systems may be included, such as an I$^2$C interface, an SPI interface, point-to-point interfaces, and a power bus, among others.

The interconnect 1306 couples the processor circuitry 1302 to the communication circuitry 1309 for communications with other devices. The communication circuitry 1309 is a hardware element, or collection of hardware elements, used to communicate over one or more networks (e.g., cloud 1301) and/or with other devices (e.g., mesh devices/fog 1364). The communication circuitry 1309 includes baseband circuitry 1310 (or "modem 1310") and radiofrequency (RF) circuitry 1311 and 1312.

The baseband circuitry 1310 includes one or more processing devices (e.g., baseband processors) to carry out various protocol and radio control functions. Baseband circuitry 1310 may interface with application circuitry of platform 1300 (e.g., a combination of processor circuitry 1302, memory circuitry 1304, and/or storage circuitry 1308) for generation and processing of baseband signals and for controlling operations of the RF circuitry 1311 or 1312. The baseband circuitry 1310 may handle various radio control functions that enable communication with one or more radio networks via the RF circuitry 1311 or 1312. The baseband circuitry 1310 may include circuitry such as, but not limited to, one or more single-core or multi-core processors (e.g., one or more baseband processors) or control logic to process baseband signals received from a receive signal path of the RF circuitry 1311 and/or 1312, and to generate baseband signals to be provided to the RF circuitry 1311 or 1312 via a transmit signal path. In various embodiments, the baseband circuitry 1310 may implement a real-time OS (RTOS) to manage resources of the baseband circuitry 1310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 13, in one embodiment, the baseband circuitry 1310 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 1309 is a cellular radiofrequency communication system, such as millimeter wave (mmWave) communication circuitry or some other suitable cellular communication circuitry. In the first example, the protocol processing circuitry 1302 would operate MAC, RLC, PDCP, SDAP, RRC, and NAS functions. In a second example, the protocol processing circuitry may operate one or more IEEE-based protocols when the communication circuitry 1309 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1310 and/or RF circuitry 1311 and 1312. The baseband circuitry 1310 may also support radio communications for more than one wireless protocol.

Continuing with the aforementioned embodiment, the baseband circuitry 1310 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1309 also includes RF circuitry 1311 and 1312 to enable communication with wireless networks using modulated electromagnetic radiation through a non-solid medium. Each of the RF circuitry 1311 and 1312 include a receive signal path, which may include circuitry to convert analog RF signals (e.g., an existing or received modulated waveform) into digital baseband signals to be provided to the baseband circuitry 1310. Each of the RF circuitry 1311 and 1312 also include a transmit signal path, which may include circuitry configured to convert digital baseband signals provided by the baseband circuitry 1310 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1311 or 1312 using metal transmission lines or the like.

The RF circuitry 1311 (also referred to as a "mesh transceiver") is used for communications with other mesh or fog devices 1364. The mesh transceiver 1311 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1311, configured for a particular wireless communication protocol, may be used for the connections to the mesh devices 1364. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1311 may communicate using multiple standards or radios for communications at different ranges. For example, the platform 1300 may communicate with close/proximate devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1312 (also referred to as a "wireless network transceiver," a "cloud transceiver," or the like) may be included to communicate with devices or services in the cloud 1301 via local or wide area network protocols. The wireless network transceiver 1312 includes one or more radios to communicate with devices in the cloud 1301. The cloud 1301 may be the same or similar to cloud 204 discussed previously. The wireless network transceiver 1312 may be a LPWA transceiver that follows the IEEE 802.15.4, or IEEE 802.15.4g standards, among others, such as those discussed herein. The platform 1300 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1311 and wireless network transceiver 1312, as described herein. For example, the radio transceivers 1311 and 1312 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1311 and 1312 may include radios that are compatible with, and/or may operate according to any one or more of the following radio communication technologies and/or standards including but not limited to those discussed herein.

Network interface circuitry/controller (NIC) 1316 may be included to provide wired communication to the cloud 1301 or to other devices, such as the mesh devices 1364 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1300 via NIC 1316 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1316 may include one or more dedicated processors and/or FPGAs to communicate using one or more of the aforementioned network interface protocols. In some implementations, the NIC 1316 may include multiple controllers to provide connectivity to other networks using the same or different protocols. For example, the platform 1300 may include a first NIC 1316 providing communications to the cloud over Ethernet and a second NIC 1316 providing communications to other devices over another type of network.

The interconnect 1306 may couple the processor circuitry 1302 to an external interface 1318 (also referred to as "I/O interface circuitry" or the like) that is used to connect external devices or subsystems. The external devices include, inter alia, sensor circuitry 1321, actuators 1322, and positioning circuitry 1345. The sensor circuitry 1321 may include devices, modules, or subsystems whose purpose is to detect events or changes in its environment and send the information (sensor data) about the detected events to some other a device, module, subsystem, etc. Examples of such sensors 1321 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1318 connects the platform 1300 to actuators 1322, allow platform 1300 to change its state, position, and/or orientation, or move or control a mechanism or system. The actuators 1322 comprise electrical and/or mechanical devices for moving or controlling a mechanism or system, and converts energy (e.g., electric current or moving air and/or liquid) into some kind of motion. The actuators 1322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1322 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1300 may be configured to operate one or more actuators 1322 based on one or more captured events and/or instructions or control signals received from a service provider and/or various client systems.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the communication circuitry 1309 to communicate with the nodes and components of the positioning network. The positioning circuitry 1345 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 1300, which are referred to as input device circuitry 1386 and output device circuitry 1384 in FIG. 13. The input device circuitry 1386 and output device circuitry 1384 include one or more user interfaces designed to enable user interaction with the platform 1300 and/or peripheral component interfaces designed to enable peripheral component interaction with the platform 1300. Input device circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1384 may be included to show information or otherwise convey information, such as sensor readings, actuator position(s), or other like information. Data and/or graphics may be displayed on one or more user interface components of the output device circuitry 1384. Output device circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1300. The output device circuitry 1384 may also include speakers or other audio emitting devices, printer(s), and/or the like. In some embodiments, the sensor circuitry 1321 may be used as the input device circuitry 1386 (e.g., an image capture device, motion capture device, or the like) and one or more actuators 1322 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1324 may be coupled to the platform 1300 to power the platform 1300, which may be used in embodiments where the platform 1300 is not in a fixed location. The battery 1324 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1300 is mounted in a fixed location, the platform 1300 may have a power supply coupled to an electrical grid. In these embodiments, the platform 1300 may include power tee circuitry to provide for electrical power drawn from a network cable to provide both power supply and data connectivity to the platform 1300 using a single cable.

Power management integrated circuitry (PMIC) 1326 may be included in the platform 1300 to track the state of charge (SoCh) of the battery 1324, and to control charging of the platform 1300. The PMIC 1326 may be used to monitor other parameters of the battery 1324 to provide failure predictions, such as the state of health (SoH) and the state of function (SoF) of the battery 1324. The PMIC 1326 may include voltage regulators, surge protectors, power alarm detection circuitry. The power alarm detection circuitry may detect one or more of brown out (under-voltage) and surge (over-voltage) conditions. The PMIC 1326 may communicate the information on the battery 1324 to the processor circuitry 1302 over the interconnect 1306. The PMIC 1326 may also include an analog-to-digital (ADC) convertor that allows the processor circuitry 1302 to directly monitor the voltage of the battery 1324 or the current flow from the battery 1324. The battery parameters may be used to determine actions that the platform 1300 may perform, such as transmission frequency, mesh network operation, sensing frequency, and the like. As an example, the PMIC 1326 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1328, or other power supply coupled to a grid, may be coupled with the PMIC 1326 to charge the battery 1324. In some examples, the power block 1328 may be replaced with a wireless power receiver to obtain the power wirelessly, for example, through a loop antenna in the platform 1300. A wireless battery charging circuit, such as an LTC4020 chip from Linear Technologies of Milpitas, Calif., among others, may be included in the PMIC 1326. The specific charging circuits chosen depend on the size of the battery 1324, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Furthermore, the present disclosure may take the form of a computer program product or data to create the computer program, with the computer program or data embodied in any tangible or non-transitory medium of expression having the computer-usable program code (or data to create the computer program) embodied in the medium.

Figure 14:
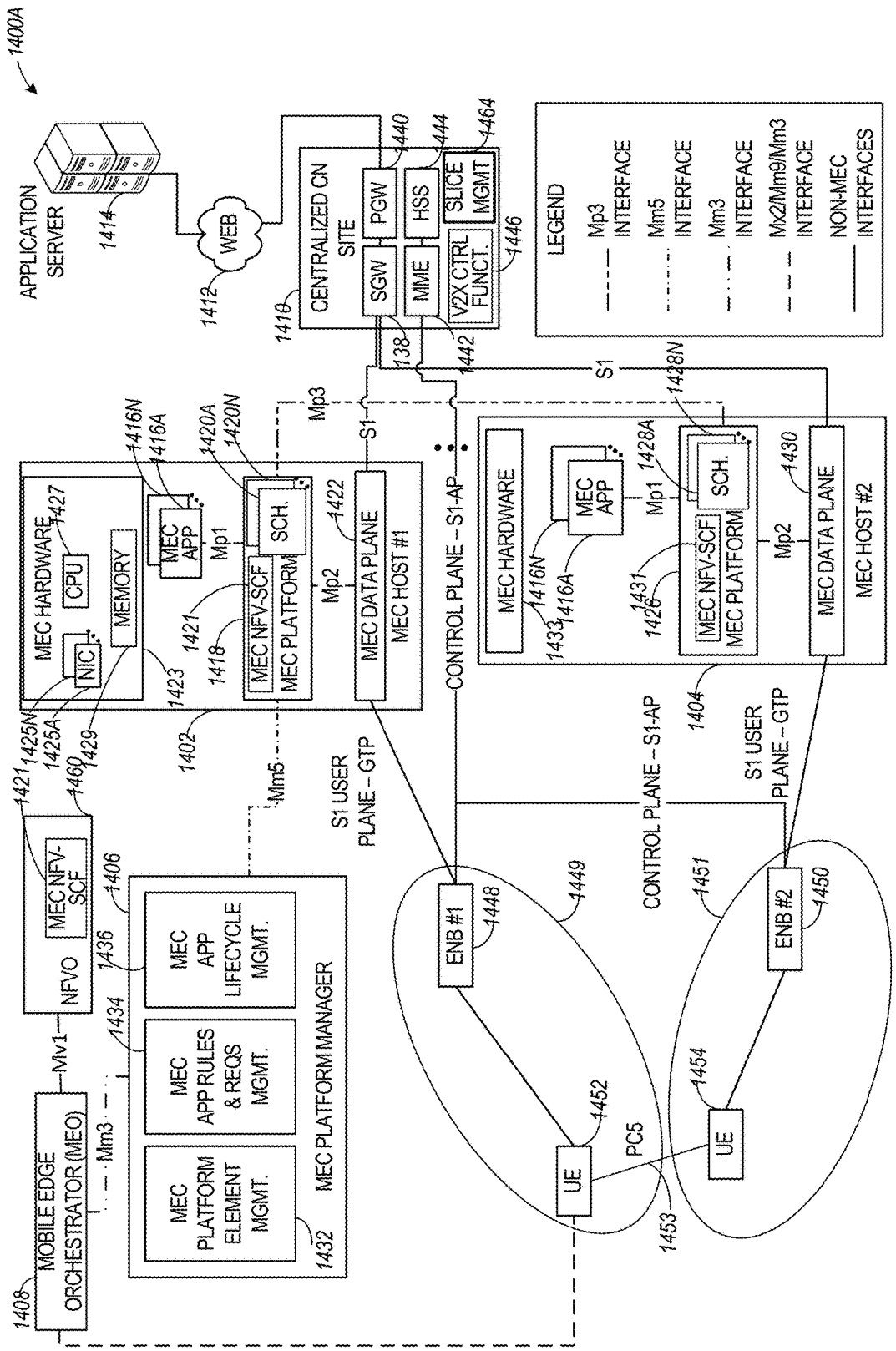
FIG. 14 illustrates a MEC communication infrastructure with a common core network, the MEC infrastructure including slice management, resource management, and traceability functions, according to various embodiments.

FIG. 14 illustrates a MEC communication infrastructure 1400A with a common core network, the MEC infrastructure including slice management, resource management, and traceability functions, according to an example. The connections represented by some form of a dashed line (as noted in the legend in FIG. 14) may be defined according to a specification from an ETSI MEC standards family.

The MEC communication infrastructure 1400A can include entities from a MEC-based architecture as well as entities from a third-generation partnership project (3GPP) based architecture. For example, the MEC communication infrastructure 1400A can include a plurality of MEC hosts such as MEC hosts 102 and 1404, a MEC platform manager 1406, and a MEC orchestrator 1408. The 3GPP based entities can include a centralized core network (CN) 1410 coupled to an application server 1414 via the network 1412 (e.g., the Internet), as well as radio access networks (RANs) represented by base stations 1448 and 1450 coupled to corresponding user equipments (UEs) 1452 and 1454. The base stations 1448 and 1450 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 1400A can be implemented by different network operators in the same country and/or in different countries, using different network traffic types. For example, the radio access network associated with base station 1448 (with a coverage area 1449) can be within a first public land mobile network (PLMN) (i.e., associated with a first mobile services provider or operator and a first network traffic type), and base station 1450 (with a coverage area 1451) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 1400A can be associated with a multi-operator scenario composed by two coverage areas 1449 and 1451 where communication services (e.g., V2X services) can be provided, with each coverage area being operated by a mobile services operator. Additionally, each of the UEs 1452 and 1454 can be configured for network slice operation, where each UE can use one or more types of network slices configured by, e.g., the core network 1410 using the slice management functionality 1464 in coordination with one or more entities of the MEC communication infrastructure 1400A, such as the MEC network function virtualization (NFV) slice control function (SCF) (MEC NFV-SCF) (e.g., 1421 and 1431). Techniques disclosed herein can be used to provide E2E multi-slice support for MEC-enabled 5G deployments using the MEC NFV-SCF. In some aspects, the MEC NFV-SCF 1421 can be within a NFV orchestrator (NFVO) 1460, which can be coupled to the MEC orchestrator 1408.

The solid line connections in FIG. 14 represent non-MEC connections, such as utilizing 3GPP cellular network connections S1, S1-AP, etc. Other connection techniques (e.g., protocols) and connections may also be used. Accordingly, in the scenario of FIG. 1, the system entities (e.g., MEC orchestrator 1408, MEC platform manager 1406, MEC hosts 1402, 1404 are connected by MEC (or NFV) logical links (indicated with dashed lines), in addition to network infrastructure links (e.g., a 5G Long Term Evolution (LTE) network, such as provided among UEs 1452, 1454, eNBs 1448, 1450, a CN site 1410, etc.) (indicated with solid lines). A further connection to cloud services (e.g., an application server 1414 access via the network 1412) may also be connected via backhaul network infrastructure links.

Techniques disclosed herein apply to 2G/3G/4G/LTE/LTE-A (LTE Advanced) and 5G networks, with the examples and aspects disclosed using 4G/LTE networks. In aspects, the CN 1410 may be an evolved packet core (EPC) network, a NextGen Packet Core (NPC) network (e.g., a 5G network), or some other type of CN (e.g., as illustrated in reference to FIGS. 2A-3E). In EPC (Evolved Packet Core), which is associated with 4G/LTE, the CN 1410 can include a serving gateway (S-GW or SGW) 1438, a packet data network (PDN) gateway (P-GW or PGW) 1440, a mobility management entity (MME) 1442, and a home subscriber server (HSS) 1444 coupled to a V2X control function 1446. In 5G, the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 1448, 1450 and the S-GW 1438 via the MEC hosts 1402, 1404, and the S1-AP (control plane) interface which is a signaling interface between the eNBs 1448, 1450 and the MME 1442.

The MME 1442 may be similar in function to the control plane of legacy Serving General Packet Radio Service (GPRS) Support Nodes (SGSN). The MME 1442 may manage mobility aspects in access such as gateway selection and tracking area list management. The HSS 1444 may comprise a database for network users, including subscription-related information to support the network entities' handling of communication sessions, including subscription information associated with V2X communications. The CN 1410 may comprise one or several HSSs 1444, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 1438 may terminate the S1 interface towards the RANs of eNBs 1448, 1450, and route data packets between the RANs and the CN 1410. In addition, the S-GW 1438 may be a local mobility anchor point for inter-RAN node handovers and also may provide an anchor for inter-3GPP mobility. Other responsibilities may include charging and some policy enforcement.

The P-GW 1440 may terminate an SGi interface toward a PDN. The P-GW 1440 may route data packets between the RANs and external networks such as a network including the application server (AS) 1414 (alternatively referred to as application function (AF)) via an Internet Protocol (IP) interface (e.g., an interface to the network 1412 coupled to the AS 1414. The P-GW 1440 can also communicate data to other external networks, which can include the Internet, IP multimedia subsystem (IPS) network, and other networks. Generally, the application server 1414 may be an element offering applications that use IP bearer resources with the core network (e.g., UMTS Packet Services (PS) domain, LTE PS data services, etc.). The application server 1414 can also be configured to support one or more communication services (e.g., Voice-over-Internet Protocol (VoIP) sessions, PTT sessions, group communication sessions, social networking services, etc.) for the UEs 1452, 1454 via the CN 1410 and one or more of the MEC hosts 1402, 1404.

The P-GW 1440 may further include a node for policy enforcement and charging data collection. A Policy and Charging Enforcement Function (PCRF) (not illustrated in FIG. 1) can be the policy and charging control element of the CN 1410. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 1414 via the P-GW 1440. The application server 1414 may signal the PCRF to indicate a new service flow and select the appropriate Quality of Service (QoS) and charging parameters.

The V2X control function 1446 is used in connection with authorizing UEs to use V2X services based on HSS information (e.g., subscription information managed by the HSS 1444), assist one or more UEs in obtaining the network address of an application server (e.g., 1414) or a V2X application server, as well as providing V2X configuration parameters for direct communication (i.e., device-to-device communications). The interface for direct device-to-device communication is referred to as PC5. The PC5 parameters may be provided by the V2X control function 1446 to one or more UEs for purposes of configuring V2X communication between the UEs.

The slice management function 1464 can be used for configuring one or more network slices (e.g., 5G slices) for use by UEs or other devices within the communication architecture 1400A, where the slice configuration may be with the assistance of the MEC NFV-SCF (e.g., 1421 and 1431) as discussed herein.

The MEC hosts 1402, . . . , 1404 can be configured in accordance with the ETSI GS MEC-003 specification. The MEC host 1402 can include a MEC platform 1418, which can be coupled to one or more MEC applications (apps) such as MEC apps 1416A, . . . , 1416N (collectively, MEC app 1416) and to MEC data plane 1422. The MEC host 104 can include a MEC platform 1426, which can be coupled to a MEC app 1416 and MEC data plane 1430. The MEC platform manager 1406 can include a MEC platform element management module 1432, MEC application rules and requirements management module 1434, and MEC application lifecycle management module 1436. The MEC host 1402 also includes MEC hardware 1423, such as network interfaces (e.g. network interface cards or NICs) 1425A, . . . , 1425N, one or more CPUs 1427, and memory 1429.

In some aspects, the MEC apps 1416A, . . . , 1416N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 1418 can further include one or more schedulers 1420A, . . . , 1420N (collectively, a scheduler 1420). Each of the schedulers 1420A, . . . , 1420N may comprise suitable circuitry, logic, interfaces, and/or code and is configured to manage instantiation of NFVs 1416A, . . . , 1416N (collectively, an NFV 1416). More specifically, a scheduler 1420 can select a CPU (e.g., one of the CPUs 1427) and/or other network resources for executing/instantiating the NFV 1416. Additionally, since each of the NFVs 1416A, . . . , 1416N is associated with processing a different network traffic type, the scheduler 1420 can further select a NIC (e.g., from the available NICs 1425A, . . . , 1425N) for use by the NFV 1416. Each of the schedulers 1420A, . . . , 1420N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 14 further illustrates MEC host 1404 including MEC hardware 1433, MEC QoS manager 1431, and schedulers 1428A, . . . , 1428N, which can have the same functionality as MEC hardware 1423, MEC NFV-SCF module 1421, and schedulers 1420A, . . . , 1420N described in connection with MEC host 1402. Even though MEC NFV-SCF module 1421 is illustrated as being implemented within the MEC platform 1418, the present disclosure is not limited in this regard and one or more components of the MEC NFV-SCF module 1421 can be implemented within other modules of the MEC host 1402 (such as the MEC data plane 1422), a network function virtualization infrastructure, a network function virtualization orchestrator, the MEC orchestrator 1408, the MEC platform manager 1406, or another entity within the architecture 1400A.

In some aspects, the MEC architecture 1400A (or any of the MEC architectures discussed herein) can be configured to provide functionalities in accordance with the ETSI GS MEC-003 specification and/or the ETSI GR MEC-017 specification.

Figure 15A:
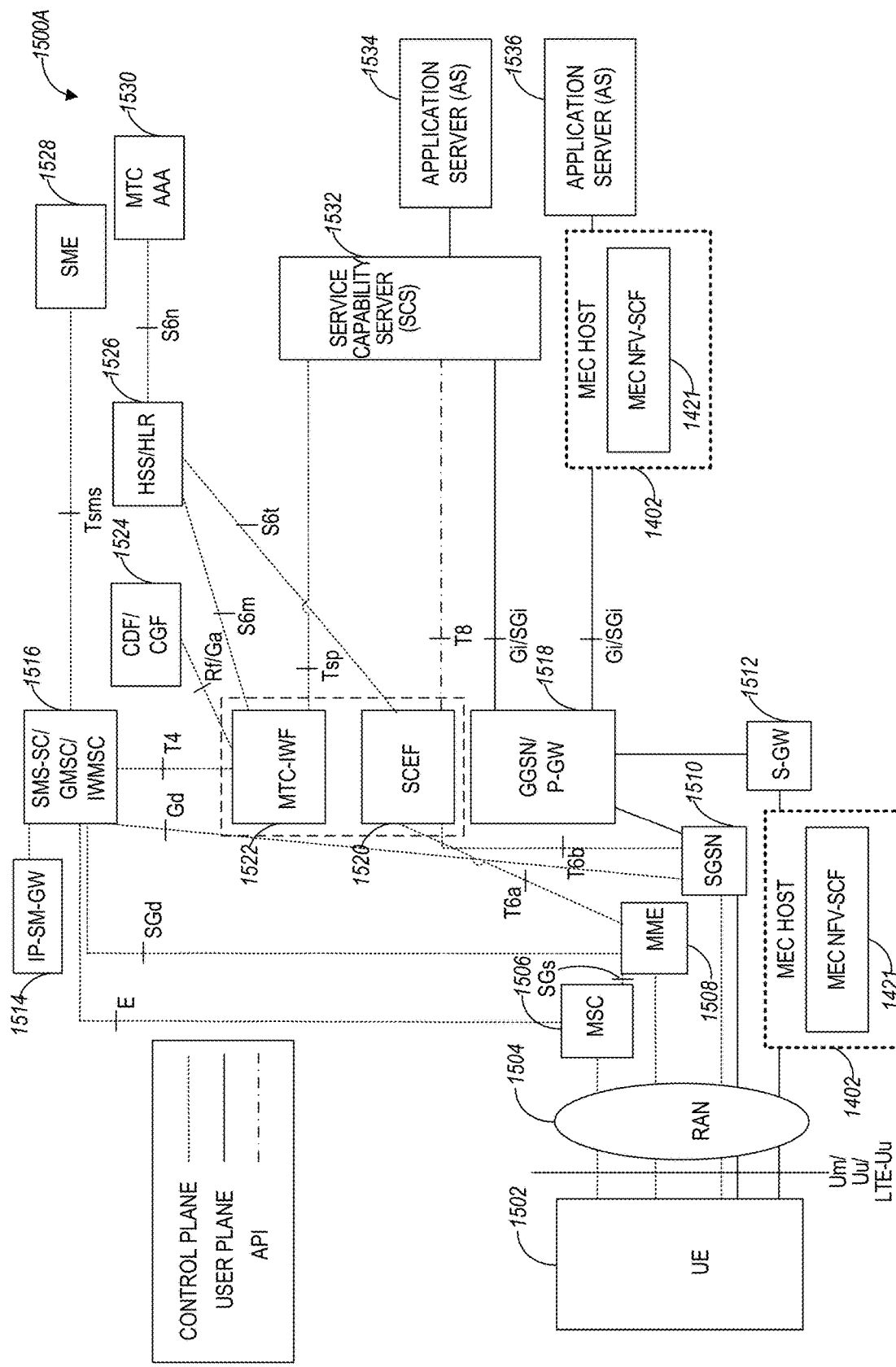
FIG. 15A illustrates an example Cellular Internet-of-Things (CIoT) network architecture with a MEC host using a MEC QoS manager, according to various embodiments.

FIG. 15A illustrates an example Cellular Internet-of-Things (CIoT) network architecture with a MEC host using a MEC QoS manager, according to an example. Referring to FIG. 15A, the CIoT architecture 1500A can include the UE 1502 and the RAN 1504 coupled to a plurality of core network entities. In some aspects, the UE 1502 can be a machine-type communication (MTC) UE. The CIoT network architecture 1500A can further include a mobile services switching center (MSC) 1506, MME 1508, a serving GPRS support node (SGSN) 1510, a S-GW 1512, an IP-Short-Message-Gateway (IP-SM-GW) 1514, a Short Message Service-Service Center (SMS-SC)/gateway mobile service center (GMSC)/Interworking MSC (IWMSC) 1516, MTC interworking function (MTC-IWF) 1522, a Service Capability Exposure Function (SCEF) 1520, a gateway GPRS support node (GGSN)/Packet-GW (P-GW) 1518, a charging data function (CDF)/charging gateway function (CGF) 1524, a home subscriber server (HSS)/a home location register (HLR) 1526, short message entities (SME) 1528, MTC authorization, authentication, and accounting (MTC AAA) server 1530, a service capability server (SCS) 1532, and application servers (AS) 1534 and 1536. In some aspects, the SCEF 1520 can be configured to securely expose services and capabilities provided by various 3GPP network interfaces. The SCEF 1520 can also provide means for the discovery of the exposed services and capabilities, as well as access to network capabilities through various network application programming interfaces (e.g., API interfaces to the SCS 1532).

FIG. 2A further illustrates various reference points between different servers, functions, or communication nodes of the CIoT network architecture 1500A. Some example reference points related to MTC-IWF 1522 and SCEF 1520 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 1522 and the SMS-SC 1516 in the HPLMN), T6a (a reference point used between SCEF 1520 and serving MME 1508), T6b (a reference point used between SCEF 1520 and serving SGSN 1510), T8 (a reference point used between the SCEF 1520 and the SCS/AS 1534, 1536), S6m (a reference point used by MTC-IWF 1522 to interrogate HSS/HLR 1526), S6n (a reference point used by MTC-AAA server 1530 to interrogate HSS/HLR 1526), and S6t (a reference point used between SCEF 1520 and HSS/HLR 1526).

In some aspects, the UE 1502 can be configured to communicate with one or more entities within the CIoT architecture 1500A via the RAN 1504 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 1502 and an Evolved Packet System (EPS) Mobile Management Entity (MME) 1508 and SGSN 1510. In some aspects, the CIoT network architecture 1500A can include a packet data network, an operator network, or a cloud service network, having, for example, among other things, servers such as the Service Capability Server (SCS) 1532, the AS 1534, or one or more other external servers or network components.

The RAN 1504 can be coupled to the HSS/HLR servers 1526 and the AAA servers 1530 using one or more reference points including, for example, an air interface based on an S6a reference point, and configured to authenticate/authorize CIoT UE 1502 to access the CIoT network. The RAN 1504 can be coupled to the CIoT network architecture 1500A using one or more other reference points including, for example, an air interface corresponding to an SGi/Gi interface for 3GPP accesses. The RAN 1504 can be coupled to the SCEF 1520 using, for example, an air interface based on a T6a/T6b reference point, for service capability exposure. In some aspects, the SCEF 1520 may act as an API GW towards a third-party application server such as server 1534. The SCEF 1520 can be coupled to the HSS/HLR 1526 and MTC AAA 1530 servers using an S6t reference point and can further expose an Application Programming Interface to network capabilities.

In certain examples, one or more of the CIoT devices disclosed herein, such as the UE 1502, the RAN 1504, etc., can include one or more other non-CIoT devices, or non-CIoT devices acting as CIoT devices, or having functions of a CIoT device. For example, the UE 1502 can include a smartphone, a tablet computer, or one or more other electronic device acting as a CIoT device for a specific function, while having other additional functionality. In some aspects, the RAN 1504 can include a CIoT enhanced Node B (CIoT eNB) communicatively coupled to a CIoT Access Network Gateway (CIoT GW). In certain examples, the RAN 1504 can include multiple base stations (e.g., CIoT eNBs or other types of base stations) connected to the CIoT GW, which can include MSC 1506, MME 1508, SGSN 1510, or S-GW 1512. In certain examples, the internal architecture of RAN 1504 and the CIoT GW may be left to the implementation and need not be standardized.

In some aspects, the CIoT architecture 1500A can include one or more MEC hosts that can provide a communication link between different components of the CIoT architecture. For example, MEC host 1402 can be coupled between the RAN 1504 and the S-GW 1512. In this case, the MEC host 1402 can use one or more NFV instances to process wireless connections with the RAN 1504 and the S-GW 1512. The MEC host 1402 can also be coupled between the P-GW 1518 and the application server 1536. In this case, the MEC host 1402 can use the one or more NFV instances to process wireless connections originating from or terminating at the P-GW 1518 and the application server 1536. In some aspects, the MEC host 1402 includes a MEC NFV-SCF module 1421, which is configured according to techniques disclosed herein to provide multi-slice support for MEC-enabled 5G deployments.

Figure 15B:
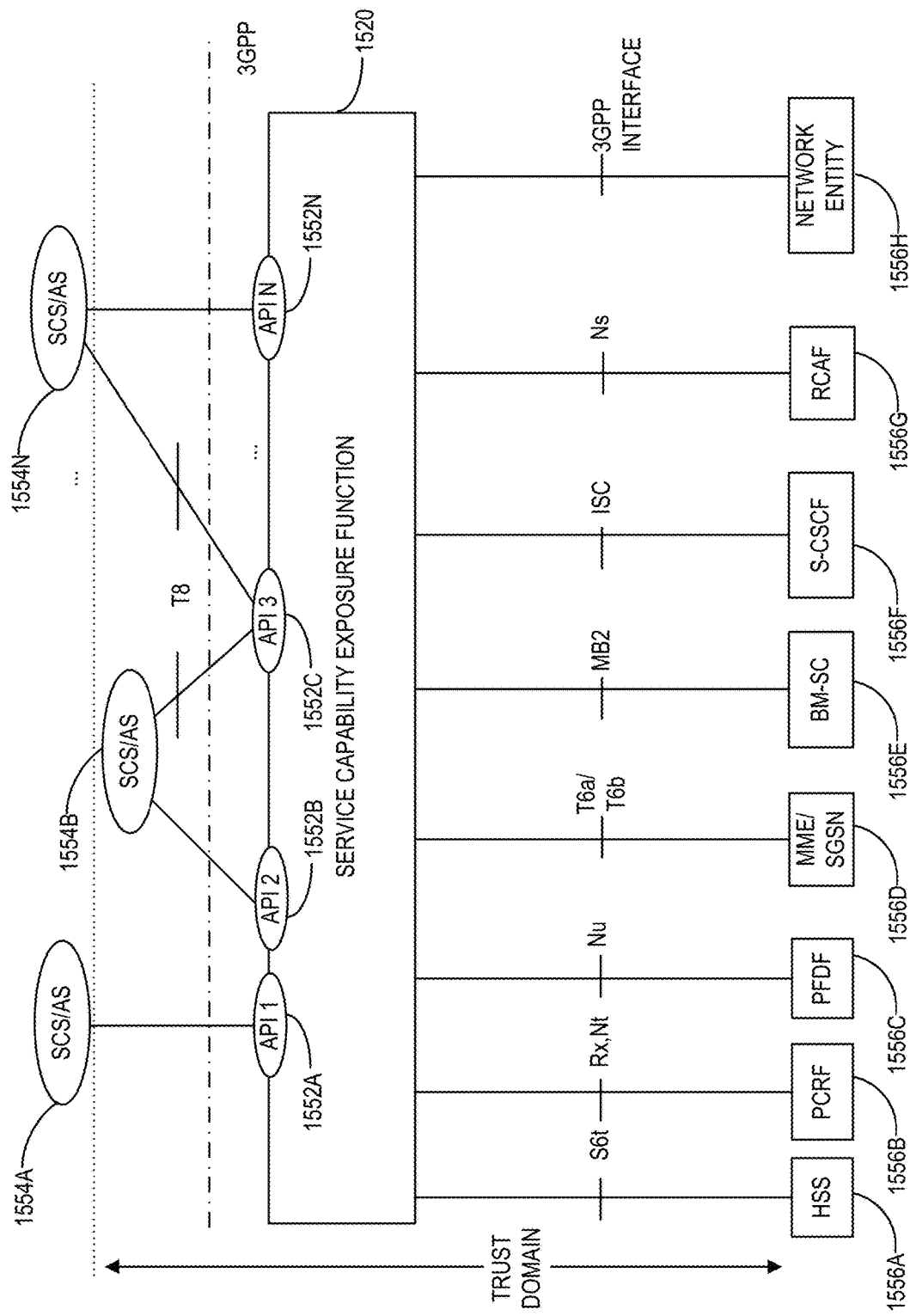
FIG. 15B illustrates an example Service Capability Exposure Function (SCEF) used by the CIoT network architecture of FIG. 15B, according to an example.

FIG. 15B illustrates an example Service Capability Exposure Function (SCEF) used by the CIoT network architecture of FIG. 15A, according to an example. Referring to FIG. 15B, the SCEF 1520 can be configured to expose services and capabilities provided by 3GPP network interfaces to external third-party service provider servers hosting various applications. In some aspects, a 3GPP network such as the CIoT architecture 1500A, can expose the following services and capabilities: a home subscriber server (HSS) 1556A, a policy and charging rules function (PCRF) 1556B, a packet flow description function (PFDF) 1556C, a MME/SGSN 1556D, a broadcast multicast service center (BM-SC) 1556E, a serving call server control function (S-CSCF) 1556F, a RAN congestion awareness function (RCAF) 1556G, and one or more other network entities 1556H. The above-mentioned services and capabilities of a 3GPP network can communicate with the SCEF 220 via one or more interfaces as illustrated in FIG. 15B. The SCEF 220 can be configured to expose the 3GPP network services and capabilities to one or more applications running on one or more service capability server (SCS)/application server (AS), such as SCS/AS 1554A, 1554B, . . . , 1554N. Each of the SCS/AS 1554A-1554N can communicate with the SCEF 220 via application programming interfaces (APIs) 1552A, 1552B, 1552C, . . . , 1552N, as seen in FIG. 15B.

Figure 16:
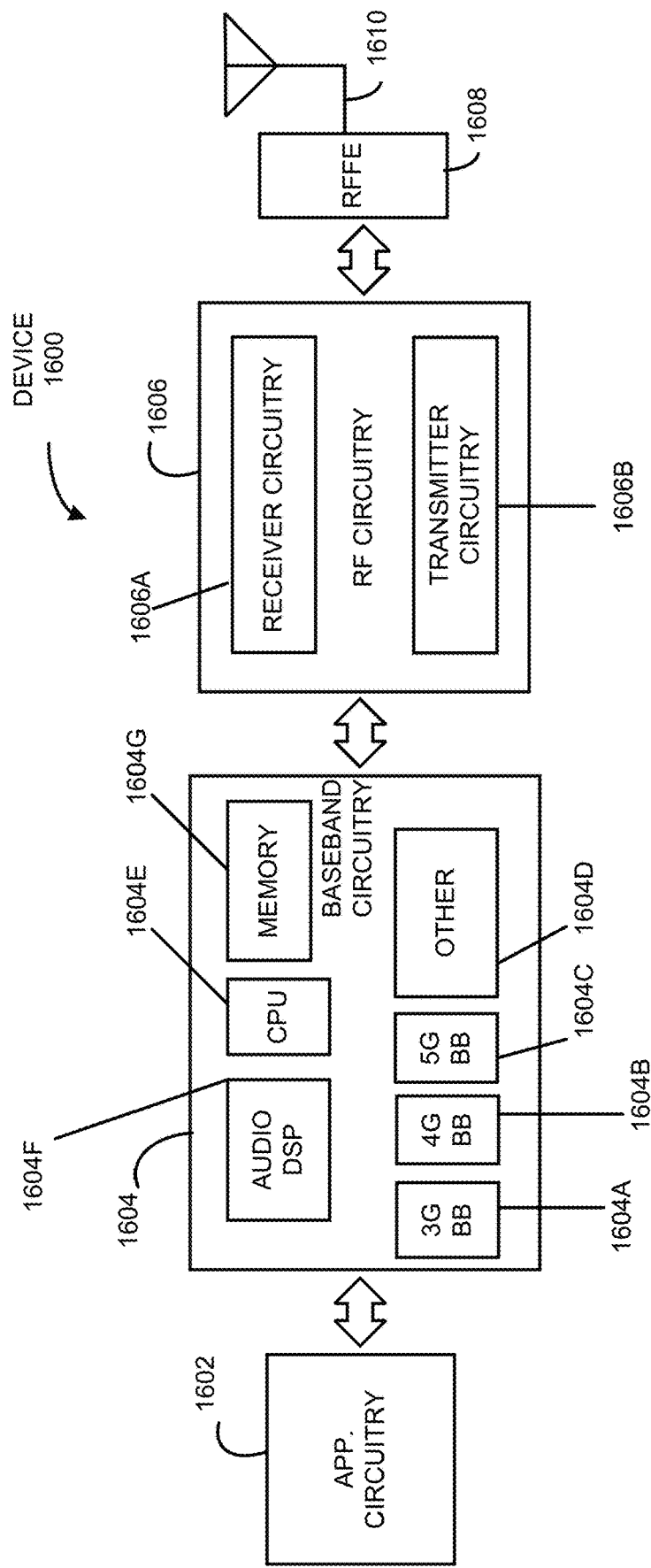
FIG. 16 illustrate an example device in accordance with various embodiments.

FIG. 16 illustrates example components of a device 1600 in accordance with some embodiments. The device 1600 may perform function according to various embodiments described with respect to FIGS. 4 and 5. The device 1600 may be a UE, a vUE 125, a vehicle system 121, a server, or like platforms. For example, a server or a UE acting as a server may be associated/incorporated with, or part of a vehicle to perform the functions in accordance with to various embodiments herein. Such a device 1600 may be coupled with or part of the MSP edge server 136 to perform those function. The device 1600 is illustrated from a receiving and/or transmitting point of view along with the functions described in the various embodiments herein, and it may not include all of the components of the UE, vUE 125, vehicle system 121, server, or like platforms. In some embodiments, the device 1600 may include application circuitry 1602, baseband circuitry 1604, RF circuitry 1606, RFFE circuitry 1608, and a plurality of antennas 1610 together at least as shown. The plurality of antennas 1610 may constitute one or more antenna panels for beamforming. The components of the illustrated device 1600 may be included in a UE or an AN. In some embodiments, the device 1600 may include fewer elements (for example, a cell may not utilize the application circuitry 1602, and instead include a processor/controller to process IP data received from an EPC). In some embodiments, the device 1600 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband circuitry 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604A, a fourth generation (4G) baseband processor 1604B, a fifth generation (5G) baseband processor 1604C, or other baseband processor(s) 1604D for other existing generations, generations in development or to be developed in the future (for example, second generation (2G), sixth generation (6G), etc.). The baseband circuitry 1604 (for example, one or more of baseband processors 1604A-D) may handle various radio control functions that enable communication with one or more radio networks via the RF circuitry 1606. In other embodiments, some or all of the functionality of baseband processors 1604A-D may be included in modules stored in the memory 1604G and executed via a central processing unit (CPU) 1604E. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality.

Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604F. The audio DSP(s) 1604F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 1604 and the application circuitry 1602 may be implemented together such as, for example, on a SOC.

In some embodiments, the baseband circuitry 1604 may provide for communication compatible with one or more radio technologies. For example, in some embodiments, the baseband circuitry 1604 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include one or more switches, filters, amplifiers, etc. to facilitate the communication with the wireless network. RF circuitry 1606 may include receiver circuitry 1606A, which may include circuitry to down-convert RF signals received from the RFFE circuitry 1608 and provide baseband signals to the baseband circuitry 1604. RF circuitry 1606 may also include transmitter circuitry 1606B, which may include circuitry to up-convert baseband signals provided by the baseband circuitry 1604 and provide RF output signals to the RFFE circuitry 1608 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio integrated circuit (IC) circuitry may be provided for processing signals for each spectrum, although the scope of the embodiments is not limited in this respect.

RFFE circuitry 1608 may include a receive signal path, which may include circuitry configured to operate on RF beams received from one or more antennas 1610. The RFFE circuitry 1608 coupled with the one or more antennas 1610 may receive the transmit beams and proceed them to the RF circuitry 1606 for further processing. RFFE circuitry 1608 may also include a transmit signal path, which may include circuitry configured to amplify signals for transmission provided by the RF circuitry 1606 for transmission by one or more of the antennas 1610, with or without beamforming. In various embodiments, the amplification through transmit or receive signal paths may be done solely in the RF circuitry 1606, solely in the RFFE circuitry 1608, or in both the RF circuitry 1606 and the RFFE circuitry 1608.

In some embodiments, the RFFE circuitry 1608 may include a TX/RX switch to switch between transmit mode and receive mode operation. The RFFE circuitry 1608 may include a receive signal path and a transmit signal path. The receive signal path of the RFFE circuitry 1608 may include a low noise amplifier (LNA) to amplify received RF beams and provide the amplified received RF signals as an output (for example, to the RF circuitry 1606). The transmit signal path of the RFFE circuitry 1608 may include a power amplifier (PA) to amplify input RF signals (for example, provided by RF circuitry 1606), and one or more filters to generate RF signals for beamforming and subsequent transmission (for example, by one or more of the one or more antennas 1610).

Processors of the application circuitry 1602 and processors of the baseband circuitry 1604 may be used to execute elements of one or more instances of a protocol stack. For example, processors of the baseband circuitry 1604, alone or in combination, may be used to execute Layer 3, Layer 2, or Layer 1 functionality, while processors of the application circuitry 1602 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 17:
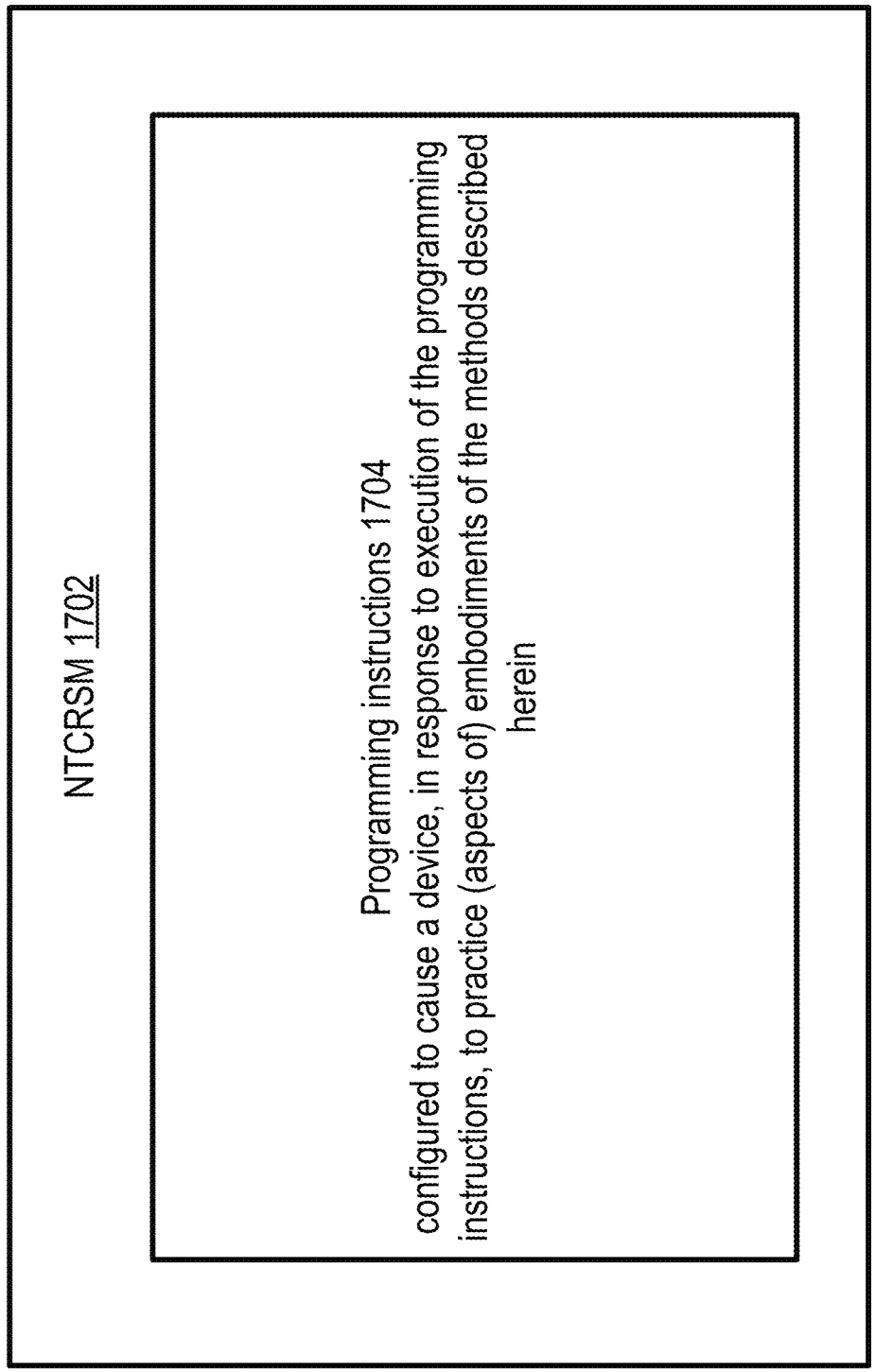
FIG. 17 illustrates an example non-transitory computer-readable storage media according to various embodiments.

FIG. 17 illustrates an example non-transitory computer-readable storage media (NTCRSM) that may be suitable for use to store instructions (or data that creates the instructions) that cause an apparatus (such as any of the devices/components/systems shown and described herein), in response to execution of the instructions by the apparatus, to practice selected aspects of the present disclosure. As shown, NTCRSM 1702 may include a number of programming instructions 1704 (or data to create the programming instructions). Programming instructions 1704 may be configured to enable a device (e.g., any of the devices/components/systems described herein), in response to execution of the programming instructions, to perform various programming operations associated with operating system functions, one or more applications, and/or aspects of the present disclosure. In some embodiments, the programming instructions 1704 (or data to create the programming instructions) to be executed may be in a pre-configured form that may require configuration instructions to install or provision the programming instructions 1704 to an apparatus (such as any of the devices/components/systems described herein). When installed/provisioned, configured and executed, the programming instructions 1604 can complete or perform various programming operations associated with operating system functions, one or more applications, and/or aspects of the present disclosure.

In alternate embodiments, programming instructions 1704 (or data to create the instructions) may be disposed on multiple NTCRSM 1702. In alternate embodiments, programming instructions 1704 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1602 may be embodied by devices described for the storage circuitry 1308 and/or memory circuitry 1304 described with regard to FIG. 13. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1383, instructions 1382, 1370 discussed previously with regard to FIG. 13) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1300, partly on the system 1300, as a stand-alone software package, partly on the system 1300 and partly on a remote computer or entirely on the remote computer or server (e.g., system 1200). In the latter scenario, the remote computer may be connected to the system 1300 through any type of network, including a LAN or WAN, or the connection may be made to an external computer (e.g., through the Internet using an Internet Service Provider).

VI. EXAMPLES

Illustrative examples of the devices, systems, and methods disclosed herein are provided below. An embodiment of the devices, systems, and methods may include any one or more, and any combination of, the examples described below.

Example A01.0 includes a method to assist vehicle driving assistance (DA) service in a multi-access edge computing (MEC) service, the method comprising: to register one or more wireless local access networks (LANs) to provide the vehicle DA service; and determining a connectivity-considered route to route a user equipment (UE) with selected one or more subscribed wireless LANs and a cellular network (CN) from a first geographic location to a second geographic location; wherein the proxy entity is to be communicatively coupled to, associated with, or a part of an MEC node of the CN, each wireless LAN of the one or more wireless LANs corresponds to a wireless LAN service provider, and the one or more subscribed wireless LANs are subscribed by the UE to corresponding one or more wireless LAN service providers.

Example A02.0 includes the method of example A01.0 and/or some other example(s) herein, wherein determining the connectivity-considered route, is to determine the one or more subscribed wireless LANs based on one or more successful subscriptions by the UE via the CN; and select the one or more subscribed wireless LANs to supplement the CN to provide wireless coverage in one or more areas from the first geographic location to the second geographic location.

Example A03.0 includes the method of examples A01.0-A02.0 and/or some other example(s) herein, further comprising: determining that at least one of the one or more areas from the first geographic location to the second geographic location is dead zone, in which the CN fails to provide satisfying wireless coverage based on a service level agreement (SLA).

Example A04.0 includes the method of examples A01.0-A03.0 and/or some other example(s) herein, further comprising: granting respective subscriptions of the one or more wireless LANs and/or corresponding wireless LAN service providers to the UE, based on one or more subscription requests or confirmations from the UE.

Example A04.1 includes the method of example A04.0 and/or some other example(s) herein, further comprising: processing one or more requests from the UE with respect to one or more subscriptions of the one or more wireless LANs and/or corresponding wireless LAN service providers.

Example A04.2 includes the method of example A04.0 and/or some other example(s) herein, further comprising: processing one or more requests from the UE with respect to one or more subscriptions of the one or more wireless LANs and/or corresponding wireless LAN service providers.

Example A05.0 includes the method of examples A04.X[1] and/or some other example(s) herein, wherein the MEC DA application is further to determine corresponding access nodes (ANs) of the selected one or more subscribed wireless LANs.

[1]Examples A04.X refer to all the examples beginning with A04. Similar example notations follow the same references. For example, examples A05.X below refer to all the examples beginning with A05.)

Example A05.1 includes the method of examples A05.0 and/or some other example(s) herein, wherein the each wireless LAN includes one or more ANs and/or APs.

Example A06.0 includes the method of examples A05.X and/or some other example(s) herein, further comprising: initiating, via the CN, a wireless connection between an AN of the corresponding ANs and the UE based on the determined connectivity-considered route.

Example A06.1 includes the method of example A06.0 and/or some other example(s) herein, wherein the initiation of the wireless connection is to: determine to initiate the wireless connection based at least on the determined connectivity-considered route; and send a subscription request with respect to the AN of the corresponding ANs to the UE.

Example A06.2 includes the method of example A06.1 and/or some other example(s) herein, wherein determining to initiate the wireless connection is to determining to initiate the wireless connection based at least on the determined connectivity-considered route, a current location of the UE, and a moving speed of the UE.

Example A06.3 includes the method of example A06.1 and/or some other example(s) herein, further comprising sending, to the AN of the corresponding ANs or a wireless LAN provider of the AN of the corresponding ANs, an authorization request with respect to a wireless connection authorization to the UE.

Example A07.0 includes the method of examples A06.X and/or some other example(s) herein, wherein the initiation of the wireless connection is based on a distance of the UE to a dead zone along the determined connectivity-considered route and a moving speed of the UE, wherein the dead zone is an area in which the CN fails to provide satisfying wireless connection or coverage based on a service level agreement (SLA) between the UE and the CN.

Example A08.0 includes the method of examples A07.X and/or some other example(s) herein, wherein the initiation of the wireless connection is requested by the UE prior to an arrival of the UE to the dead zone.

Example A08.1 includes the method of examples A08.0 and/or some other example(s) herein, wherein the request is requested by the UE via the CN prior to that the UE arrives the dead zone.

Example A09.0 includes the method of examples A05.X and/or some other example(s) herein, further comprising updating the connectivity-considered route based on quality of services (QoS) provided by the determined ANs to the UE.

Example A09.1 includes the method of example A09.0 and/or some other example(s) herein, wherein updating the connectivity-considered route is to update a current connectivity-considered route to an updated one.

Example A09.2 includes the method of example A09.0 and/or some other example(s) herein, further comprising: receiving, from the determined ANs, the QoS provided by the determined ANs.

Example A09.3 includes the method of example A09.2 and/or some other example(s) herein, further comprising: processing the received the QoS provided by the determined ANs; and updating corresponding performance parameters with respect to the determined ANs for future connectivity-considered route determination.

Example A10.0 includes the method of example A01.0 and/or some other example(s) herein, further comprising: registering one or more additional CNs operated with respective corresponding CN operators.

Example A11.0 includes the method of example A01.0 and/or some other example(s) herein, wherein determining the connectivity-considered route is to determine the connectivity-considered route based on coverage availabilities of one or more access nodes of the CN from the first geographic location to the second geographic location.

Example A11.1 includes the method of example A11.0 and/or some other example(s) herein, wherein determining the connectivity-considered route is to determine the connectivity-considered route based on coverage availabilities of one or more access nodes of the CN from the first geographic location to the second geographic location so that wireless connections along connectivity-considered route are to be provided by the CN with a maximum portion compared with other possible connectivity-considered route(s).

Example A12.0 includes the method of example A01.0 and/or some other example(s) herein, wherein determining the connectivity-considered route is to determine a connectivity-considered route based at least on locations of respective access nodes (ANs) of the one or more wireless LANs and the cellular WAN, and the locality-considered route includes a set of ANs of the one or more wireless LANs and the CN.

Example A12.1 includes the method of example A01.0 and/or some other example(s) herein, wherein determining the connectivity-considered route is to determine a locality-considered route based at least on locations of respective access nodes (ANs) of the one or more wireless LANs and the cellular WAN, and the locality-considered route includes a set of ANs of the one or more wireless LANs and the CN.

Example A12.2 includes the method of examples A12.1/2 and/or some other example(s) herein, wherein the locality consideration considers the locations of the respective access nodes (ANs) in an MEC system and/or their respective wirelessly connections with the UE.

Example A12.3 includes the method of examples A12.1/2 and/or some other example(s) herein, wherein the locality consideration is to reduce the data transportations between the UE and an AN so that DA related computation are to be operated at the AN that is close to the UE in an MEC system to reduce latency and/or jitter.

Example A12.4 includes the method of examples A12.1/2 and/or some other example(s) herein, wherein the locality consideration is to determine the locality-considered route based on associated securities of the ANs corresponding to the connections between the UE and the ANs in the MEC system.

Example A13.0 includes the method of examples A12.X and/or some other example(s) herein, further comprising: monitoring performance with respect to the ANs of the locality-considered route; and determining a next locality-considered route based at least in part on the monitored performance.

Example A13.1 includes the method of examples A13.0 and/or some other example(s) herein, further comprising: processing information of the monitored performance with respect to the ANs.

Example A14.0 includes the method of examples A01.0 and/or some other example(s) herein, further comprising determining that the one or more wireless LANs are available for providing wireless LAN service in assisting the MEC DA application based on one or more registrations of the one or more wireless LANs or the corresponding one or more wireless LAN service providers.

Example A15.0 includes the method of examples A01.0 and/or some other example(s) herein, further comprising: performing an attestation with respect to the UE; and determining to communicatively couple a user equipment (UE) based on a successfully-performed attestation.

Example A15.1 includes the method of examples A15.0 and/or some other example(s) herein, further comprising determining to perform the attestation with respect to the UE.

Example A16.0 includes the method of examples A01.0 and/or some other example(s) herein, wherein the UE is a handheld device, a smartphone, or computer-assistant/autonomous driving (CA/AD) vehicle, or a subsystem/device thereof.

Example Z01 may include an apparatus comprising means to perform one or more elements of a method described in or related to any of examples A01.X-A16.X, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01.X-A16.X, or any other method or process described herein. Example Z03 may include an apparatus comprising logic, modules, or circuitry to perform one or more elements of a method described in or related to any of examples A01.X-A16.X, or any other method or process described herein. Example Z04 may include a method, technique, or process as described in or related to any of examples A01.X-A16.X, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01.X-A16.X, or portions thereof. Example Z06 may include a signal as described in or related to any of examples A01.X-A16.X, or portions or parts thereof. Example Z07 may include a datagram, packet, frame, segment, protocol data unit (PDU), or message as described in or related to any of examples A01.X-A16.X, or portions or parts thereof, or otherwise described in the present disclosure. Example Z08 may include a signal encoded with data as described in or related to any of examples A01.X-A16.X, or portions or parts thereof, or otherwise described in the present disclosure. Example Z09 may include a signal encoded with a datagram, packet, frame, segment, protocol data unit (PDU), or message as described in or related to any of examples A01.X-A16.X, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01.X-A16.X, or portions thereof. Example Z11 may include a computer program comprising instructions, wherein execution of the program by a processing element is to cause the processing element to carry out the method, techniques, or process as described in or related to any of examples A01.X-A16.X, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

VI. TERMINOLOGY

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, operations, elements, and/or components, but do not preclude the presence or addition of one or more other features, integers, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" and/or "processing circuitry" as used herein refer to, are part of, or include circuitry capable of sequentially and automatically carrying out a sequence of arithmetic or logical operations, or recording, storing, and/or transferring digital data. The term "processor circuitry" and/or "processing circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry" and/or "processing circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 1300 (CDMA 1300), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (WITS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The terms "coupled," "communicatively coupled," "connected," "communicatively connected," along with derivatives thereof are used herein. The term "coupled" and/or "connected" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" and/or "directly connected" may mean that two or more elements are in direct contact with one another. The term "communicatively coupled" and/or "communicatively coupled" may mean that two or more elements may be in contact with one another by a means of communication including through a wire or other interconnect connection, through a wireless communication channel or ink, and/or the like.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

As used herein, the term "computational offloading" or "offloading" refers to the transfer of resource intensive computational tasks or workloads from a device, computing system, etc., to an external platform such as an edge node/server, cluster, grid, cloud computing service, and/or the like.

As used herein, the term "workload" may refer to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A computing system, comprising:
communication circuitry;
memory circuitry to store program code of a connection selection function, wherein the connection selection function is a system layer function that is below an application layer of the computing system; and
processor circuitry connected with the memory circuitry and the communication circuitry, wherein the processor circuitry is to operate the connection selection function to:
obtain a connection selection policy from a set of mobility service providers (MSPs) via a first interface between the computing system and individual MSPs of the set of MSPs;
obtain access network (AN) information about a set of ANs via a second interface between the computing system and individual ANs of the set of ANs, wherein the first interface is different than the second interface;
select, based on the AN information and according to the connection selection policy, individual ANs of the set of ANs to provide network connectivity for a vehicle system prior to and during movement of the vehicle system; and
initiate, via the communication circuitry, connection establishment with the selected ANs as the individual ANs become available to the vehicle system.

2. The computing system of claim 1, wherein the processor circuitry is to operate the connection selection function to:
obtain the AN information from the individual ANs via an access layer of the computing system.

3. The computing system of claim 1, wherein the AN information includes one or more of AN measurement reports, radio link measurements, communication history, AN charging policies, access network charging history, network status, location information of the vehicle system, location information of the set of MSPs, service-related information, and service context.

4. The computing system of claim 1, wherein the connection selection policy governs the selection of the individual ANs.

5. The computing system of claim 4, wherein the connection selection policy includes one or more of quality-based conditions for selecting access networks, location-based conditions for selecting access networks, traffic-based conditions for selecting ANs, and operational conditions for selecting ANs.

6. The computing system of claim 1, wherein the processor circuitry is to operate the connection selection function to:
identify, as the individual ANs, ANs along a geographic route as the vehicle system travels along the geographic route.

7. The computing system of claim 1, wherein the computing system is disposed in the vehicle system.

8. The computing system of claim 7, wherein the computing system is an embedded system in the vehicle system or the computing system is a handheld device within the vehicle system.

9. The computing system of claim 1, wherein the computing system is an MSP.

10. The computing system of claim 9, wherein the MSP is an MSP center server or an MSP edge server.

11. The computing system of claim 10, wherein the MSP edge server is a Multi-access Edge Computing (MEC) host or MEC server in a MEC framework.

12. The computing system of claim 1, wherein the set of ANs include one or more cellular network base stations and one or more wireless local area network (WLAN) access points.

13. The computing system of claim 12, wherein at least one AN of the set of ANs supports interworking between at least one of the one or more cellular network base stations and at least one of the one or more WLAN access points.

14. One or more non-transitory computer-readable media (NTCRM) comprising instructions of a connection selection function, wherein execution of the instructions by one or more processors of a computing system is to cause the computing system to operate the connection selection function to:
- prior to and during movement of a vehicle system,
    - identify a set of access networks (ANs) along a geographic route of the vehicle system before and during vehicular movement along the geographic route;
    - obtain a connection selection policy from a set of mobility service providers (MSPs) via a first interface, wherein the connection selection policy governs how ANs are to be selected to provide network connectivity for the vehicle system;
    - obtain AN information about the set of ANs from the set of ANs via a second interface, wherein the first interface is different than the second interface;
    - select, based on the AN information and the connection selection policy, individual ANs of the set of ANs to serve the vehicle system;
    - establish connections with the individual ANs as the individual ANs become available to the vehicle system; and
    - establish or transfer MSP instances with one or more MSPs of the set of MSPs via the individual ANs when the connections with the individual ANs are established.

15. The one or more NTCRM of claim 14, wherein execution of the instructions is to cause the computing system to operate the connection selection function to, one or both of:
- obtain the connection selection policy from an MSP application in an application layer of the computing system, and the first interface is between the MSP application and at least one MSP of the set of MSPs; and
- obtain the AN information from one or more of an access layer of the vehicle system and the second interface is between the access layer of the vehicle and individual ANs of the set of ANs.

16. The one or more NTCRM of claim 14, wherein the AN information includes one or more of radio link measurements, AN measurement reports, communication history, AN charging history, AN charging policies, network status, location information of the vehicle system, location information of the set of MSPs, service-related information, and a service context.

17. The one or more NTCRM of claim 14, wherein the connection selection policy includes one or more of quality-based conditions for selecting access networks, location-based conditions for selecting access networks, traffic-based conditions for selecting access networks, and operational conditions for selecting access networks.

18. The one or more NTCRM of claim 14, wherein the computing system is an embedded system of the vehicle system or the computing system is a handheld device within a cabin of the vehicle system.

19. The one or more NTCRM of claim 14, wherein the computing system is an MSP, wherein the MSP is an MSP center server or an MSP edge server.

20. The one or more NTCRM of claim 14, wherein the set of MSPs include a set of MSP center servers and a set of MSP edge servers.

21. The one or more NTCRM of claim 20, wherein the set of ANs include one or more cellular network base stations and one or more wireless local area network (WLAN) access points, and at least one AN of the set of ANs supports interworking between at least one of the one or more cellular network base stations and at least one of the one or more WLAN access points.

22. A method of operating a connection selection function by a vehicle system, the method comprising:
- identifying a set of access networks (ANs) along a geographic route of the vehicle system before and while the vehicle system travels along the geographic route;
- obtaining a connection selection policy from a mobility service provider (MSP) application in an application layer via a first interface, wherein the connection selection policy governs how ANs are selected to provide network connectivity for the vehicle system;
- obtaining AN information about the set of ANs from an access layer of the vehicle system via a second interface, wherein the first interface is different than the second interface;
- selecting, based on the connection selection policy and the AN information, individual ANs of the set of ANs for network connectivity along the geographic route; and
- causing connection establishment with the selected ANs as the individual ANs become available to the vehicle system.

23. The method of claim 22, wherein the AN information includes:
- one or more of radio link measurements, AN measurement reports, communication history, AN charging history, AN charging policies, network status, location information of the vehicle system, location information of the set of MSPs, service-related information, and a service context; and
- the connection selection policy includes one or more of quality-based conditions for selecting access networks, location-based conditions for selecting access networks, traffic-based conditions for selecting access networks, and operational conditions for selecting access networks.

24. The method of claim 22, wherein the set of ANs include one or more cellular network base stations and one or more wireless local area network (WLAN) access points, and at least one AN of the set of ANs supports interworking between at least one of the one or more cellular network base stations and at least one of the one or more WLAN access points.

* * * * *